(12) United States Patent
Das et al.

(10) Patent No.: US 11,152,854 B2
(45) Date of Patent: Oct. 19, 2021

(54) HYBRID CONVERTER FAMILY AND METHODS THEREOF

(71) Applicant: The Regents of the University of Colorado, a body corporate, Denver, CO (US)

(72) Inventors: Ratul Das, Boulder, CO (US); Hanh-Phuc Le, Superior, CO (US); Gabsu Seo, Lakewood, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 0 days.

(21) Appl. No.: 16/538,816

(22) Filed: Aug. 12, 2019

(65) Prior Publication Data
US 2020/0212795 A1    Jul. 2, 2020

Related U.S. Application Data

(60) Provisional application No. 62/717,572, filed on Aug. 10, 2018, provisional application No. 62/717,574, (Continued)

(51) Int. Cl.
*H02M 3/07* (2006.01)
*H02M 3/158* (2006.01)
*H02M 3/28* (2006.01)
*H02M 1/00* (2006.01)

(52) U.S. Cl.
CPC ............. *H02M 3/07* (2013.01); *H02M 3/158* (2013.01); *H02M 3/285* (2013.01); *H02M 1/009* (2021.05)

(58) Field of Classification Search
CPC ........ H02M 3/07; H02M 3/073; H02M 3/155; H02M 3/156; H02M 3/158; H02M 2001/007; H02M 2001/0048
See application file for complete search history.

(56) References Cited

U.S. PATENT DOCUMENTS 10,547,241 B1 * 1/2020 Li ........................... H02M 3/07
10,554,141 B2 * 2/2020 Dai ......................... H02M 3/07
(Continued)

OTHER PUBLICATIONS

"United States Data Center Energy Usage Report" by Arman Shehabi et al. published Jun. 2016.
(Continued)

*Primary Examiner* — Jeffrey A Gblende
(74) *Attorney, Agent, or Firm* — Workman Nydegger

(57) ABSTRACT

The present disclosure provides methods and circuits of a hybrid converter family that allows using a combination of a switched multiple capacitor network and a number of inductors in order to a power conversion from an input to an output that may require a large conversion ratio, high output current, low output voltage, and/or high input voltage. The disclosed circuits and methods can be applied to today's switching regulators and allow them to provide the same power conversion function with less number of power conversion stages, smaller passive components, and less number of active components, and therefore, reduce the implementation space to save cost as well as improve efficiency. Sample applications include, but are not limited to, point-of-load power converters for data centers, telecommunication systems and other high-performance electronic systems.

10 Claims, 103 Drawing Sheets

Related U.S. Application Data filed on Aug. 10, 2018, provisional application No. 62/717,577, filed on Aug. 10, 2018.

(56) References Cited

U.S. PATENT DOCUMENTS

| | | | | |
|---|---|---|---|---|
| 10,756,623 | B1* | 8/2020 | Petersen | H02M 3/07 |
| 2013/0234669 | A1* | 9/2013 | Huang | H02J 7/0029 |
| | | | | 320/126 |
| 2014/0306673 | A1* | 10/2014 | Le | H02M 3/04 |
| | | | | 323/266 |
| 2015/0022173 | A1* | 1/2015 | Le | H02M 3/00 |
| | | | | 323/282 |
| 2018/0358896 | A1* | 12/2018 | Puggelli | H02M 3/1588 |
| 2019/0348913 | A1* | 11/2019 | Zhang | H02M 1/36 |
| 2020/0212807 | A1 | 7/2020 | Das et al. | |

OTHER PUBLICATIONS

J. F. Dickson, "On-chip high-voltage generation in MNOS integrated circuits using an improved voltage multiplier technique," in IEEE Journal of Solid-State Circuits, vol. 11, No. 3, pp. 374-378, Jun. 1976, doi: 10.1109/JSSC.1976.1050739.

J. S. Rentmeister and J. T. Stauth, "A 48V:2V flying capacitor multilevel converter using current-limit control for flying capacitor balance," 2017 IEEE Applied Power Electronics Conference and Exposition (APEC), Tampa, FL, 2017, pp. 367-372, doi: 10.1109/APEC.2017.7930719.

M. H. Ahmed, C. Fei, F. C. Lee and Q. Li, "48-V Voltage Regulator Module With PCB Winding Matrix Transformer for Future Data Centers," in IEEE Transactions on Industrial Electronics, vol. 64, No. 12, pp. 9302-9310, Dec. 2017, doi: 10.1109/TIE.2017.2711519.

W. Liu, P. Assem, Y. Lei, R K. Hanumolu and R. Pilawa-Podgurski, "10.3 A 94.2%-peak-efficiency 1.53A direct-battery-hook-up hybrid Dickson switched-capacitor DC-DC converter with wide continuous conversion ratio in 65nm CMOS," 2017 IEEE International Solid-State Circuits Conference (ISSCC), San Francisco, CA, 2017, pp. 182-183, doi: 10.1109/ISSCC.2017.7870321.

Y. Lei, R. May and R. C. N. Pilawa-Podgurski, "Split-phase control: Achieving complete soft-charging operation of a dickson switched-capacitor converter," 2014 IEEE 15th Workshop on Control and Modeling for Power Electronics (COMPEL), Santander, 2014, pp. 1-7, doi: 10.1109/COMPEL.2014.6877145.

* cited by examiner

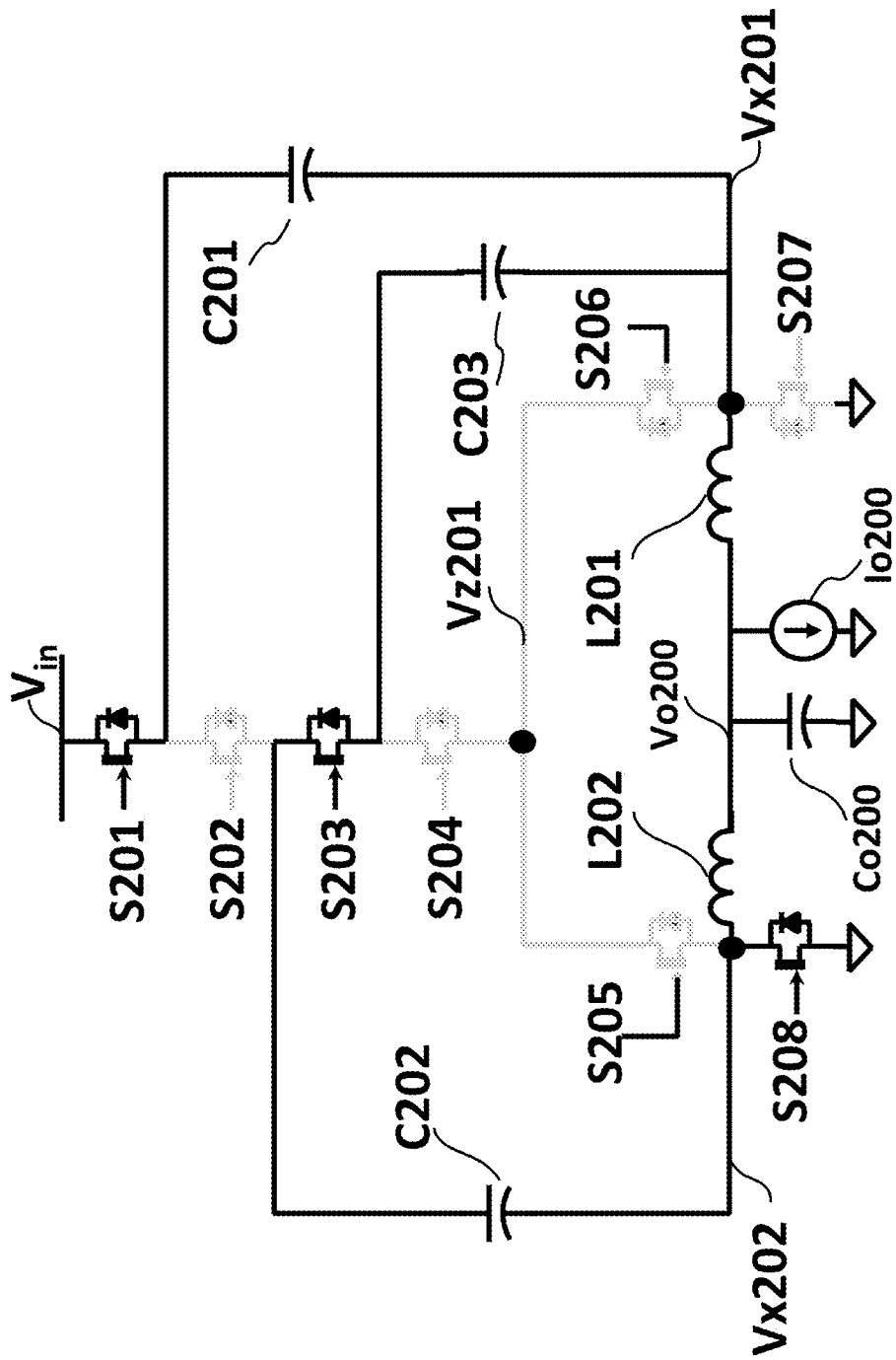
FIG. 2B – State 1 (Charging Phase A)

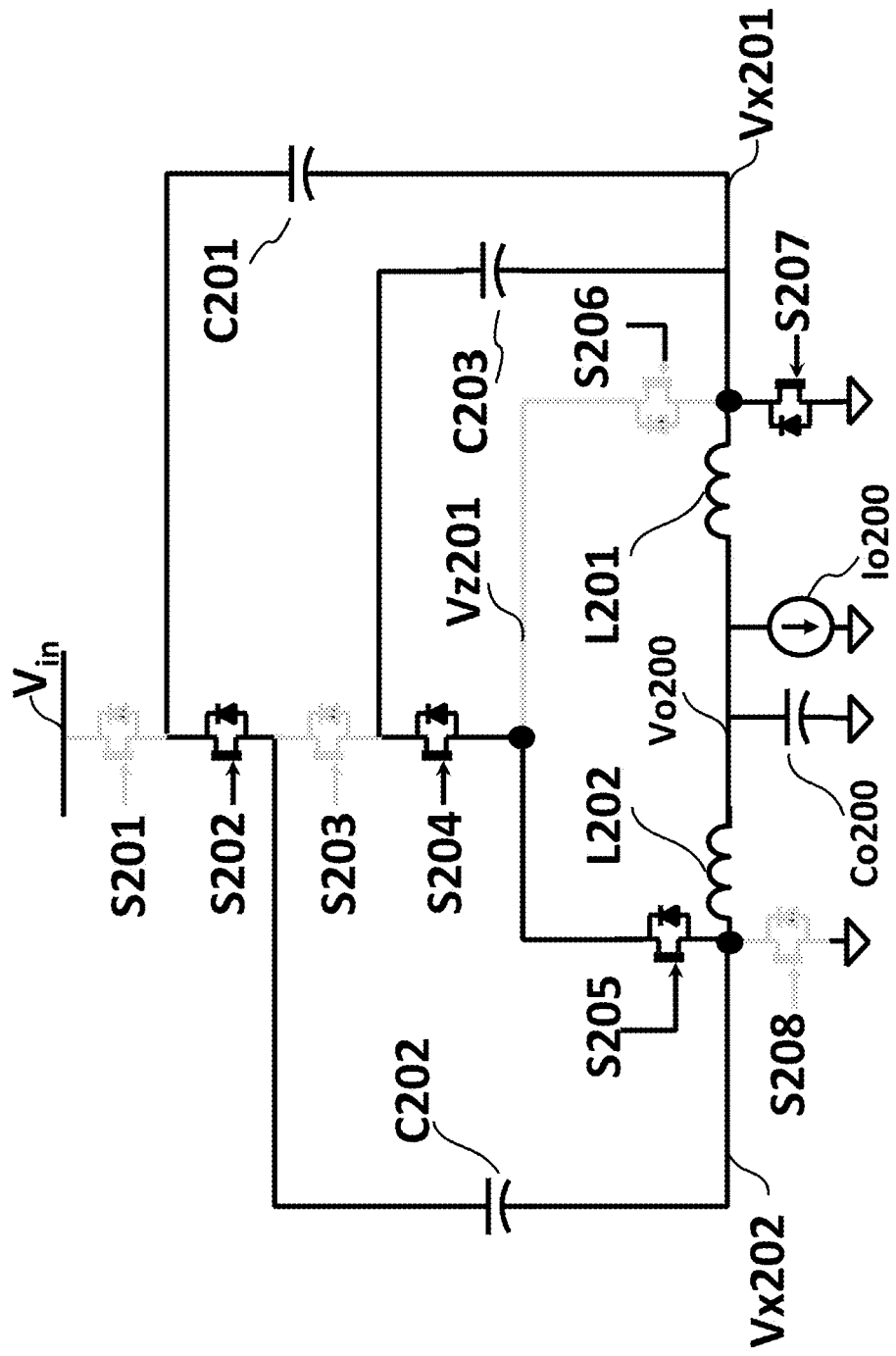
FIG. 2C – State 3 (Charging Phase B)

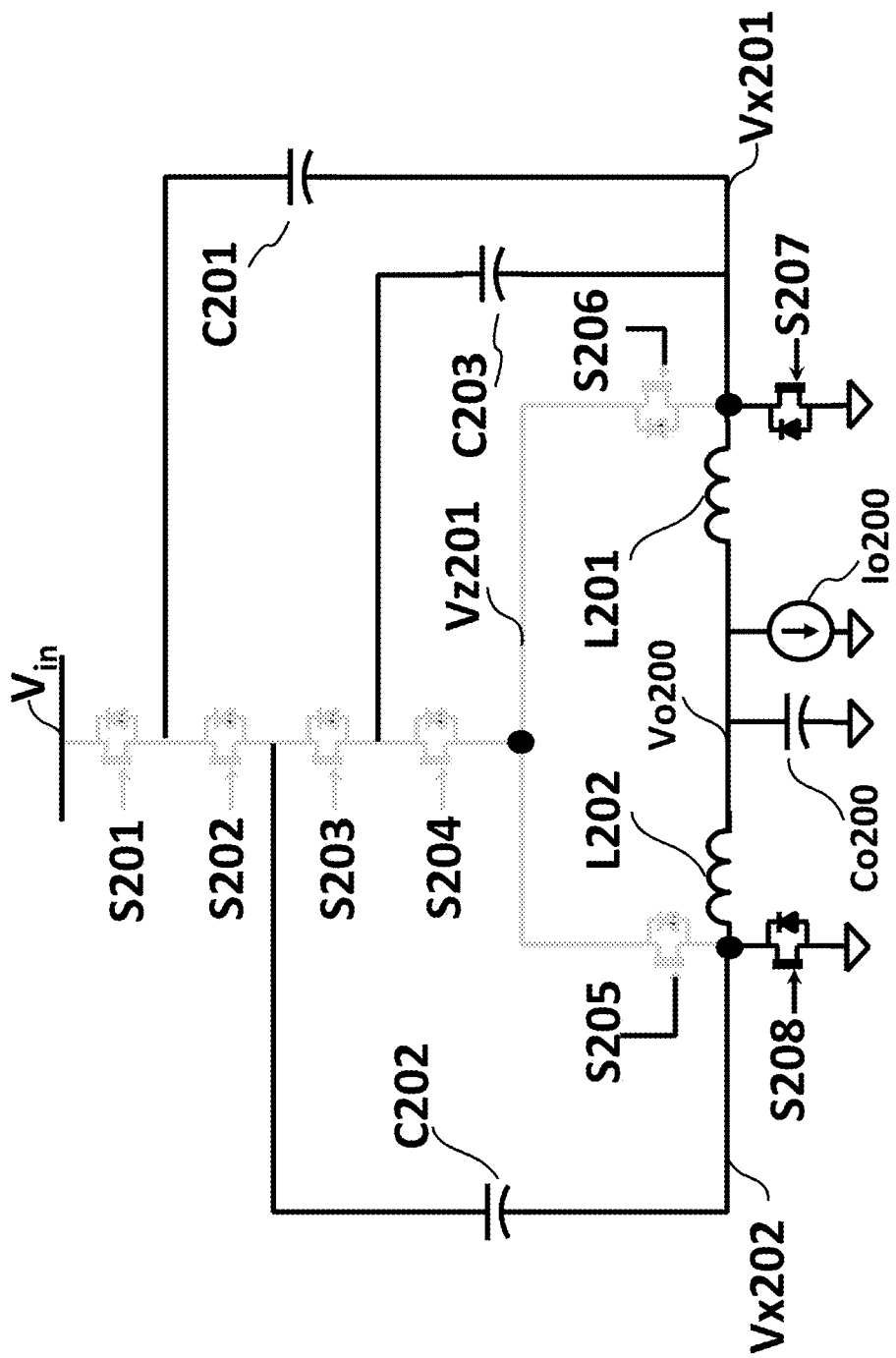
FIG. 2D – States 2 and 4

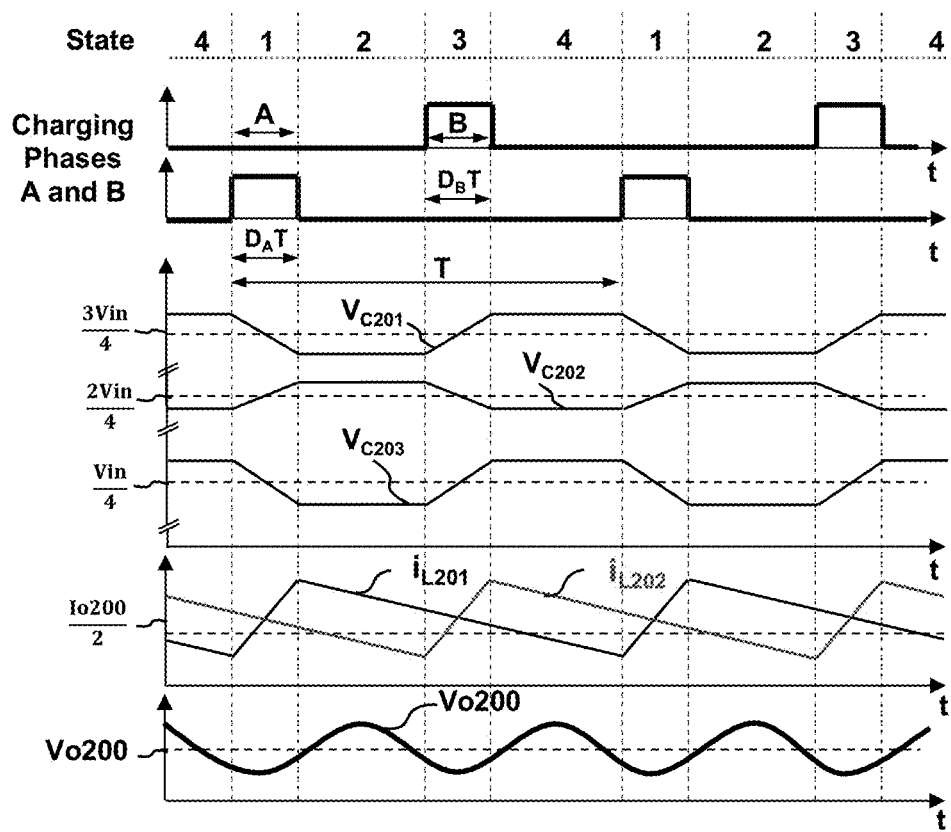
FIG. 2E – Operational Waveforms

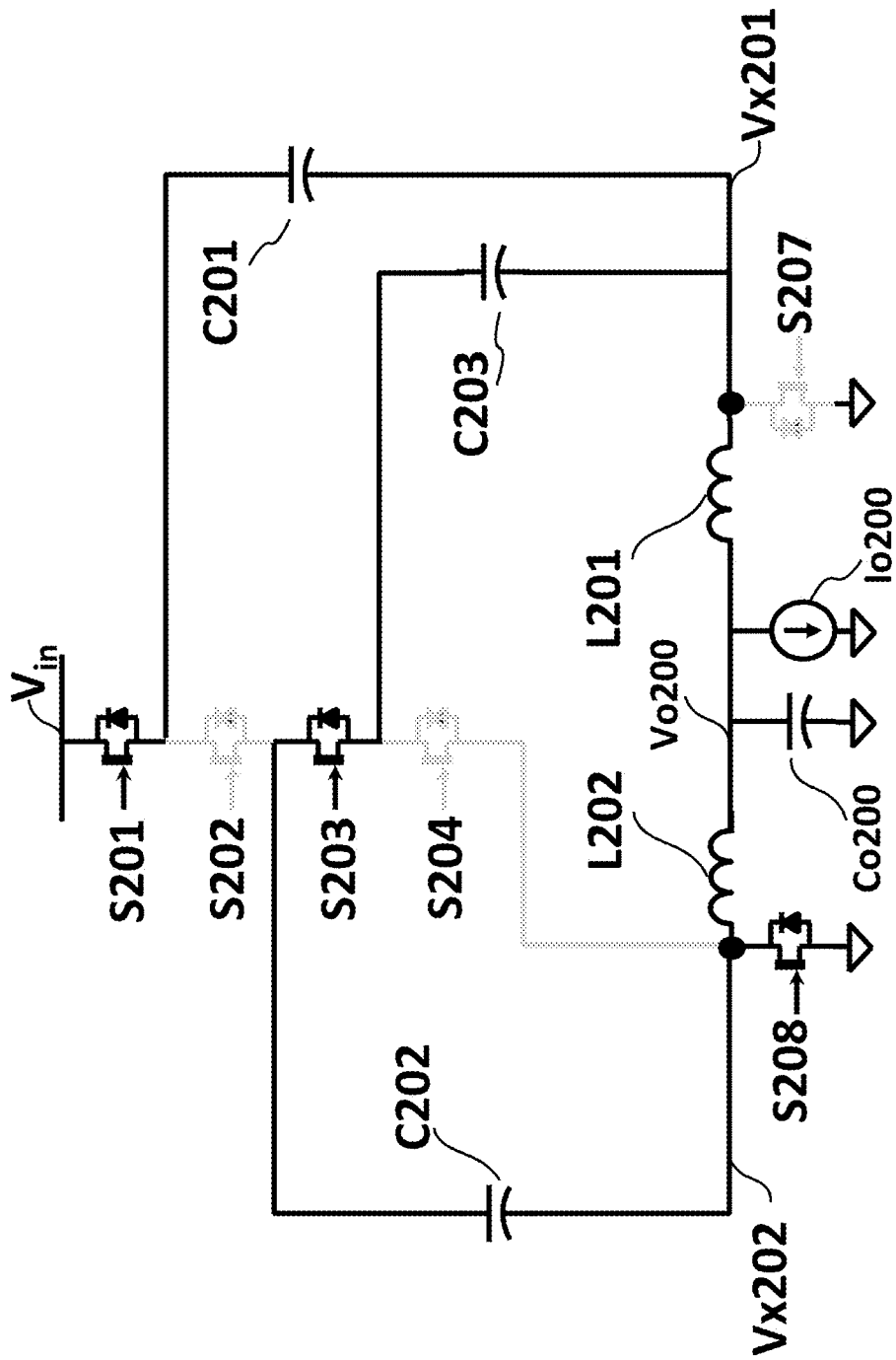
FIG. 3B – State 1 (Charging Phase A)

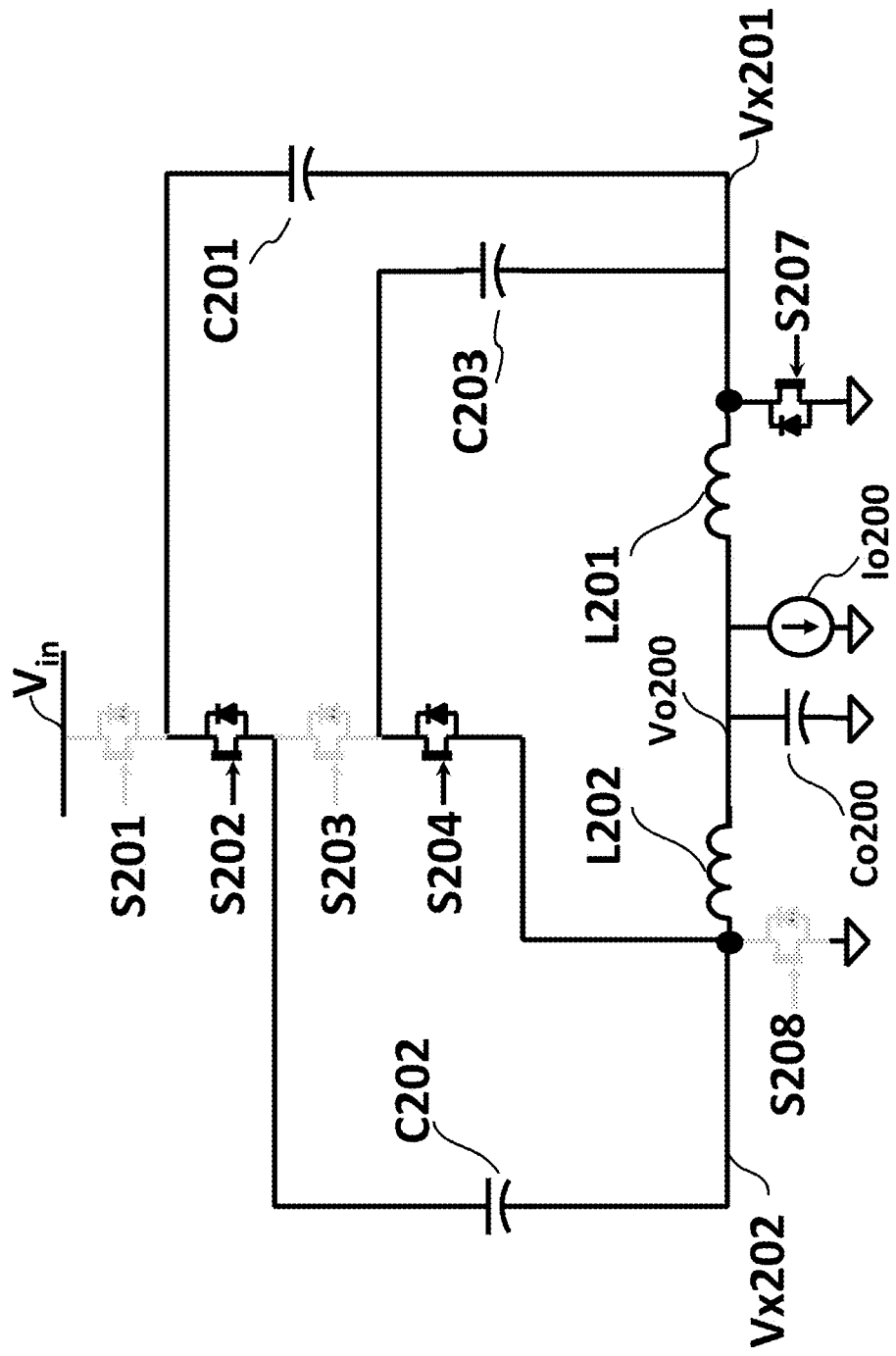
FIG. 3C – State 3 (Charging Phase B)

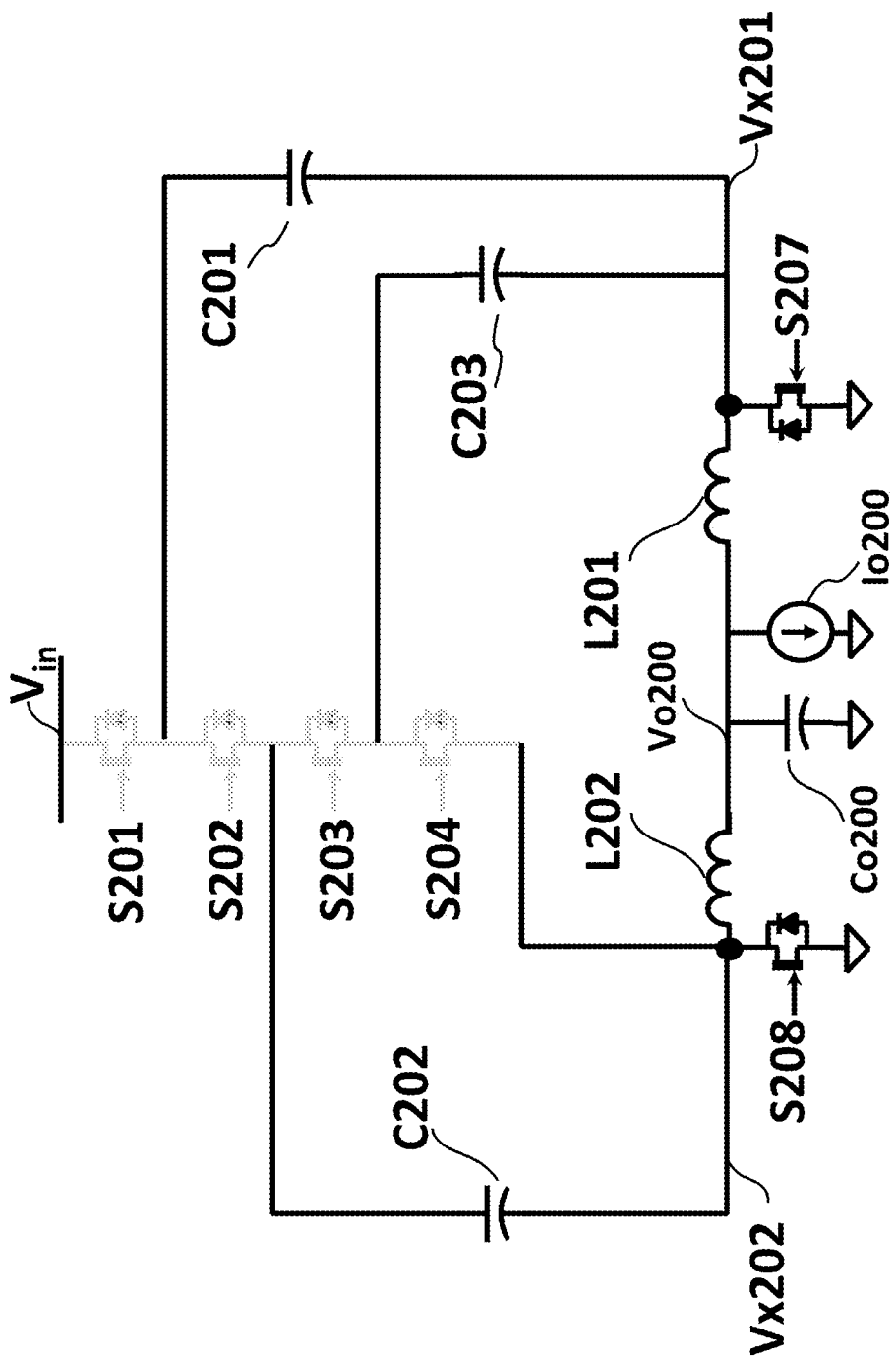
FIG. 3D – States 2 and 4

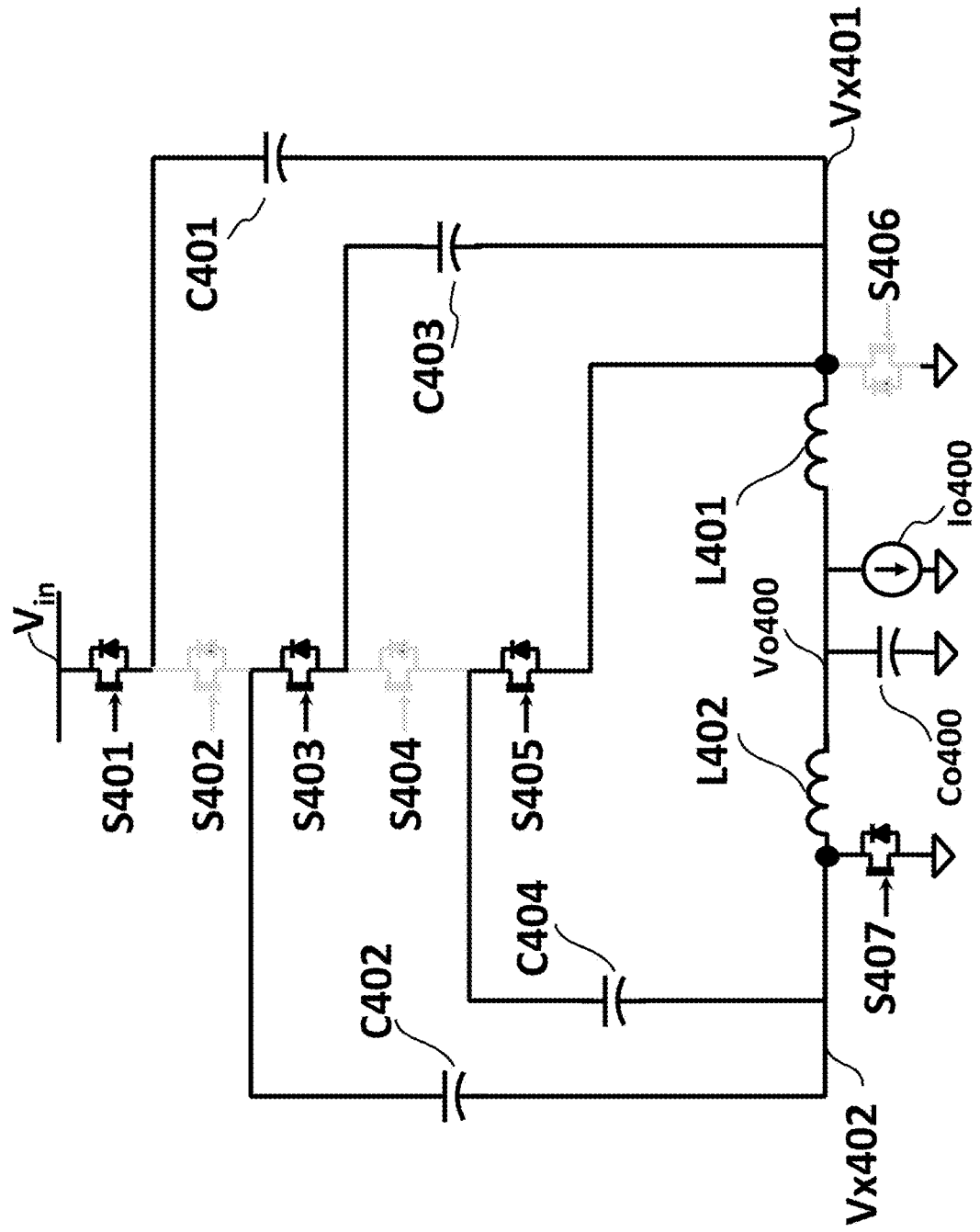
FIG. 4B – State 1 (Phase A)

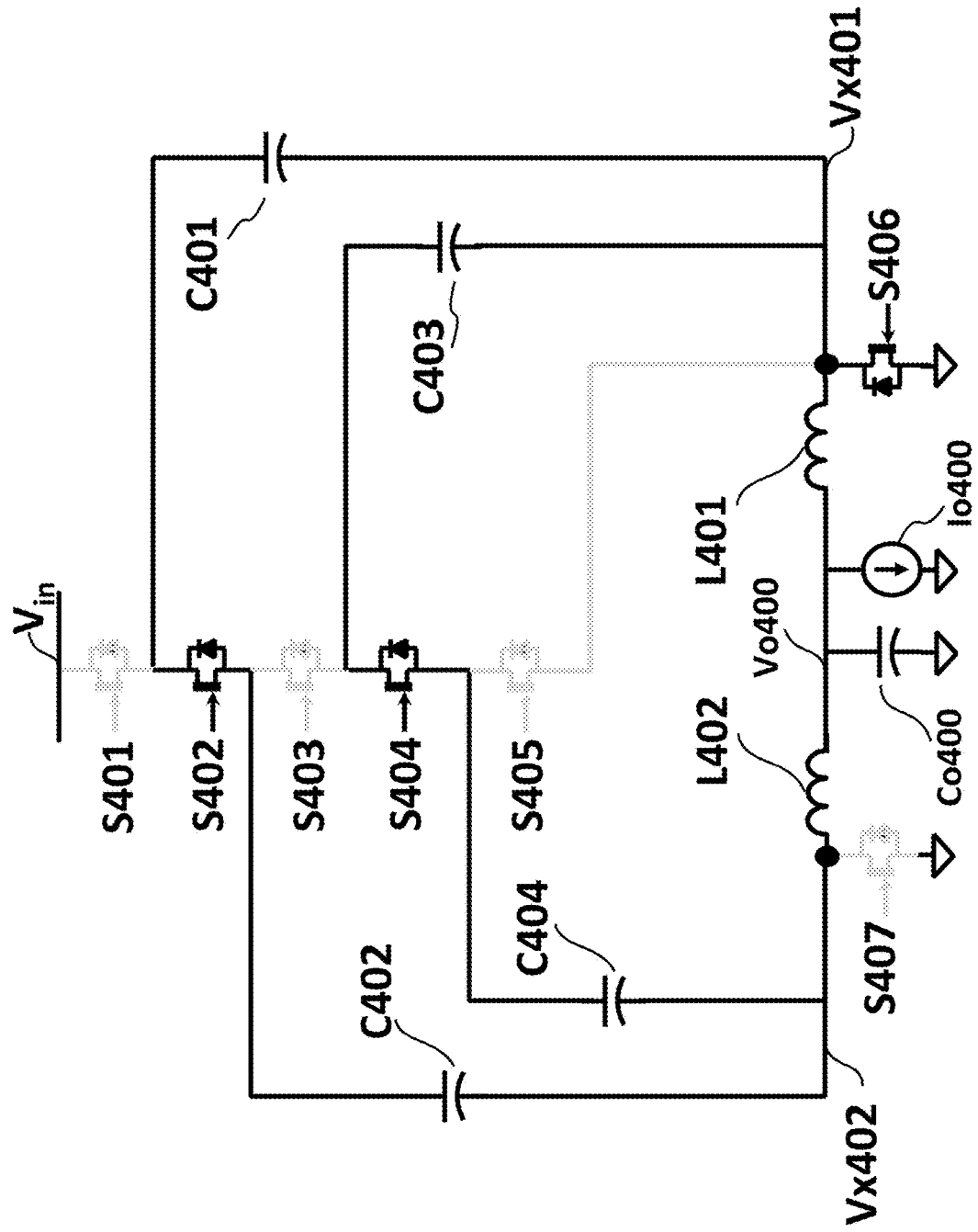
FIG. 4C – State 3 (Phase B)

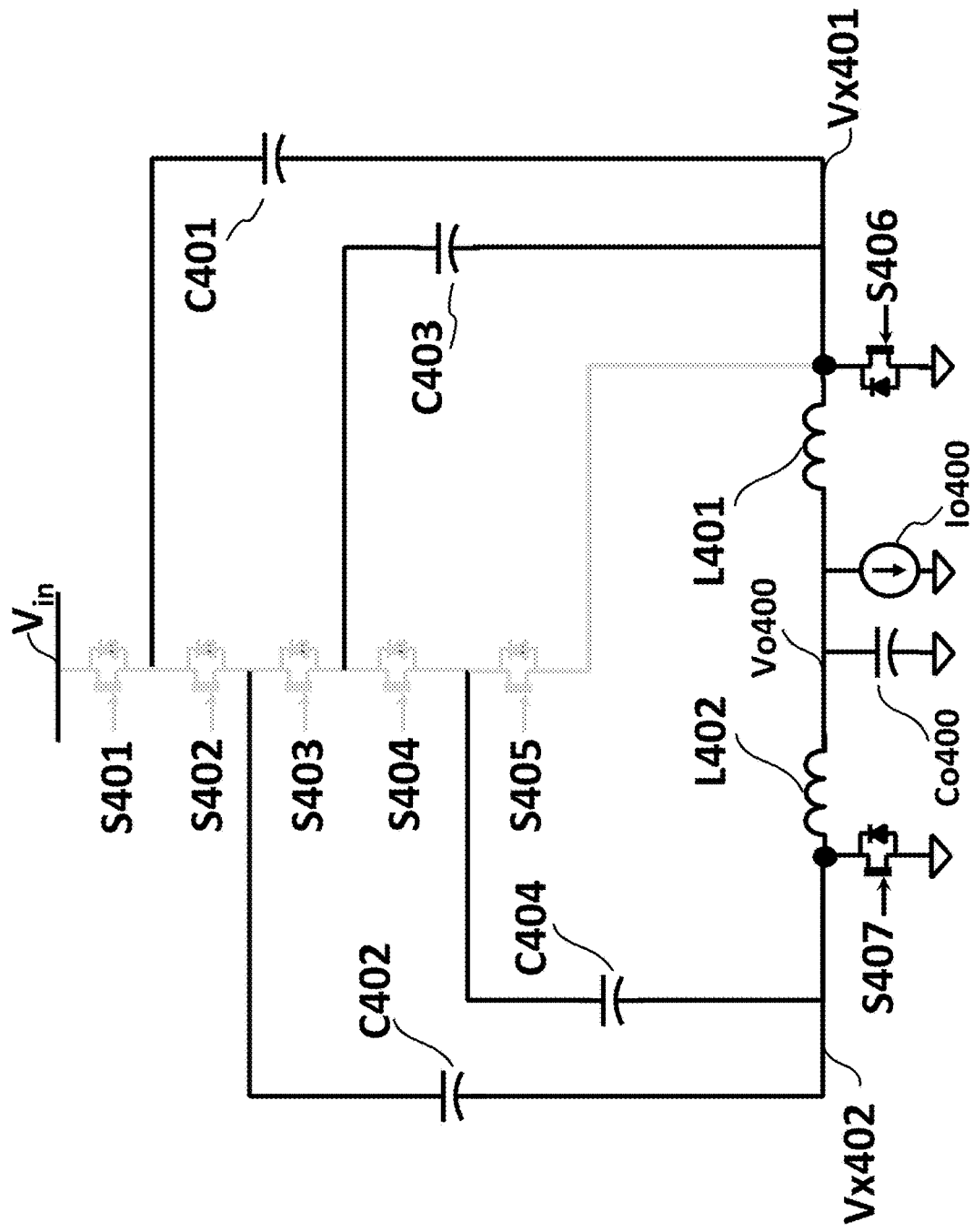
FIG. 4D – States 2 and 4

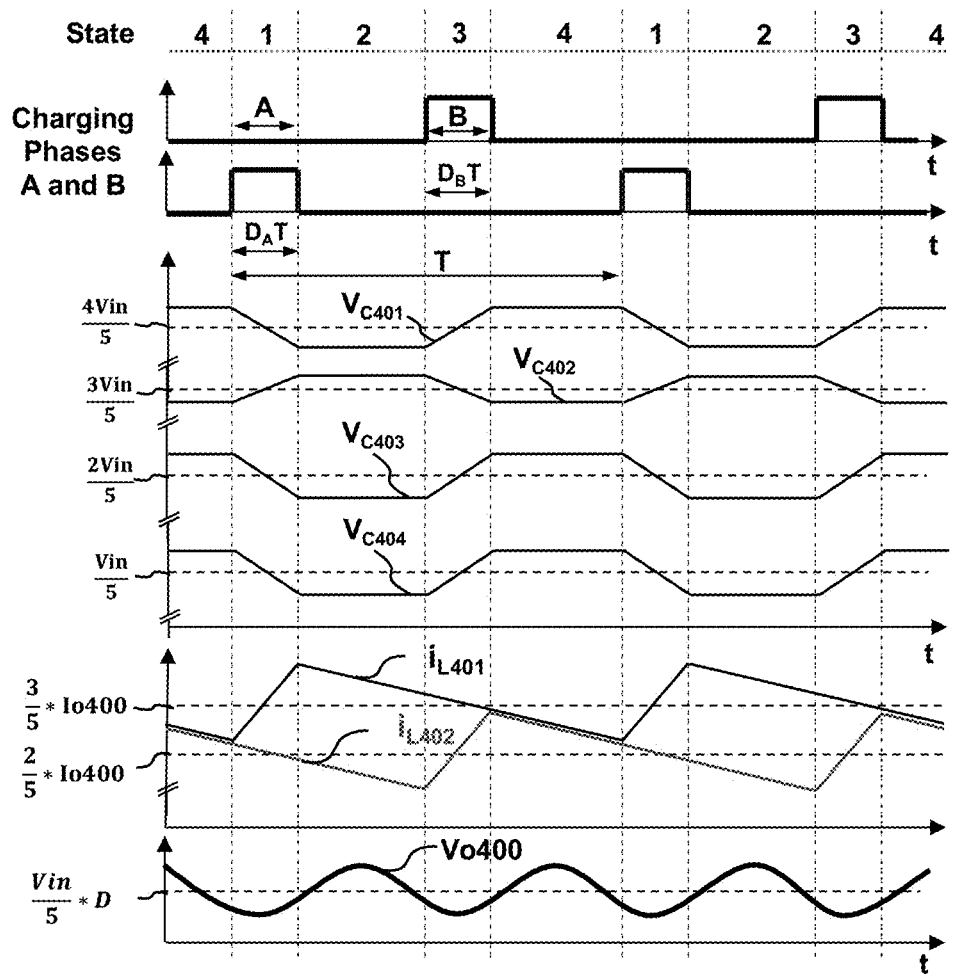
FIG. 4E – Operational Waveforms

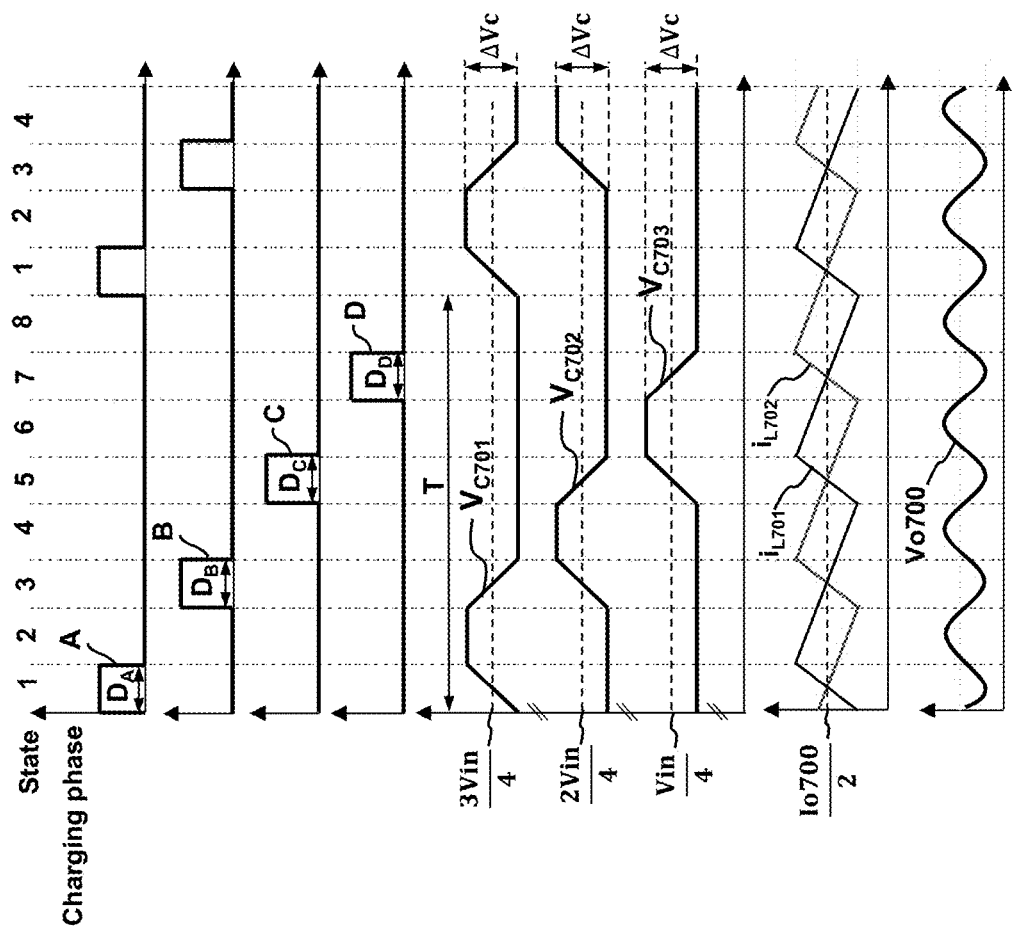
FIG. 7B – Multi-phase operation – Normal ABCD sequence

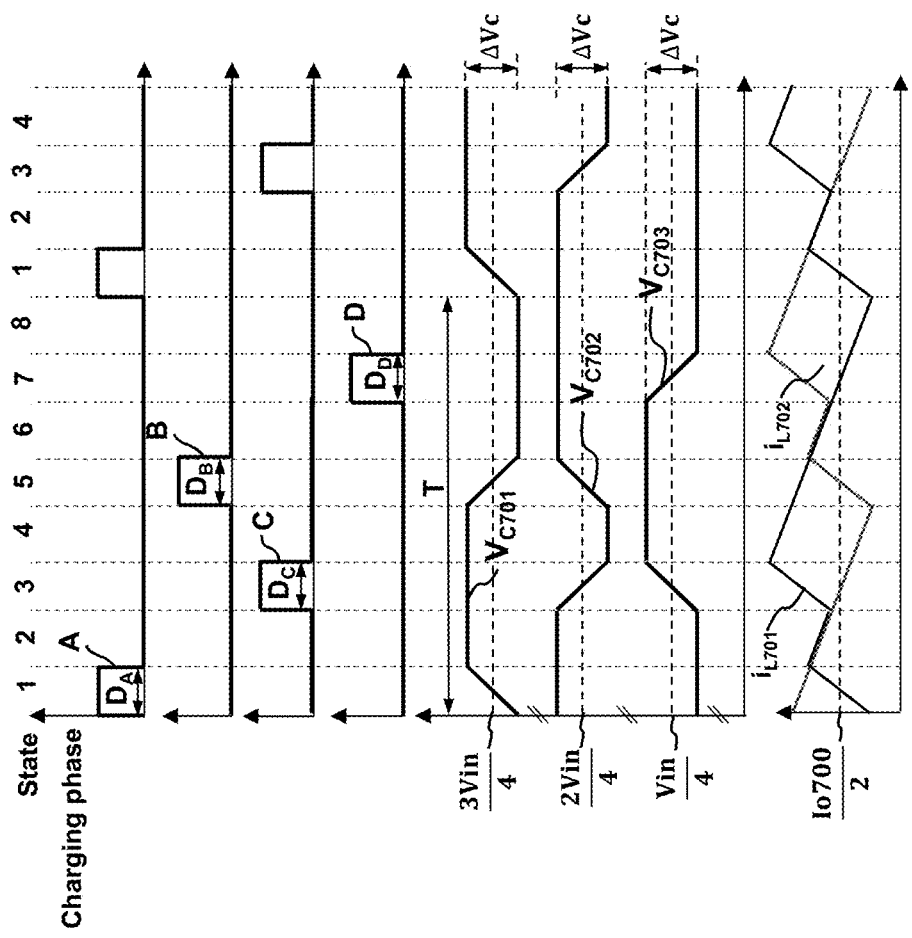
FIG. 7C – Multi-phase operation – ACBD sequence

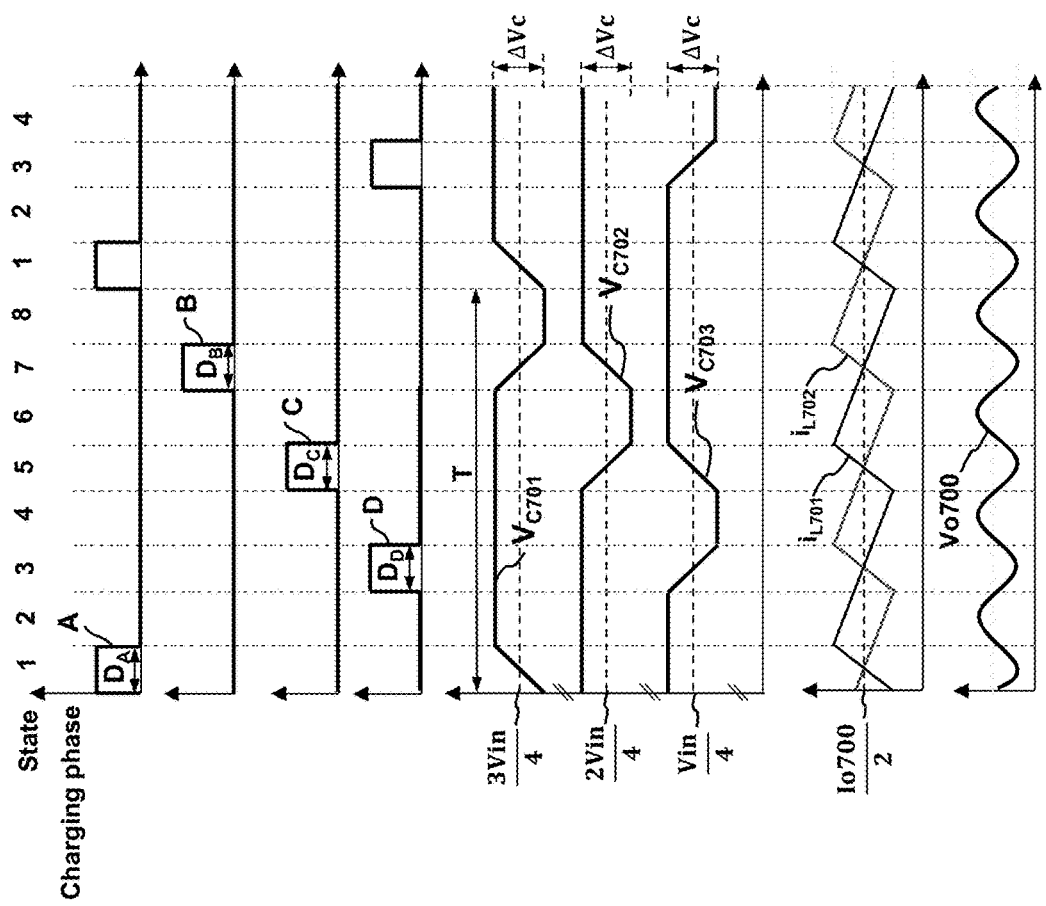
FIG. 7D – Multi-phase operation – ADCB sequence

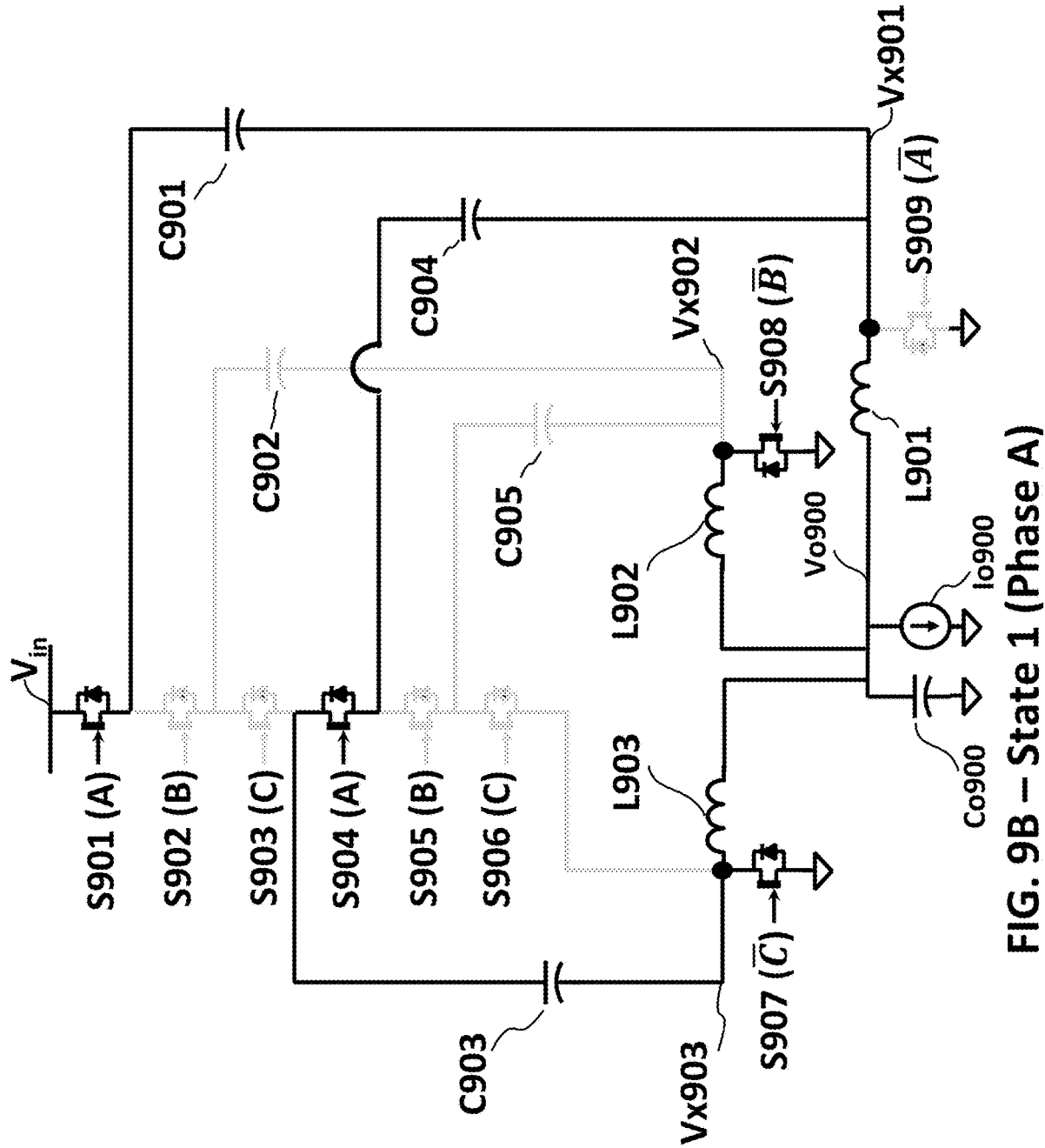
FIG. 9B – State 1 (Phase A)

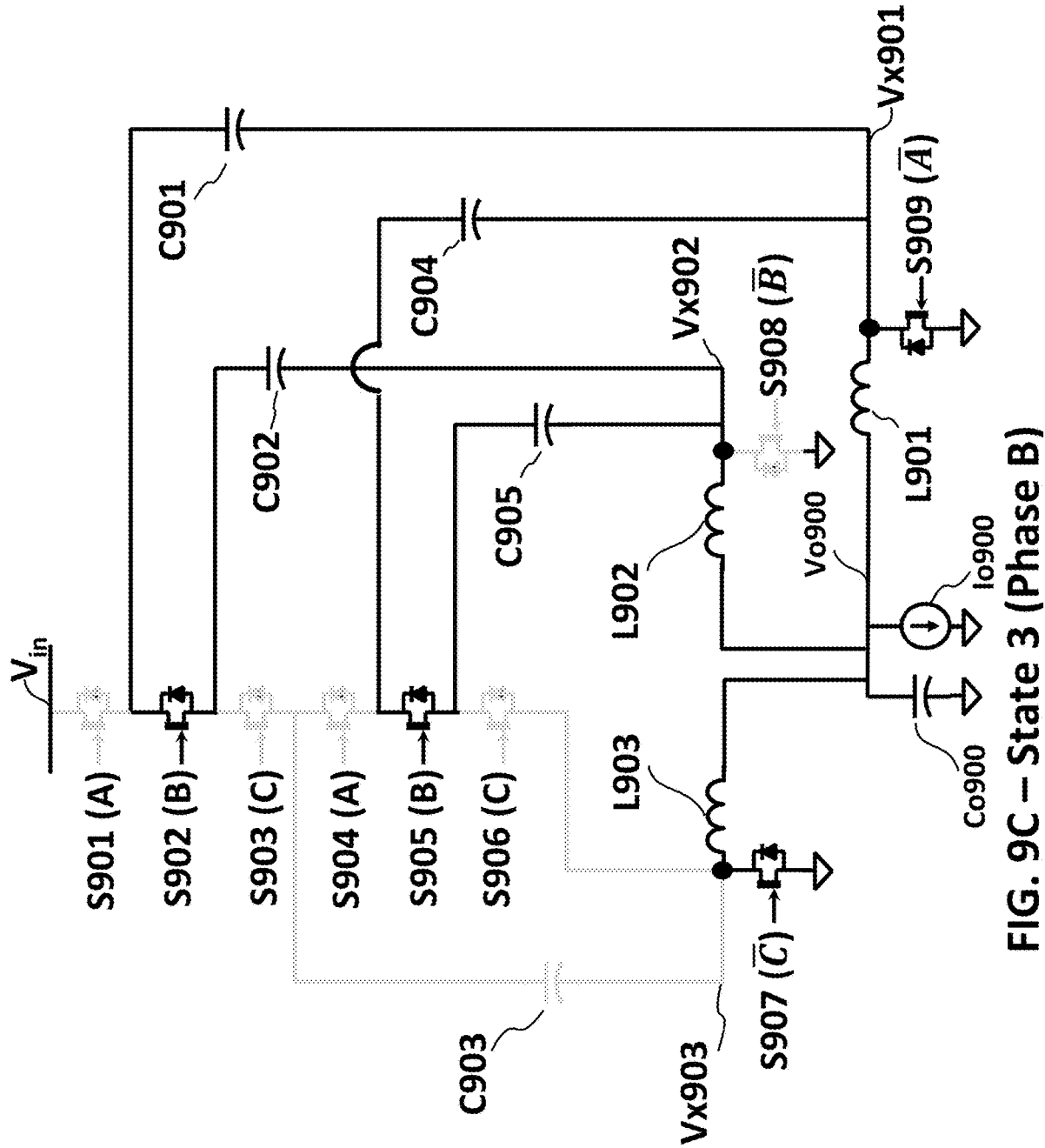
FIG. 9C – State 3 (Phase B)

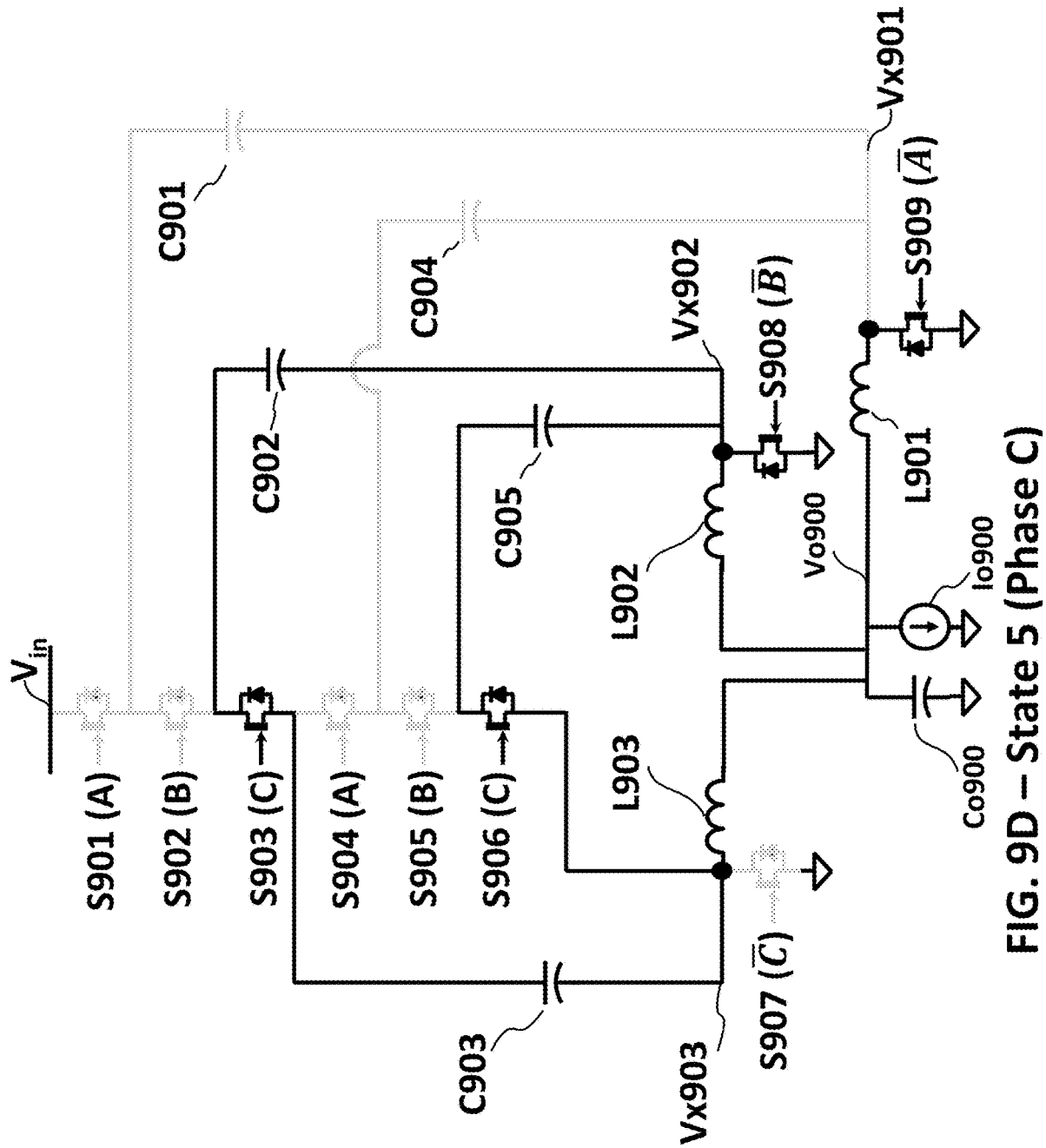
FIG. 9D – State 5 (Phase C)

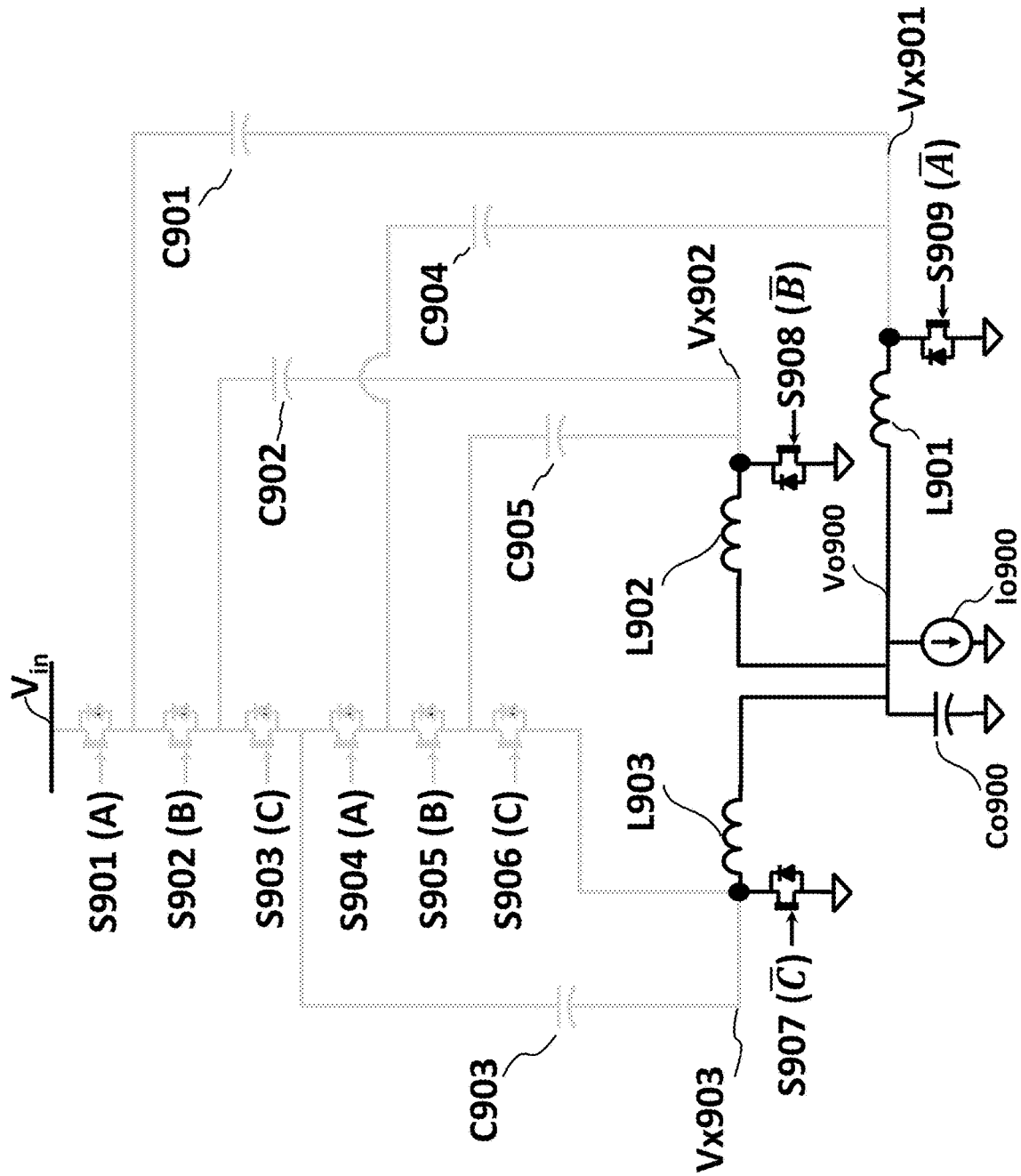
FIG. 9E – States 2, 4, and 6

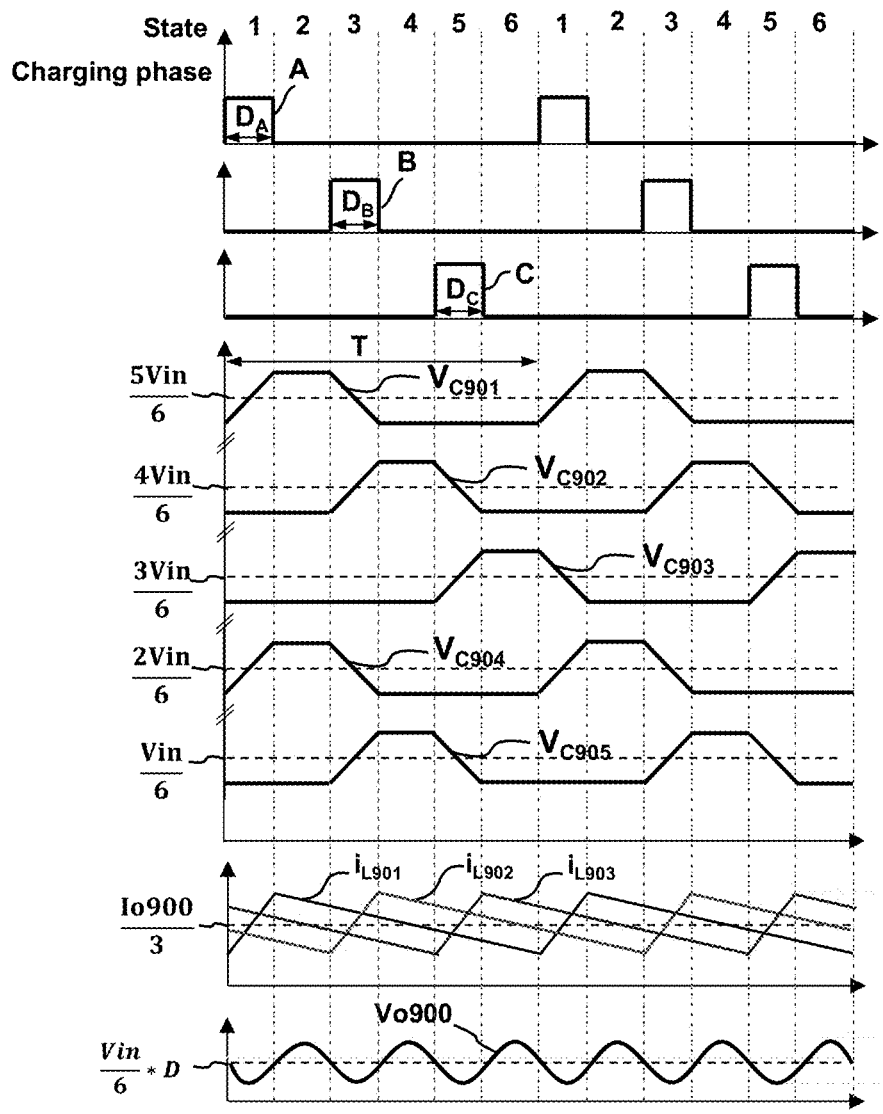
FIG. 9F – Operational waveforms

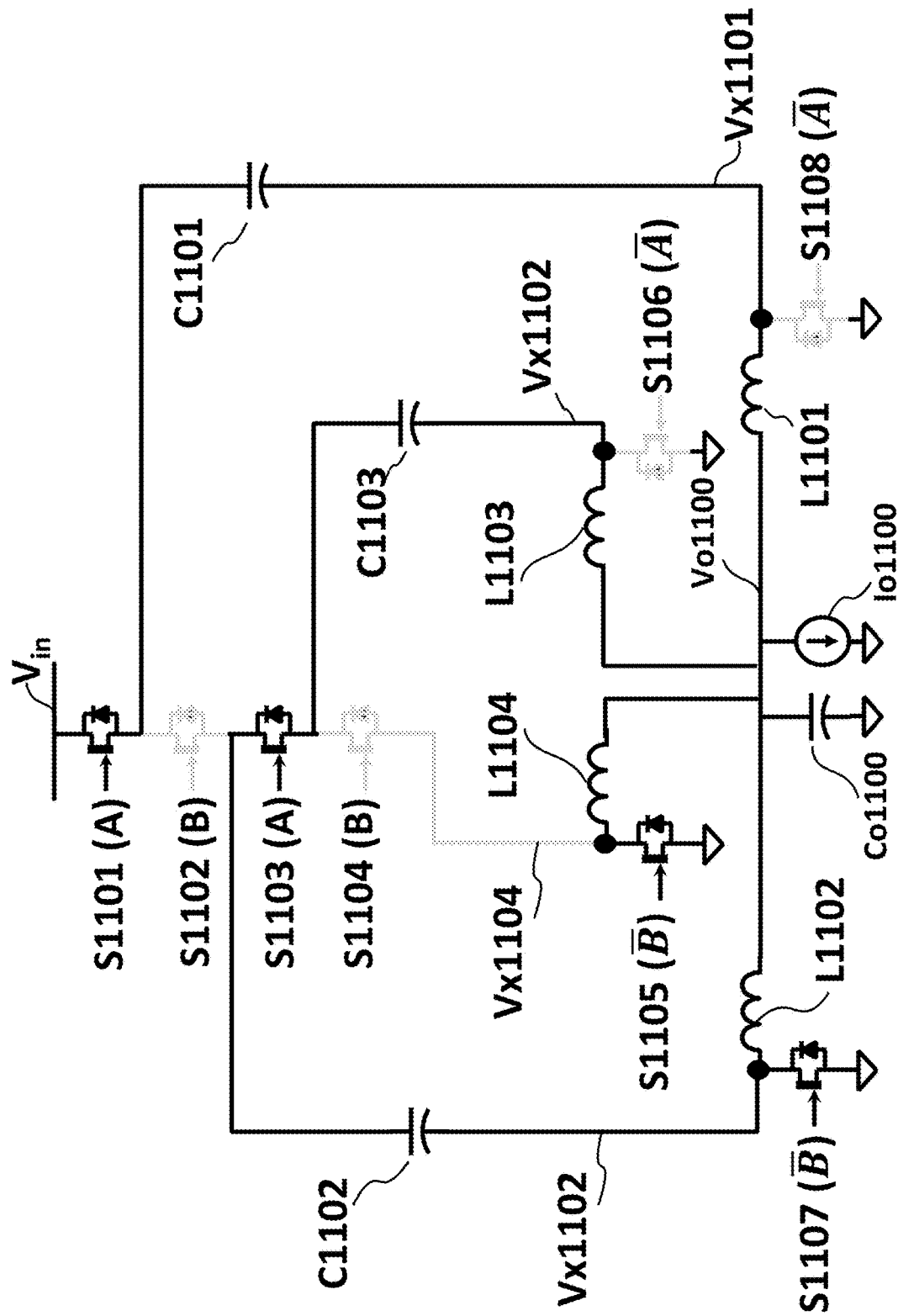
FIG. 11B – State 1 (Phase A)

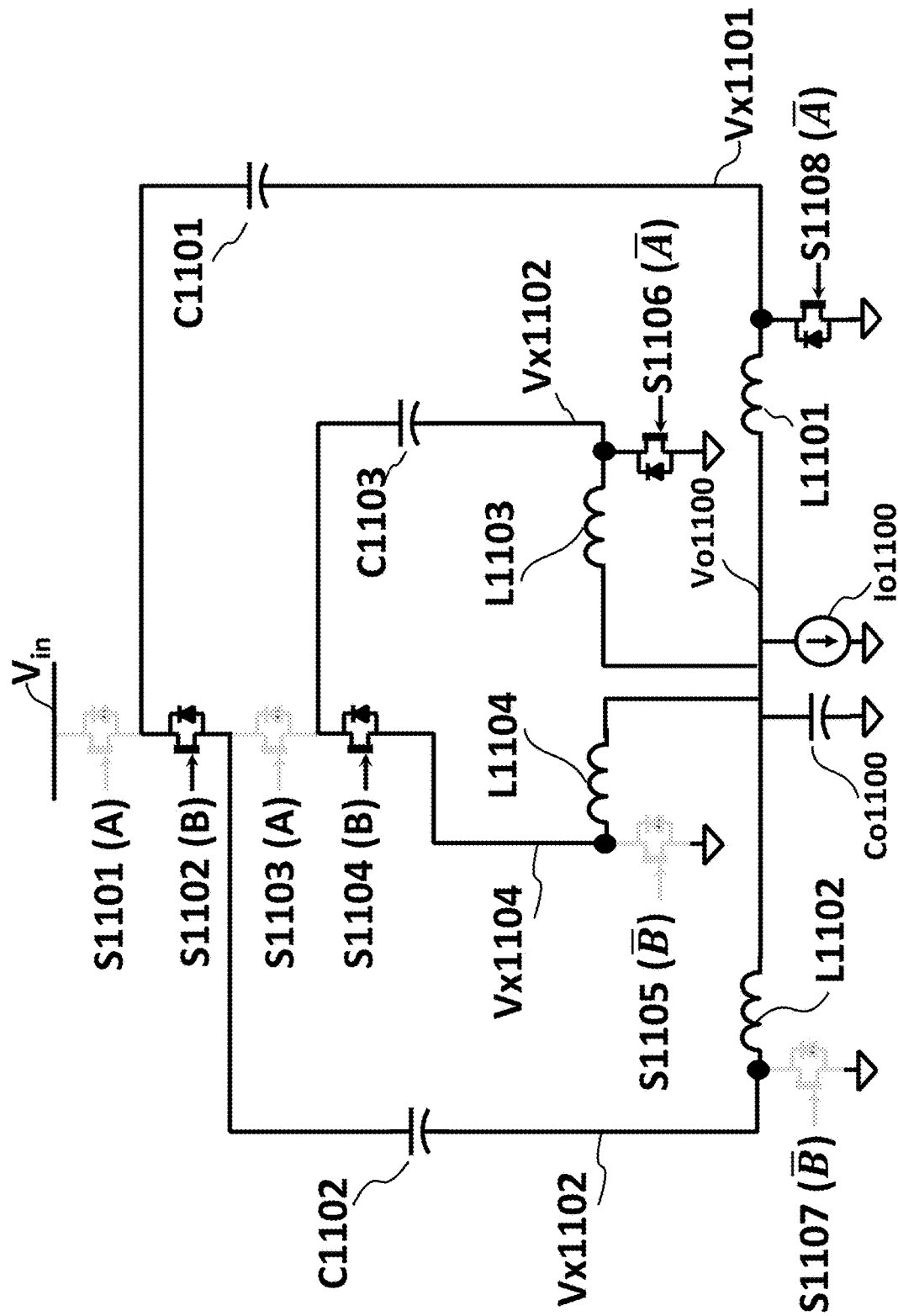
FIG. 11C – State 3 (Phase B)

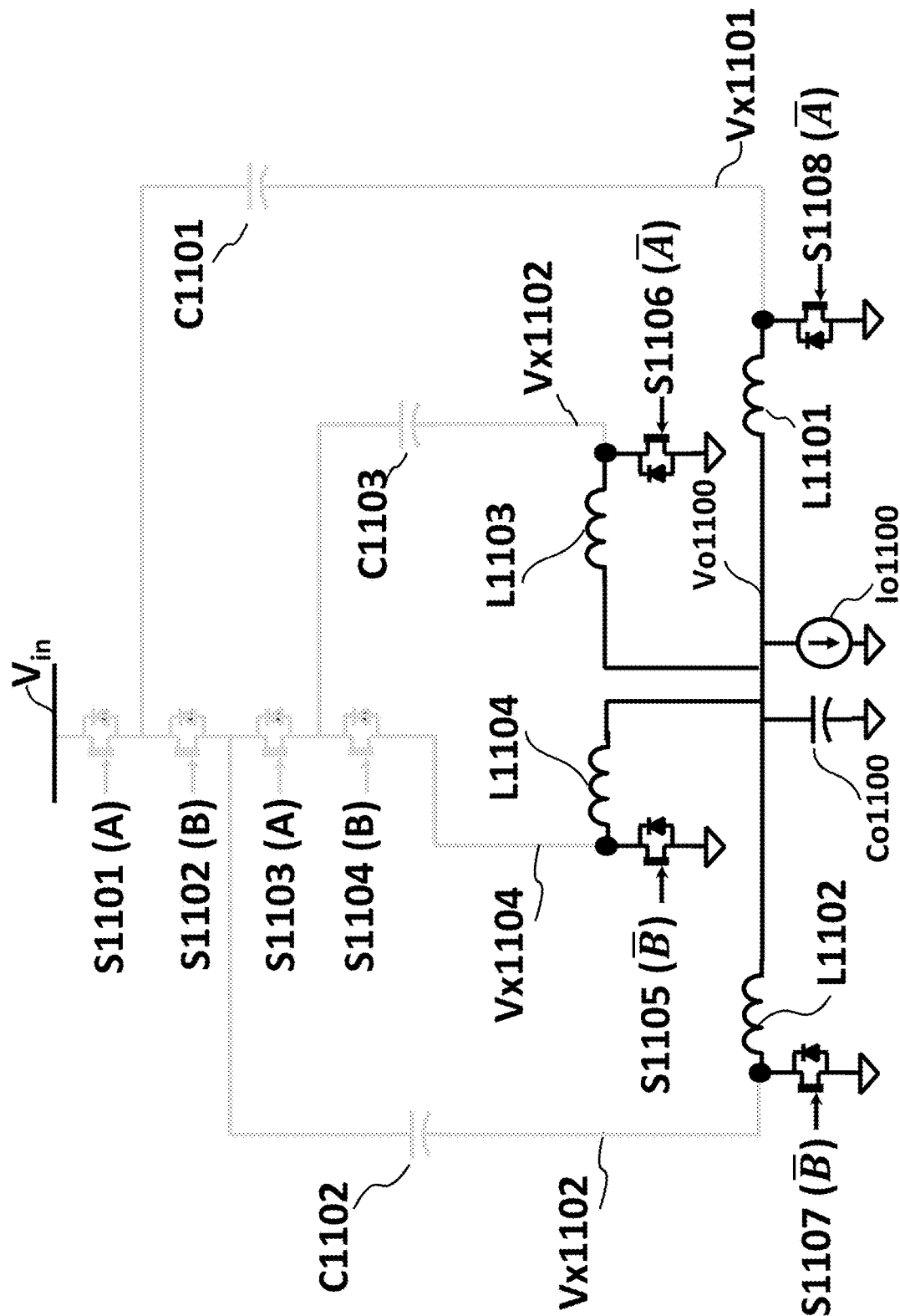
FIG. 11D – States 2 and 4

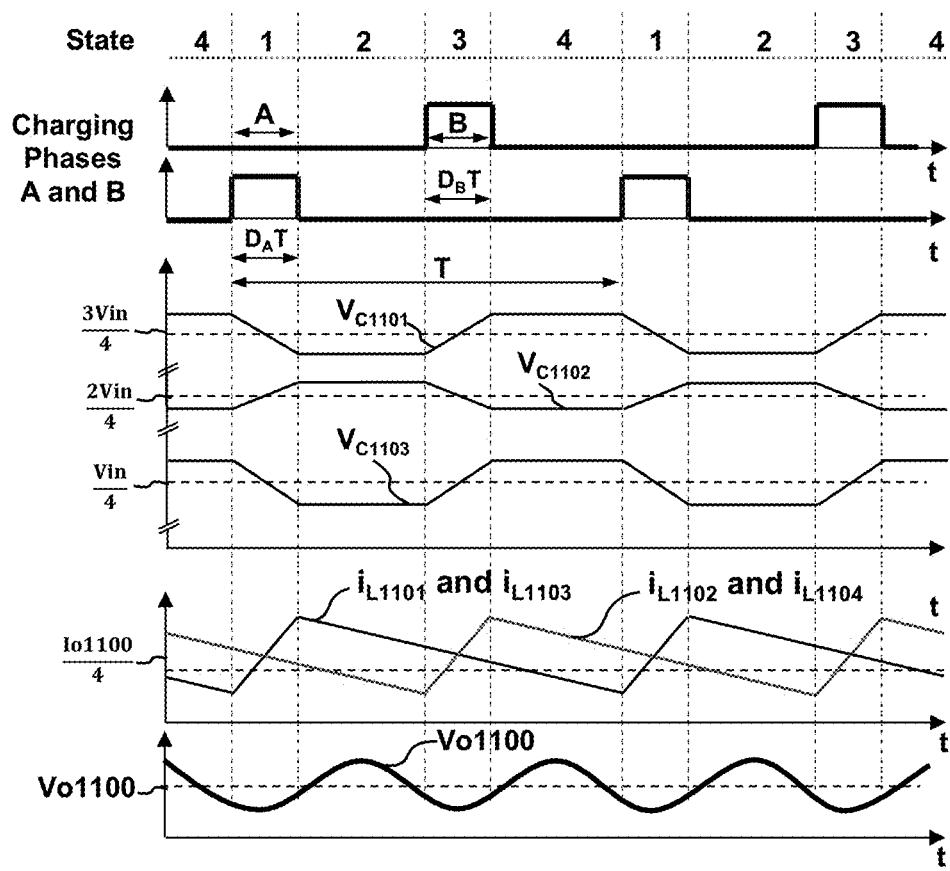
FIG. 11E – Operational Waveforms

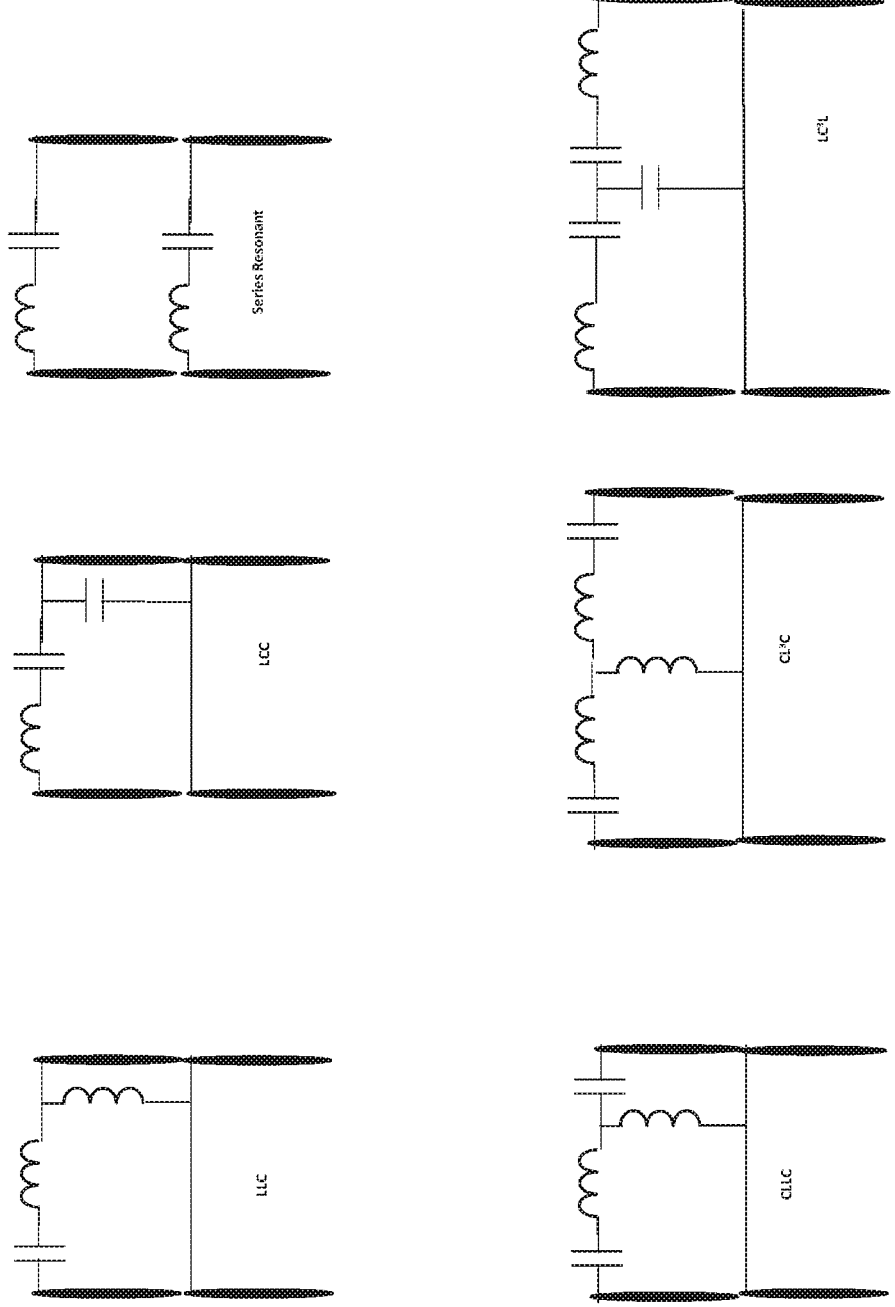
FIG. 13B (Examples of Resonant Network)

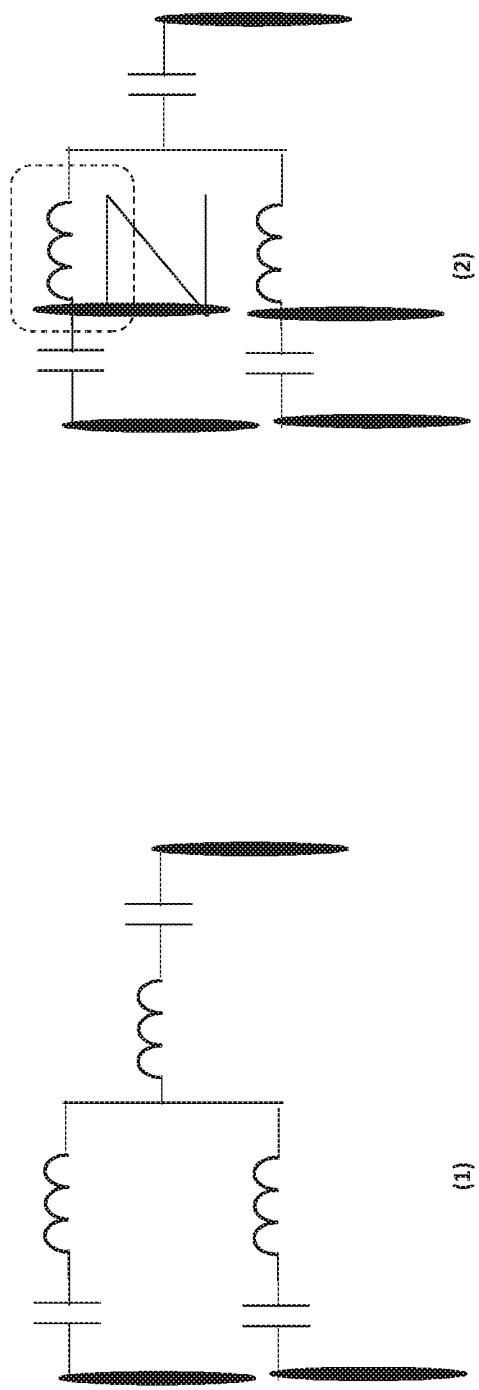
FIG. 13C (Examples of Impedance Control Network or ICN)

Switched-Capacitor Network
(Dickson, Ladder, Series-
Parallel, FCML, etc.)

HYBRID CONVERTER FAMILY AND METHODS THEREOF

CROSS-REFERENCE TO RELATED APPLICATIONS

This application claims the benefit of U.S. provisional application No. 62/717,574 entitled "Hybrid Converter Family for Large Conversion Ratios and Methods Thereof" and filed Aug. 10, 2018; U.S. provisional application No. 62/717,572 entitled "Switched Capacitor Inverting Network for Large Conversion Ratio Converters and Method Thereof" and filed Aug. 10, 2018; and U.S. provisional application No. 62/717,577 entitled "Multi-Output Hybrid Converter and Method Thereof" and filed on Aug. 10, 2018, each of which is hereby incorporated by reference as though fully set forth herein. This application is also related to U.S. application Ser. No. 16/538,796 entitled "Multi-Output Hybrid Converter and Method Thereof" and contemporaneously filed with this application on Aug. 12, 2019, which is also incorporated by reference as though fully set for the herein.

TECHNICAL FIELD

The present disclosure relates to a hybrid converter architecture family that provides an efficient output voltage regulation for large conversion ratios.

BACKGROUND

Data center network around the world has become the backbone of online information whose traffic is estimated to triple from 4.7 ZB/year in 2015 to 15.3 ZB/year in 2020. To support storing and instantly providing information at customers' request, data center power consumption is expected to be ~73 billion kWh in 2020, equivalent of ~$7.3 billion cost of electricity, in the U.S. alone. These numbers could increase because of soaring demands for online data and cloud computing. It has become apparent that simply building similar data centers at the same growth rate with needed data traffic would not be desirable in both technical and economic terms. However, many data center companies have still been building data centers based on existing architectures with only local advanced improvements at sub-system levels to reduce implementation risk, and avoid more high-risk-high-reward approaches. The problems are that 1) the traditional power delivery accounts for ~15% of the total power consumption, i.e. ~11 billion kWh or $1.1 billion, is pure dissipation because of inefficiency in power conversion stages, and 2) replicating current data center setup would require the land spent for a data center to grow exponentially together with the amount of data that it needs to process. As the result, the cost of land for data centers would dominate and make the Total Cost of Ownership (TCO) prohibitively expensive. To this point, in order to grow data center capacity with maximized land utilization and minimized cost in hosting physical servers, new data centers would have smaller server rack units to fit in smaller spaces to increase server and data density. This space limit, in turn, incurs a grand challenge of power distribution and thermal management in data center. Inefficient power distribution and management will need massive cooling efforts, leading to both additional area and power consumption caused by cooling devices, and inevitably higher cost.

In order to address this grand challenge, radically different power distribution and management solution could enable future green data centers. New power converter topologies and digital control that efficiently delivers the power all the way from AC grid down to processor core voltage that is compact, scalable, highly-efficient, low-heat, low-cost, and reliable would be desirable. This new architecture, when successfully developed, will help reduce energy consumption, carbon footprint, cooling and water impact for data centers. It, particularly its new sub-system topologies and control, can also be applied to many other different IT systems, e.g. in automotive, communication stations, LED drivers, portable applications, etc., to achieve system compactness, high efficiency, scalability and low cost.

In this AC grid-to-core power delivery architecture, the key to achieve the above requirements, especially high efficiency and small size, is to reduce the number of conversion stages with new, efficient converter topologies and control. Ideally, from the AC grid there should be only two power conversion stages, one AC-DC stage to rectify the input currents and one DC-DC converter stage to provide a regulated voltage for the loads. Since the loads, e.g. microprocessors in data centers, require a very high current at low voltage, e.g. 600 A at 1 V, the DC-DC converter is often placed as close to the loads as possible to reduce $I^2R$ conduction loss to convey the current from the DC-DC converter output to the loads. This converter is often referred as point-of-load (PoL) converter.

An important system consideration is to decide the bus voltage at the input of the POL converter, i.e. output of the AC-DC stage. Traditionally, this POL converter receives 12V bus voltage and provides ~1V output. As output power requirements increase rapidly, the input current distribution becomes a bottle neck in the whole system. For example, the 12V-to-1V conversion only reduces the input current by ~12 times, leading to a stress of distributing 50 A input current distribution for a 600 W load, or 100 A input current for 1.2 kW load. This high input current distribution incurs prohibitively high cost and complexity for board implementations. In addition, a low DC bus voltage imposes stress on the AC grid-to-DC bus to cover a large conversion ratio. To reduce the stress, this conversion stage is currently implemented using multiple stages with the cost of efficiency degradation.

There is a clear benefit of increasing the input voltage of the POL converter stage to reduce its input current distribution and relax the AC grid-to-DC bus conversion ratio so that it can be efficiently implemented in a single stage. Started from Google, then HP, and Microsoft, prominent companies in data center infrastructure have initiated a new architecture where DC bus voltage is increased to nominally 48 V instead of 12 V. The uninterruptible power supply (UPS) energy storage is moved from a centralized location at high voltage to being distributed at the load rack level at 48 V using Li-ion batteries. The UPS distributed close to the loads enables faster response and load stability protection against both load and input surge transients. More importantly, it allows convenient and cost-effective modular scalability for both load and storage.

To exploit all these benefits of the new power distribution system with high DC bus voltage, it is critical to have a POL converter that can support large conversion ratios, achieves both high efficiency and high power density, i.e. requiring a small implementation space.

SUMMARY

In various implementations, methods and circuits of a hybrid converter family are provided that allow using a combination of a switched multiple capacitor network and a number of inductors in order to provide a power conversion from an input to an output that may require a large conversion ratio, high output current, low output voltage, and/or high input voltage. The disclosed circuits and methods can be applied to today's switching regulators and allow them to provide the same power conversion function with less number of power conversion stages, smaller passive components, and less number of active components, and therefore, reduce the implementation space to save cost as well as improve efficiency. Sample applications include, but are not limited to, point-of-load power converters for data centers, telecommunication systems and other high-performance electronic systems.

In one implementation, for example, a hybrid converter circuit is provided comprising a pair of input terminals adapted to be coupled to a circuit input and a pair of output terminals adapted to be coupled to a circuit output. A switched multiple capacitor network is coupled to a first input terminal of the pair of input terminals and a plurality of output terminals of the switched multiple capacitor network; and a plurality of switched inductors are coupled in series with the switched capacitor network between the output terminals of the switched multiple capacitor network and a first output terminal of the pair of output terminals. An inductor in the group of switched inductors is coupled directly to at least one capacitor in the switched multiple capacitor network.

Some embodiments include DC-DC converters which take DC voltage at one node an provide lower level output voltage at another node. In some embodiments, there are networks comprising switches, capacitors and coupled inductors which can block most of the input voltage and generate a lower level output voltage. In some embodiments, DC-DC converters can operate in two phases. In some embodiments, the number of phases in the DC-DC converters can be extended to higher numbers. In some embodiments, lower level switches of the switched-capacitor networks can be replaced with diodes. In some embodiments, the inductors used in the converters can be configured into multiple configuration. Based on similar configuration, all the inductors are configured to couple each other and utilize for less power loss of the converter. In some embodiments, switches and capacitors in the converters may have multiple configurations. In some embodiments of a voltage regulator, the output voltage of the voltage regulator is determined based on the predetermined duty cycle, operating frequency, or specific timings of the power switches.

Inverting network can drive transformer or resonance network symmetrically. In some embodiments, multiple networks can be used to drive transformers or resonance networks symmetrically. In some embodiments, lower level switches of the inverting networks can be replaced with diodes. In some embodiments, presented inverting networks can be operate in multiple modes affecting the operation of the whole converter.

There has thus been outlined, rather broadly, example features in order that the detailed description that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various example features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2B to 2D illustrate the operational states of the converter in FIG. 2A. FIG. 2E shows the timing diagrams, inductor current waveforms and output voltage waveform of the converter FIG. 3B to 3D show the states of the converter over a period of operation. The converter in FIG. 3A is also an even-level DIHC.

FIG. 4A to 4D show the operational states of the converter and FIG. 4D shows its operational waveforms.

The figure series of FIG. 7x illustrates how an even-level DIHC can be operated in multiphase operations.

FIGS. 7B, 7C, and 7D shows the operational waveforms of the converter in FIG. 7A that operate in different sequences of the 4 inductor-charging phases. FIGS. 7B, 7C, and 7D illustrates phase sequences A-C-B-D, A-C-B-D, and A-D-C-B, respectively.

FIG. 9B to 9E shows the converter operational states and FIG. 9F shows the operational waveforms.

FIGS. 11A-11E illustrate the converter in FIG. 10 with a sample dual-phase assignment for the switch operation. The converter has four operational states and 2 inductor-charging phases. FIG. 11E shows its operational waveforms along with operational states in FIGS. 11B, 11C and 11D.

FIG. 13B illustrates examples of resonant networks that can be used for the inductive network in FIG. 13A.

FIG. 13C illustrates examples of impedance control network (ICN) that can be used for the inductive network in FIG. 13A.

FIG. 15A shows an example converter having 3 flying capacitors in the SC network to generate 4 levels, and 4 inductors divided into two groups of coupled inductors while FIG. 15C shows an extension of the invention with two groups of more coupled inductors in the inductive network.

FIG. 15B and FIG. 15D shows the timing diagrams and important waveforms of the voltage regulator presented in FIG. 15A and FIG. 15C, respectively.

FIG. 18C is a multi-level extension of a network while FIG. 18A is a relatively simple implementation. FIG. 18B shows example timing diagrams of the voltage regulator presented in FIG. 18A and FIG. 18D shows example timing diagrams of the multi-level extended version in FIG. 18C.

FIGS. 27A-27B, 28A-28B, 29A-29B, and 30A-30B show example circuits comprising series capacitor tapped inductor Buck converters as an inductive stage.

DETAILED DESCRIPTION

Figure 1A:
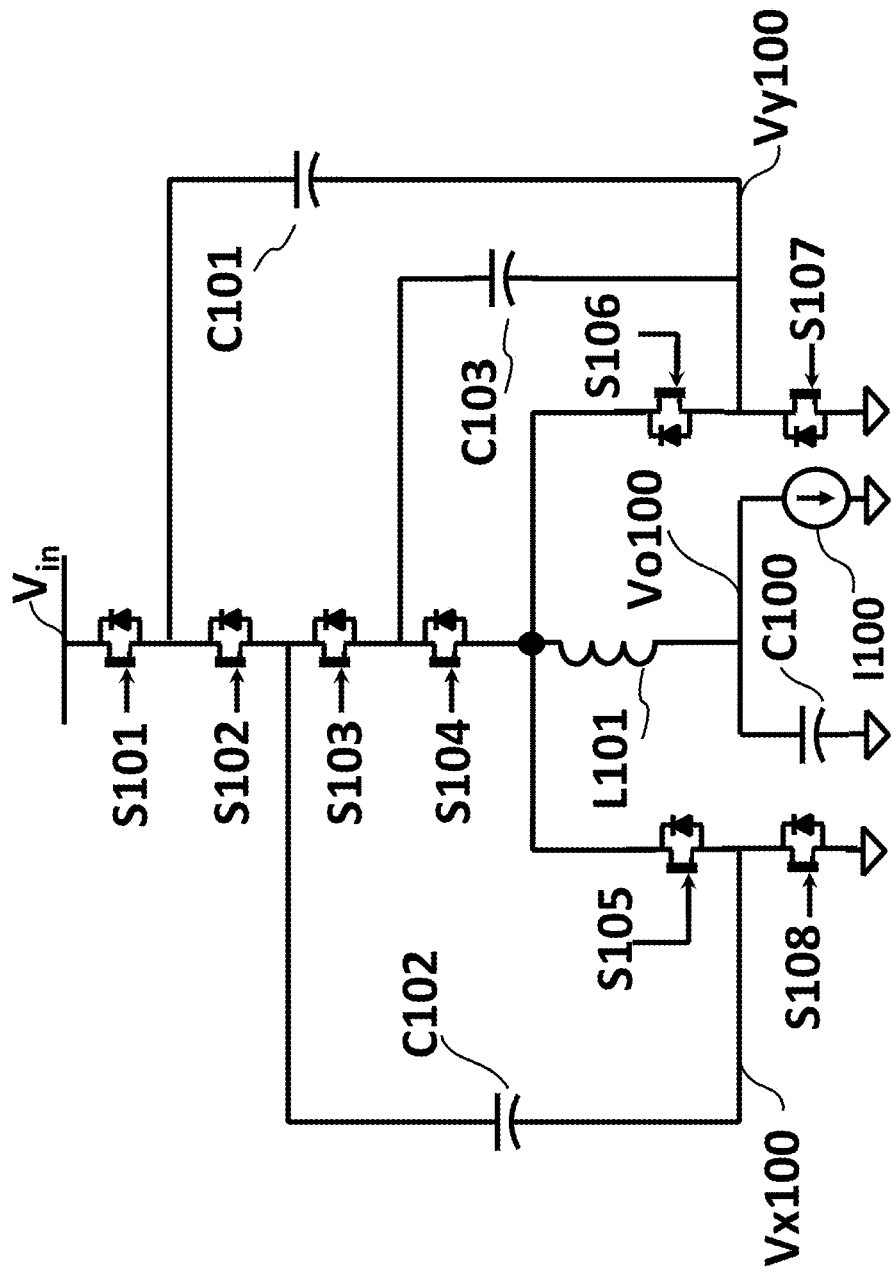
FIG. 1A illustrates a Hybrid Dickson Switched-Capacitor Converter, and FIG. 1B includes the timing diagrams for the switch operation along with the inductor current waveform.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

With drastically increasing demands for cloud computing and big data processing, electric energy consumption of data centers in the U.S. is expected to reach 73 billion kWh by 2020, as reported in the 2016 report entitled "United States Data Center Energy Usage Report" by Arman Shehabi et al. at the Lawrence Berkeley National Laboratory. This power consumption accounts for ~10% of the U.S total electric energy consumption. A large portion of this consumption is caused by losses in inefficient power delivery architectures that require a lot of attentions and improvements. As the required distribution currents keep increasing for more demanding digital loads, the conventional 12-V bus architecture has exposed higher losses, complexity, and cost for interconnects in power delivery network. To address these issues, the 48-V bus architecture has emerged to be a new industry standard, employed by Google, HP and other prominent data center designers and users.

The key challenge in this architecture is the design of voltage regulator module (VRM) for the large conversion ratio from 48 V to core voltages, i.e. ~1-1.8 V achieving high efficiency and high power density for installations in the vicinity of processors. To deal with the challenges in the 48-V VRM, new ideas and improvements have been proposed and implemented. In a 2017 publication entitled "48-V Voltage Regulator Module With PCB Winding Matrix Transformer for Future Data Centers" on the IEEE Transactions on Industrial Electronics, Mohamed H. Ahmed et al. proposed a two stage 48-V VRM architecture using a 48-12-V LLC converter, which uses matrix transformer to achieve 850 W/in$^3$ power density, cascaded by 12-1.8-V multiphase buck converters. Although straightforward implementation is a benefit of this work, its efficiency is limited to 91% because of the two cascaded stage structure.

To overcome limited efficiency of two stage structure, hybrid converters bridge the large conversion ratio by efficient utilization of passive components. The 7-level flying capacitor multilevel (FCML) converter, reported in the conference paper entitled "A 48V:2V flying capacitor multilevel converter using current-limit control for flying capacitor balance," in 2017 IEEE Applied Power Electronics Conference and Exposition (APEC) by Jan S. Rentmeister and Jason T. Stauth, converts 48 V to 2 V using 12+1 switches, 5 flying capacitors, and 1 output inductor. While in N-level multilevel converters the inductor can be significantly reduced compared to a conventional Buck converter counterpart, it requires 2(N-1) switches, half of which experience the output current in operations, leading to large conduction losses in low-voltage high-current applications such as in data centers.

Figure 1B:
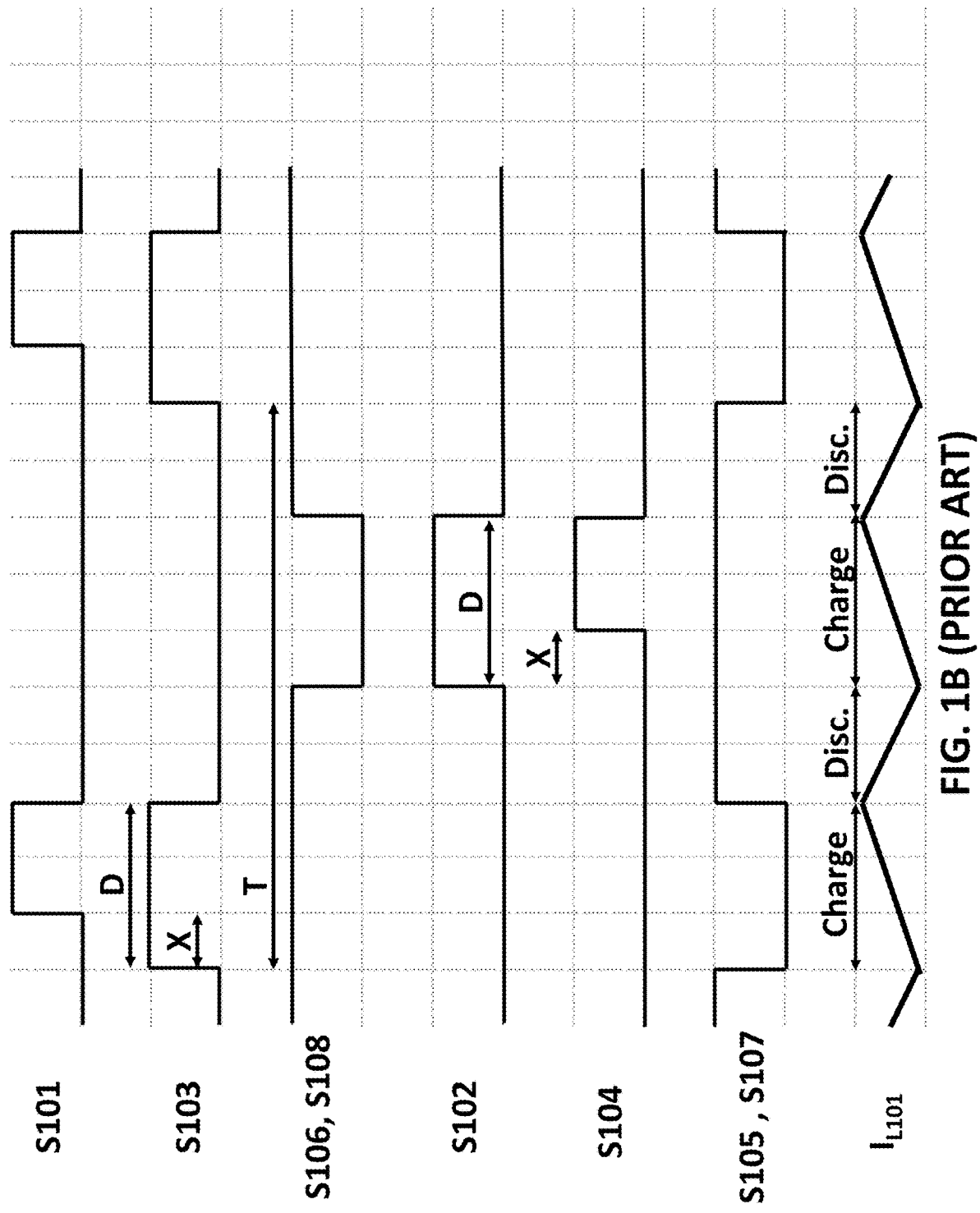

Another hybrid converter based on Dickson switched capacitor, reported by Yutian Lei et al. in the paper entitled "Split-Phase Control: Achieving Complete Soft-Charging Operation of a Dickson Switched-Capacitor Converter" in the IEEE Transactions on Power Electronics, Vol. 31 in January 2016, can be a potentially better candidate for the 48-V VRM thanks to reduced switch voltage and current stresses, and efficient charge delivery performance. The operation in this converter, however, only supports a fixed conversion ratio of 8-to-1. Particularly, it converts 150 VDC input to 18 VDC output without fine output voltage regulation. Using this converter would requires another regulator in series to regulate the output voltage at different input voltage, leading to efficiency degradation. Wen-Chuen Liu et al. followed this architecture and added fine output regulation in the paper "A 94.2%-Peak-Efficiency 1.53 A Direct-Battery-Hook-Up Hybrid Dickson Switched-Capacitor DC-DC Converter with Wide Continuous Conversion Ratio in 65 nm CMOS" published at the 2017 International Solid-State Circuits Conference in San Francisco in February, 2017. The circuit shown in in FIG. 1A follows the architecture in this prior art to construct a hybrid Dickson switched-capacitor (SC) converter that uses a single inductor at the output and a split-phase operation to achieve complete soft-charging for the flying capacitors. The switch control signals for the converter are shown in FIG. 1B, where the gate signal S101 that would be the same phase with S103 in a normal Dickson converter has rising time delayed/split by X. Considering all same values for the flying capacitors, the value of X depends on the number of separated flying capacitors and thus the number of levels in the switched-capacitor (SC) network. For example, with the 3 flying capacitors C101, C102, and C103 and thus 5 levels, i.e. including the zero level, in this circuit, X can theoretically be determined as 25% of duty cycle D. The shortcomings of this converter are exposed in low-voltage high-current applications, e.g. popular in for point-of-load (POL) applications in data center and telecommunication systems, that require large conversion ratios and thus small duty cycle. Reduced duty cycle D by itself causes difficulty in timing control of all the switches. The split phase operation only makes it worse by requiring only a fraction of D. If not accurately controlled, soft charging for the capacitors are not achieved, leading to efficiency degradation. In addition, it is undesirable that this converter topology require all four bottom switches S105, S016, S017 and S108 to be on at the same time to discharge/freewheel the inductor current. They all together conduct the output current, while upper switches S101, S102, S103, S104 only need to handle the input charge.

Each of the above-mentioned publications and patents is hereby incorporated herein by reference in its entirety.

In this document, we disclose a new hybrid converter topology family that leverage benefits of co-operating inductors and capacitors in switching hybrid conversion and overcome drawbacks in prior arts.

Figure 2A:
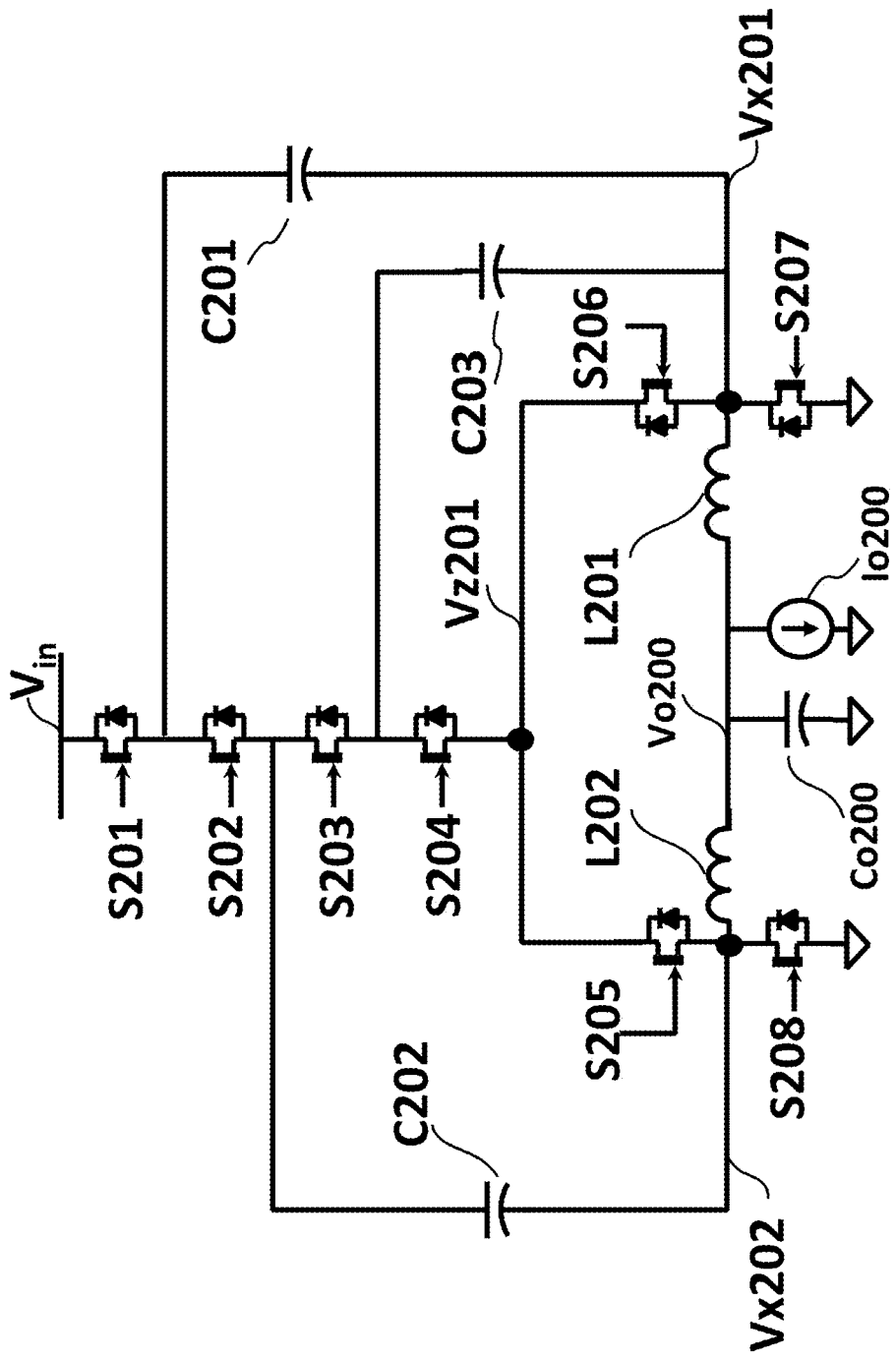
In FIG. 2A illustrates an example of initial version of Dual Inductor Hybrid Converter (DIHC).

Instead of connecting one inductor at the output of a Dickson SC converter at node Vz201, two inductors can be used to connect to the two switching nodes Vx201 and Vx202. FIG. 2A shows this new converter configuration. Since it uses two inductors operated in an interleaving manner, this converter and its other versions are called dual-inductor hybrid converter (DIHC). The converter is operated in 4 states as shown in FIG. 2E. FIGS. 2B, 2C and 2D shows the converter configurations in these 4 operating states, in which State 1 and 3 are also charging phases A and B, respectively. FIG. 2E shows the operational waveforms of the circuit.

In steady-state operations, the average bias voltage of flying capacitors C201, C202, and C203 are $$\frac{3V_{in}}{4}, \frac{2V_{in}}{4}, \text{ and } \frac{V_{in}}{4},$$

respectively. In State 1 shown in FIG. 2B, Switches S201, S203, and S208 are turned ON while the other switches are OFF during the time $D_A*T$, biasing node Vx201 theoretically at $$\frac{V_{in}}{4}.$$

$D_A$ is the ON duty cycle of S201 and S203, and T is operating period. Inductor L201 is therefore charged by the difference between $$Vx201 = \frac{V_{in}}{4}$$

and output voltage at Node Vo200. During $D_A*T$, this charge for L201 comes in form of currents that soft-charge C201 from the input Vin, and soft-discharge C202 to C203. As shown in FIG. 2C, State 3 (also phase B) lasts for $D_B$*T, where $D_B$ is the duty cycle of phase B. In State 3, S202, S204, S205, and S207 are ON while the other switches are OFF. This in turn biases node Vx202 at $$\frac{V_{in}}{4},$$

and therefore charging L202 by a voltage difference between $$Vx201 = \frac{V_{in}}{4}$$

and Vo200. At the same time, L202 also soft-discharges C201 to C202 and also soft-discharges C203. Note that the charges flowing to the inductors in phases A and B (states 1 and 3, respectively) also flows to the output Vo200 to charge output capacitor Co200 and satisfy the load current Io200. The inductors are discharged to the output when their associated bottom switches S208 and S207 are activated. Particularly, L201 discharges to the output in states 2, 3, and 4, while L201 discharges to the output in states 1, 2, and 4. In states 2 and 4 while both inductors are discharged, all flying capacitors C201, C202, and C203 are open circuited and inactive. The voltages over the flying capacitors, therefore, are unchanged during states 2 and 4, as shown in FIG. 2E.

For an intended operation and regulation at the output, $D_B$ is set equal to $D_A$, i.e. $D_A=D_B=D$. In addition, A and B are two non-overlapped phases that are charging the two inductors separately in an interleaving manner.

In one example, the best two nodes to connect the inductors are the two switching nodes Vx201 and Vx202 where the inductors are directly connected to the bottom plates for the flying capacitors, without any additional switches that would incur additional loss.

Figure 3A:
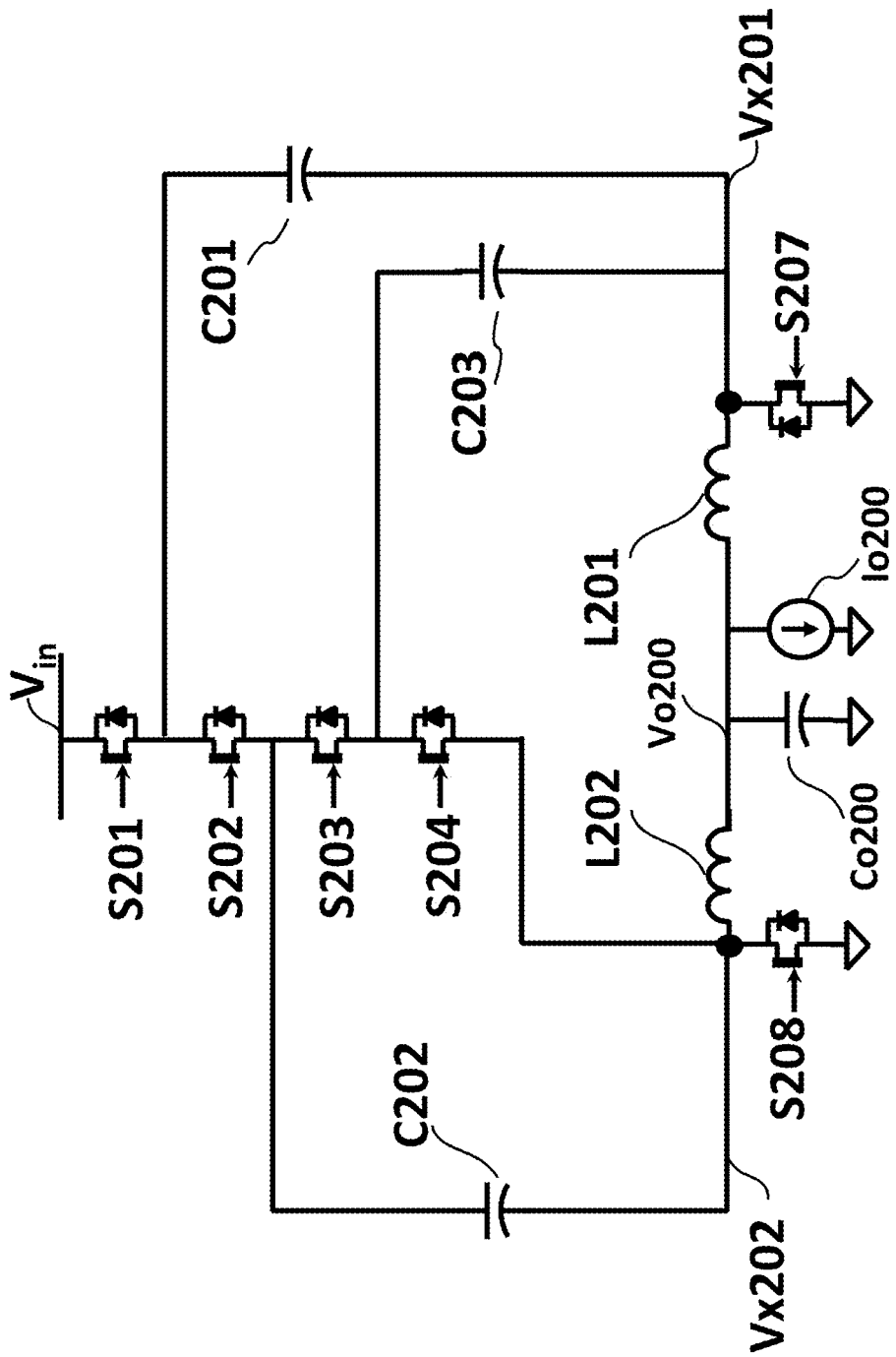
FIG. 3A presents an improved version of the DIHC in FIG. 2A that has the same key operation but with less number of power switches.

Reviewing the operation of the hybrid converter in FIG. 2, it can be recognized that 1) switch 206 always stay inactive, and 2) switches 204 and 205 always turn ON and OFF together. Therefore, switches 206 and 205 can be removed, allowing a more simplified and more efficient topology. This new topology is shown in FIG. 3A. This new topology is operated in the same manner as described above with only one difference that switch 205 is eliminated. Since it uses two inductors at the output, it is named dual-inductor hybrid converter (DIHC).

Compared with the state-of-the-art topologies described above, this new DIHC topology has a number of advantages. The topology has 2 switches less compared with the Hybrid Dickson SC topology, leading to smaller conduction loss and less control complexity. Output regulation can be done by simply controlling the duty cycle D, and thus the output voltage is theoretically set as $$Vo200 = \left(\frac{V_{in}}{4} * D\right).$$

As can be seen from this express and the operation of the converter, the switched-capacitor (SC) network in this topology divides the input voltage to 4 levels, including $V_{in}$, $$\frac{3V_{in}}{4}, \frac{2V_{in}}{4}, \text{ and } \frac{V_{in}}{4},$$

and only feeds a quarter of Vin to switch the inductors. Since the output inductors only experience a small fraction of the input voltage, inductors with much smaller values and sizes can be chosen for the same output current and voltage ripples. For example, compared with a conventional Buck converter this DIHC can allow 4 times smaller inductors. Since most difficult challenges in modern power converter design arise from magnetic/inductive components, this reduction implies significant benefits in size, board complexity, converter performance, and cost. In addition, the SC network also allows the power switches to handle only a fraction of input voltage. Particularly in the circuit in FIGS. 2 and 3, while S207 and S208 handles $$\frac{V_{in}}{4},$$

the remaining switches only need to block $$\frac{2V_{in}}{4},$$

enabling a choice of better switches with smaller breakdown voltage and smaller ON resistance. The converter, therefore, can have less conduction loss and higher efficiency.

Another key advantage of this technology is the built-in interleaving operation of the output inductors, i.e. in phase A and phase B, similar to a multiphase Buck converter. Interleaving operation is desirable, especially for applications demanding high output currents, since it brings several important benefits, including 1) lower input and output current ripples, 2) higher operating frequency of input and output capacitors, and thus significant reduction of input and output filtering capacitors, and 3) better load-transient performance.

Interleaving also enable spreading components and dissipation over the PCB areas and avoid hot spots. To exploit this advantage, a conventional interleaved Buck converter design would require a complex control to balance current distribution in the interleaved inductors. Imbalance inductor currents can lead to a runaway situation in which inductor currents keep diverging until heat builds up and damages one or more inductors of the interleaving structure. This is a well-known design challenge that has demanded a lot of designer time to deal with.

In this DIHC topology the two inductor currents are natively balanced and guaranteed to be free from the runaway issue because of the nature of charge transfer in the flying capacitors. In conventional inductive converter, the interleaved inductors are charged and discharged from low impedance sources, i.e. either input voltage, or the ground, or output voltage. Whereas, the DIHC inductors are charged and discharged in conjunction with the flying capacitors while the DIHC native operation converges to a steady state that the flying capacitors have charge balance over an operating cycle. The SC network in DIHC resembles and thus has this same characteristic as in a Dickson SC converter, reported in the journal entitled "On-chip high-voltage generation in MNOS integrated circuits using an improved voltage multiplier technique" published in the IEEE Journal of Solid-State Circuits in June 1976 by John F. Dickson. With the same duty cycle $D=D_A=D_B$ in the two charging phases, the two inductors are connected to the same number of capacitor branches and thus have the same average currents. In practice, there can be small difference in inductor current levels because of offset in duty cycle timing, mismatches in switch ON resistance, variations in component specifications, but the nature of capacitor charge balance in DIHC will guarantee no runaway issues. This allows a simple control for DIHC converter, which can be even simpler than one for popular multiphase Buck converter.

The DIHC converters shown in FIGS. 2 and 3 have 3 flying capacitors and 4 voltage levels including $$V_{in}, \frac{3V_{in}}{4}, \frac{2V_{in}}{4}, \text{ and } \frac{V_{in}}{4},$$

ignoring the zero level. Therefore it is also called 4-level DIHC. In this disclosure, it is categorized in the group of even-level DIHC, that will be described in more detail later.

Figure 4A:
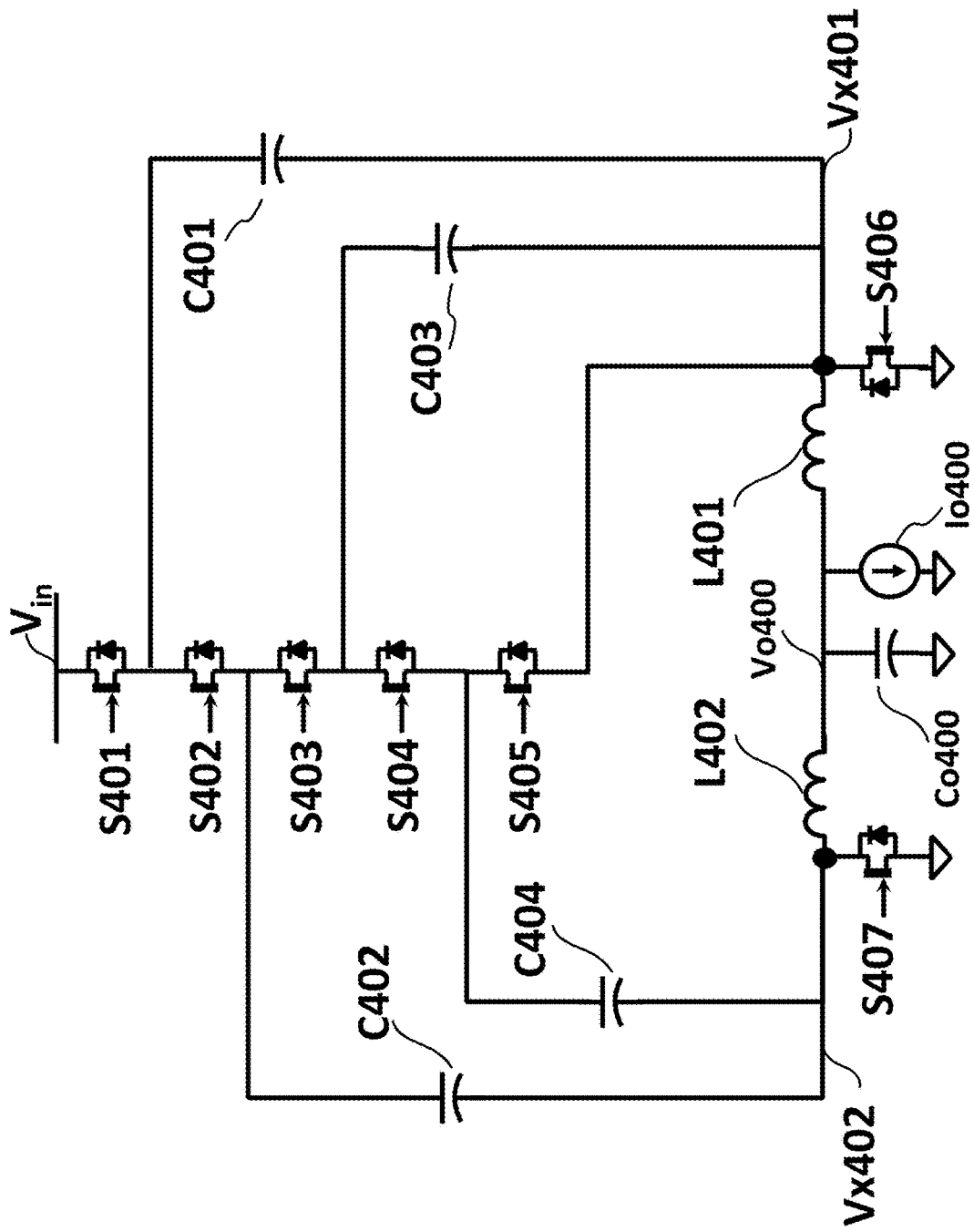
FIG. 4A presents an odd-level example of DIHC.

To further reduce the voltage fed into the output inductors, more flying capacitor stage can be added to the SC network. FIG. 4A illustrates a DIHC that has 2 inductors, 4 capacitors, and 7 switches. The SC network with 4 capacitors generates 5 voltage levels including $$V_{in}, \frac{4V_{in}}{5}, \frac{3V_{in}}{5}, \frac{2V_{in}}{5}, \text{ and } \frac{V_{in}}{5},$$

ignoring the zero level. Therefore, it is called 5-level DIHC. It can be operated in 4 states similar to the 4-level DIHC. Its operational states and waveforms are shown in FIGS. 4B, 4C, 4D, and 4E, similar to the 4-level DIHC described above. Because of the 5-level division with one more capacitor and one more switch, the output inductors in this 5-level DIHC experience smaller fraction of input voltage, i.e. only $$\frac{V_{in}}{5}$$

instead of $$\frac{V_{in}}{4}$$

the 4-level DIHC. Its bottom switches S206 and S207 handles $$\frac{V_{in}}{5}$$

and top switches S401-S405 only block $$\frac{2V_{in}}{5}.$$

A key difference between the 5-level DIHC from the 4-level DIHC is the relative inductor current levels. In the 4-level DIHC, the two inductors when being charged see the same number of capacitor branches, two branches, leading to the same average current level considering charge balance for all flying capacitors. However, the two inductors in the 5-level DIHC are connected to a different number of capacitor branches. Particularly as shown in FIGS. 4B and 4C, inductor L401 gets charged through three capacitor branches, C401, C402-C403, and C404 in phase A (state 1), while L402 gets charged through 2 capacitor branches, C401-C402, and C403, C404 in phase B (state 3). For capacitor charge balance and duty cycle $D=D_A=D_B$, the average currents flowing through these inductors have the same ratio with the number of capacitor that it is connected to when charging, given as $$\frac{I_{L401}}{I_{L402}} = \frac{3}{2}.$$

Considering the output current Io400, these inductor currents are $I_{L401}=Io400*3/5$, and $I_{L402}=Io400*2/5$. With the same duty cycle for phases A and B, this ratio stays relatively constant. Small deviations can happen due to variations in capacitance, switch ON resistance, and switching timing, but they will not lead to a runaway problem in a normal interleaved Buck converter because of capacitor charge balance constraints for all flying capacitors in the SC network.

The output voltage can also be regulated by controlling duty cycle D, and thus $$Vo400 = \left(\frac{V_{in}}{5}*D\right),$$

theoretically. Therefore, this converter maintains an easy regulation characteristic of the whole family, similar to popular Buck converter.

Figure 5:
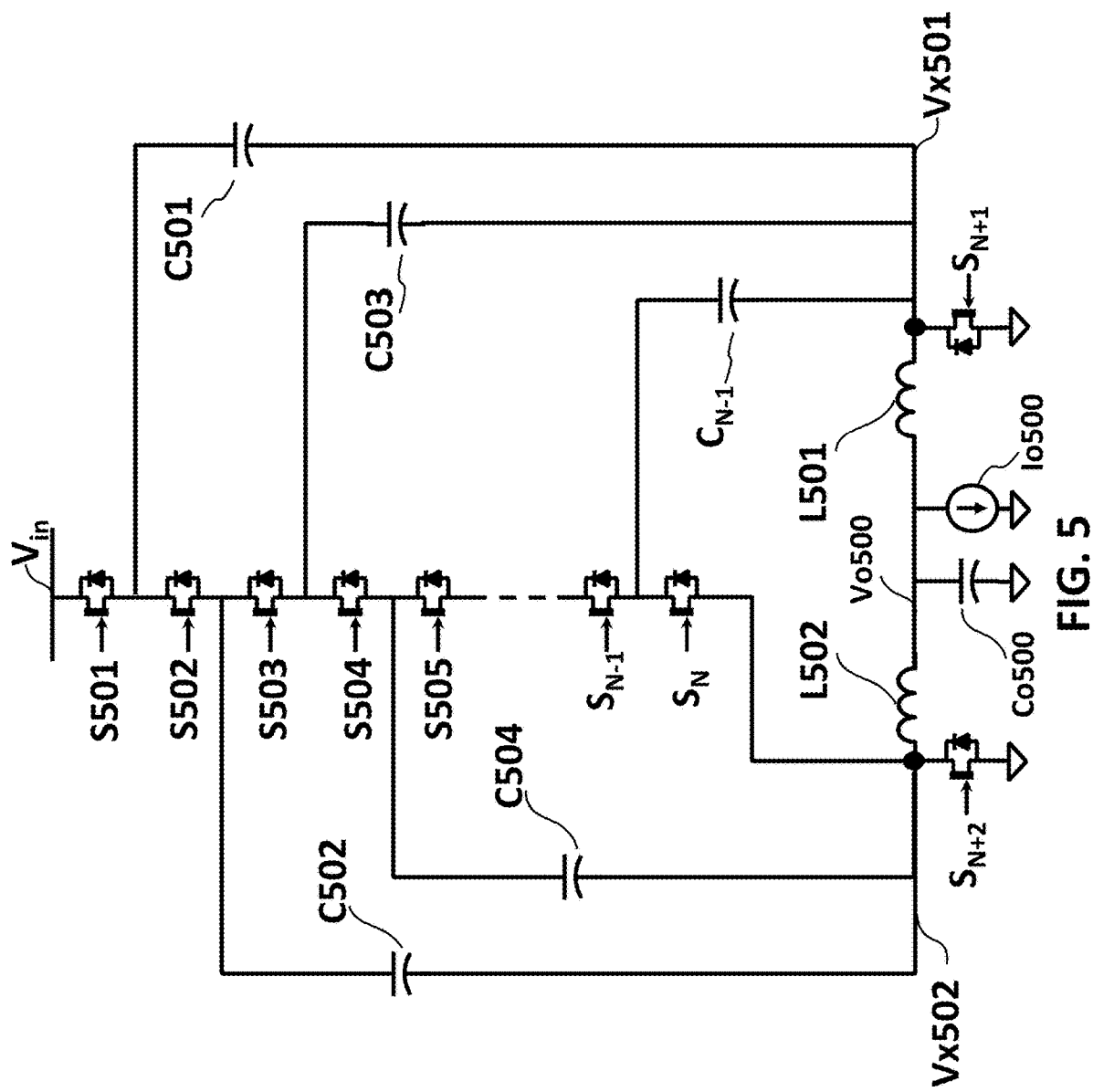
FIGS. 5 and 6 illustrate extensions of even-level and odd-level DIHCs, respectively.
Figure 6:
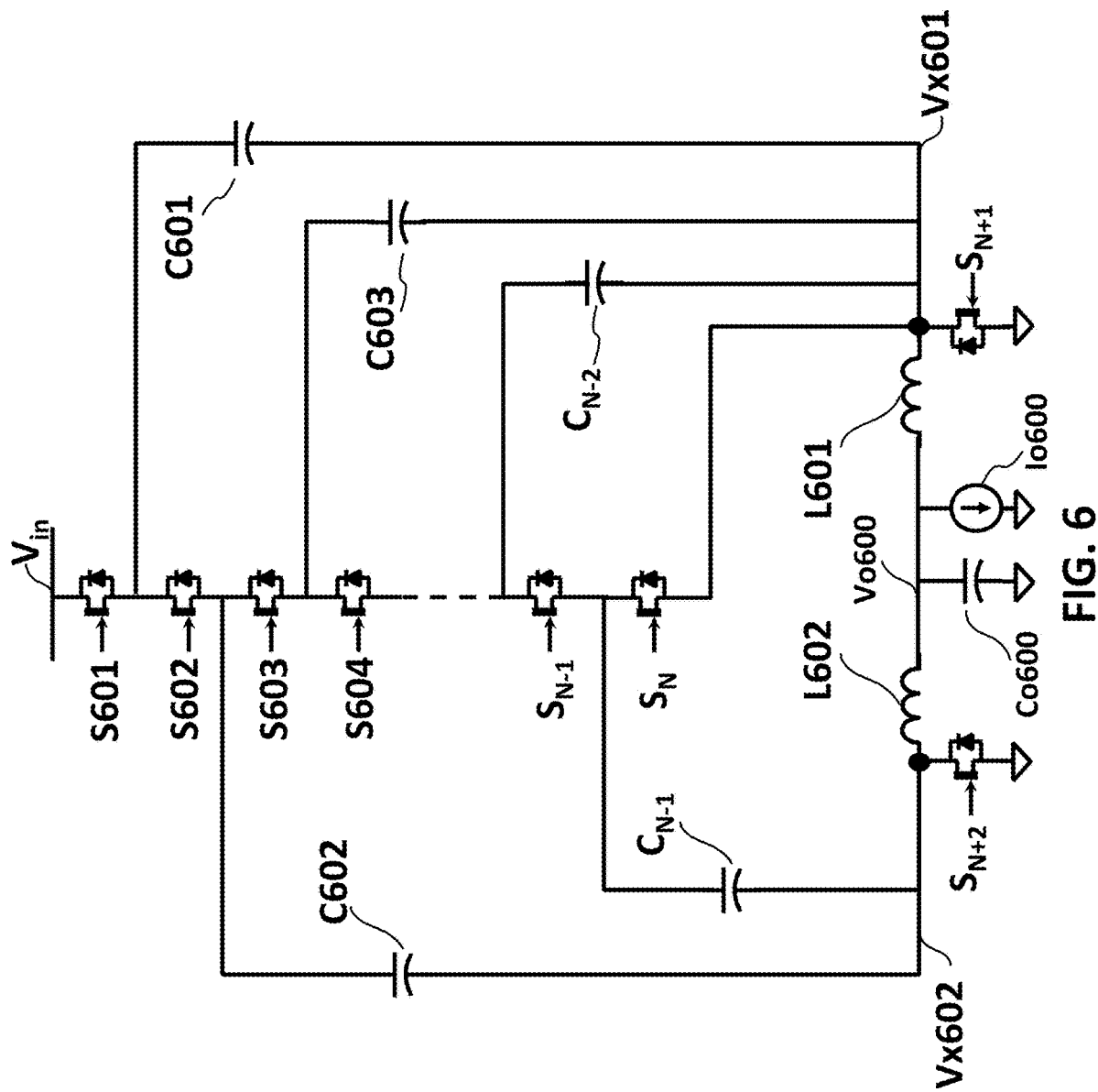

FIGS. 5 and 6 show general expansions of the two topologies shown in FIG. 3 and FIG. 4, respectively. Both FIG. 5 and FIG. 6 illustrate a dual-inductor hybrid converter (DIHC) that uses (N−1) capacitors and has N levels, ignoring the zero level, generated from the operation of the SC network. In the converter in FIG. 5, N is an odd number, therefore it is called an odd-level DIHC. In the converter in FIG. 6, N is an even number, and thus it is an even-level DIHC. The two converters can operate in four key operational states, including two charging states separated for two inductors and two states where the two inductors discharge to the output while the capacitors are open-circuited and inactive. Odd-level DIHC has two output inductors carrying an equal amount of half of the output current because the two inductors charge the same number of capacitor branches in operation. Whereas, the inductors in even-level DIHC charge a different number of capacitor branches, and thus carry two currents that are proportional to the number of capacitor branches that each is connected to. Particularly, inductor L601 carries a current equal to $$\frac{N+1}{N-1}$$

times of L602 current. In other words, L601 and L602 provides $\frac{N+1}{2}$ and $\frac{N-1}{2}$ of the total output current, respectively.

Various embodiments of the disclosed DIHC can be implemented slightly differently. For example, the even-level DIHC can have more than 4 operating states. As also employed in the work entitled "Split-Phase Control: Achieving Complete Soft-Charging Operation of a Dickson Switched-Capacitor Converter" published by Yutian Lei et al. in the IEEE Transactions on Power Electronics, Vol. 31 in January 2016, split-phase control can be used to remove possible hard charging in the flying capacitors. In this even-level converter, split phase can be applied to charging the first (also top) flying capacitor and discharging the last (also bottom) flying capacitor. Assuming same capacitance for all flying capacitors, this split phase operation is to make sure charge balance is achieved on the capacitors without hard charging which could occur due to capacitance mismatches in different branches and thus different capacitor voltage ripples.

In some embodiments of the disclosed odd-level DIHC, a capacitor sizing method can be applied to obtain soft charging for all flying capacitors without the need for split-phase operation. The key of this capacitor sizing method is to have equal portions of inductor current flow through each capacitor branch when activated because that will result in national charge balance for the capacitors. To achieve this goal, the capacitance in all capacitor branches should be the same when activated. For example, in FIG. 4B the three branches C401, C402 in series with C403, and C404 have the same capacitance. In FIG. 4C, the two branches C401 in series with C402 and C403 in series with C404 have the same capacitance. To meet this requirement, one solution can be that C402=C403, C401=C404, and C402=2*C401. In a comprehensive expression, C402=C403=2*C401=2*C404.

For both odd- and even-level converters, the output voltage can be theoretically regulated at $$\left(\frac{V_{in}}{N} * D\right)$$

by simply controlling duty cycle D of the charging phase. The easy regulation characteristic of the whole family is maintained.

Figure 7A:
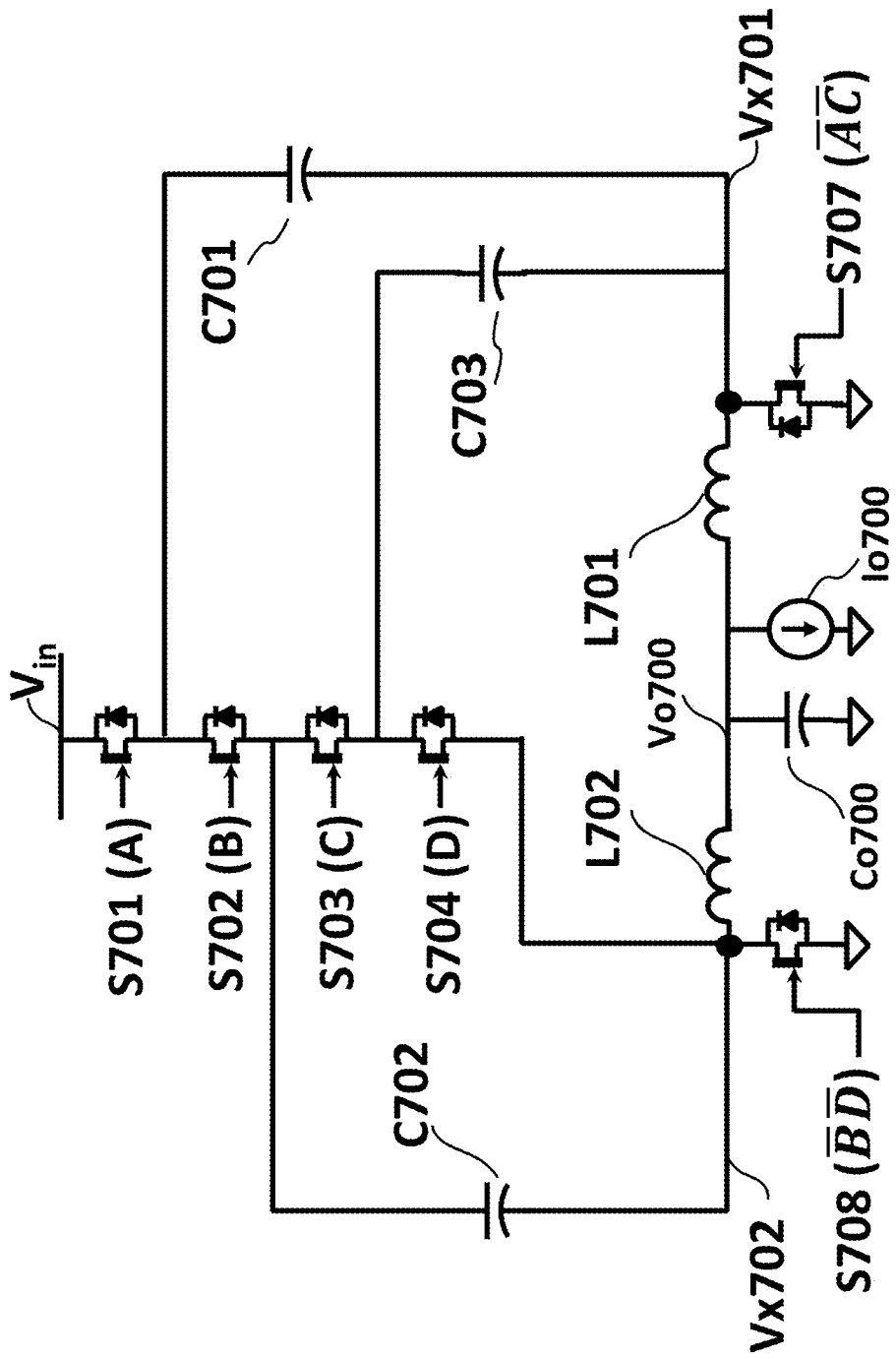
FIG. 7A is the circuit level illustration of 4-phase operation.

In some embodiments of the disclosed DIHC, including odd-level or even-level types, the operation can have more than 4 states. Particularly, the inductors can have more charging phases, i.e. charging states. For example, the four-level DIHC in FIG. 2A can be operated with 8 states, including 4 charging phases A, B, C, and D, as shown in FIG. 7A and FIG. 7B. In this multi-phase operation, the top switches S201-S204 are operated in an interleaving manner of 4 phases A-D, respectively, enabling only one capacitor branch in each charging phase. Therefore, each flying capacitor is charged or discharged individually by an inductor current. Since no two parallel branches of capacitors are activated at the same time, hard charging is completely avoided regardless of mismatches in capacitor values and duty cycles. As the hybrid converter has two inductors and operates in multiphase interleaving manner, it is also called a multi-phase dual-inductor hybrid converter (MPDIHC). In a normal operation of this MPDIHC, the interleaving charging phases A, B, C, and D have the same duty cycle $D=D_A=D_B=D_C=D_D$. Switch S701 is switched by phase A, S702 by phase B, S703 by phase C, S704 by phase D, S708 by the complementary of both B and D, i.e. $\overline{B} \times \overline{D}$, and S707 by the complementary of both A and C, i.e. $\overline{A} \times \overline{C}$. In this normal sequence of A-B-C-D, a capacitor receives a charge portion from a higher capacitor and transfers it to a lower capacitor, for example C702 receives charge from C701 and transfers it to C703. The top capacitor C701 receives a charge directly from the input, while the bottom capacitor C703 transfer the charge directly to the output Vo700 via inductor L702.

This multiphase operation increases the effective switching frequency of the inductor by two times, enabling a choice of half-sized inductor for the same output voltage and current ripple, or half-sized output capacitor for the same output voltage ripple.

In some embodiments of the disclosed MPDIHC, duty cycles $D_A$, $D_B$, $D_C$, and $D_D$ can have different values in order to achieve some specific goals in control, for example, to achieve balanced inductor currents, or balanced capacitor voltages, or balanced switching voltage at the two switching nodes Vx201 and Vx202, or a combination of these.

In some embodiments of the disclosed MPDIHC, phases A, B, C, and D are in a chronical sequence in a period T as shown in FIG. 7B. In this operation sequence, during a switching cycle of 6 phases a capacitor is first soft-charged then soft-discharged.

In some embodiments of the disclosed MPDIHC, phases A, B, C, and D are in a chronical sequence, A-B-C-D, in a period T as shown in FIG. 7B. In this operation sequence, during a switching cycle of 6 phases a capacitor is first soft-charged then soft-discharged.

In some embodiments of the disclosed MPDIHC, the charging sequence can be any different combination of the four phases A, B, C, and D in a period T. For example, the charging sequence can be either A-C-B-D or A-D-C-B as shown in FIGS. 7C and 7D, respectively. In this operation sequence, during a switching cycle of 6 phases a number of capacitors can soft-charge then soft-discharge, while one or a plural number of other capacitors can soft-discharge then soft-charge. At steady state, the capacitor will have charge balance and its voltage stabilizes around its nominal average voltage.

There are different reasons for different operating sequences, including to achieve different output voltage ripple profile, or to obtain a different frequency response performance in transient events.

The multiphase operation, regardless of phase sequence, does not change the simple duty cycle control for output voltage regulation described above.

Figure 8:
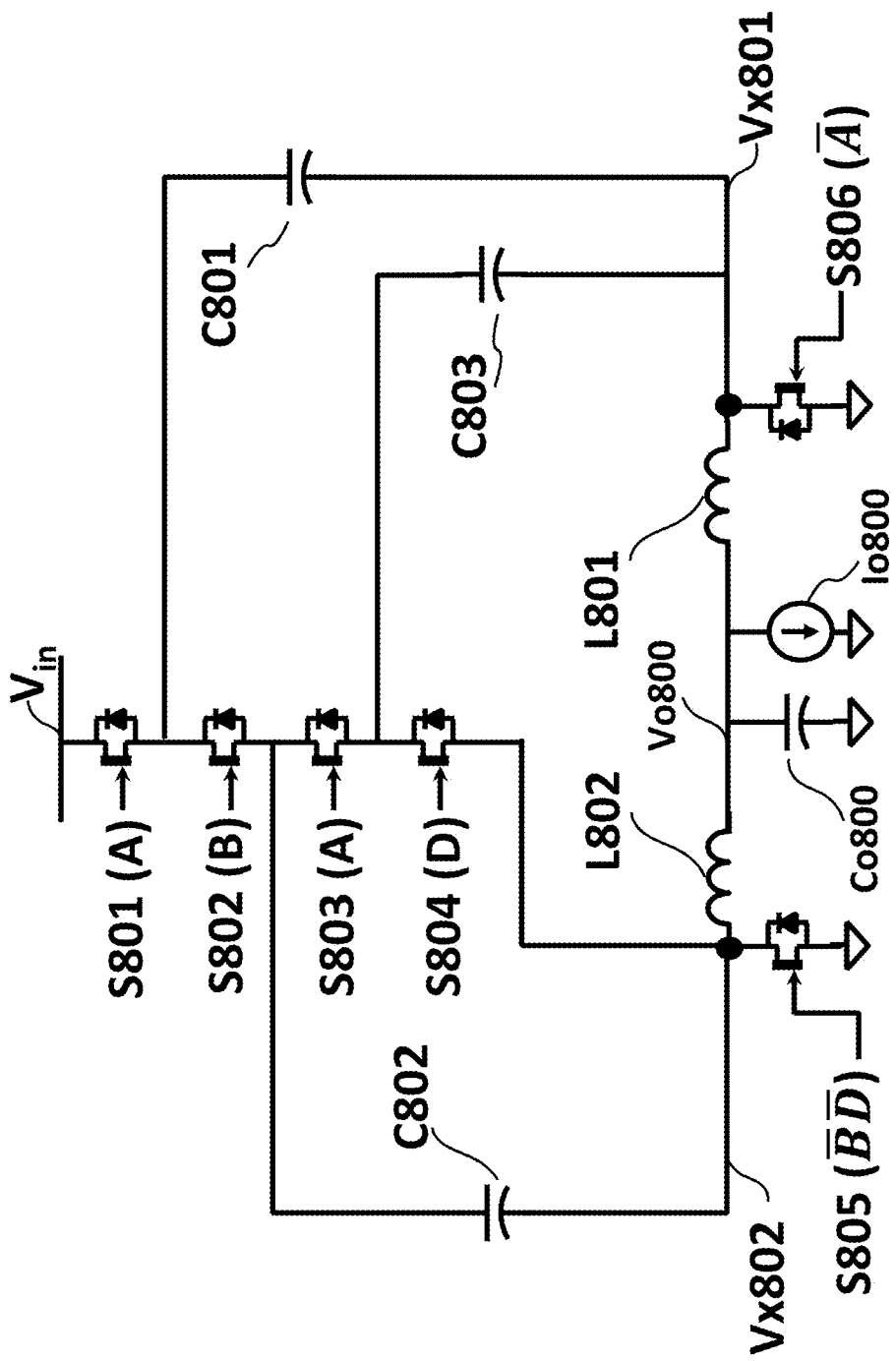
FIG. 8 is a circuit illustration of another multi-phase configuration of a normal DIHC.

In some embodiments of the disclosed DIHC, an intermediate option between dual-phase and multi-phase can be employed. For example, phase A and C for the converter in FIG. 7 can be combined to be the same original phase A in FIG. 2 to have the converter in FIG. 8. In other words, switch S801 and S803 are switched by phase A, S802 by phase B, S804 by phase D, S805 by the complementary of both B and D, i.e. $\overline{B} \times \overline{D}$, and S806 by the complementary of A, i.e. $\overline{A}$. In this case, L801 will ideally have twice larger inductor current ripple with the same inductance to L802.

As described above, the multi-phase operation of the DIHC allows capacitor branches to be separately charged and thus avoid hard charging between capacitors. To achieve the same goal of separating capacitors branches when charged, additional inductors can also be used. For the use of more than two inductors, the converter's name can be multi-inductor hybrid converter (MIHC).

Figure 9A:
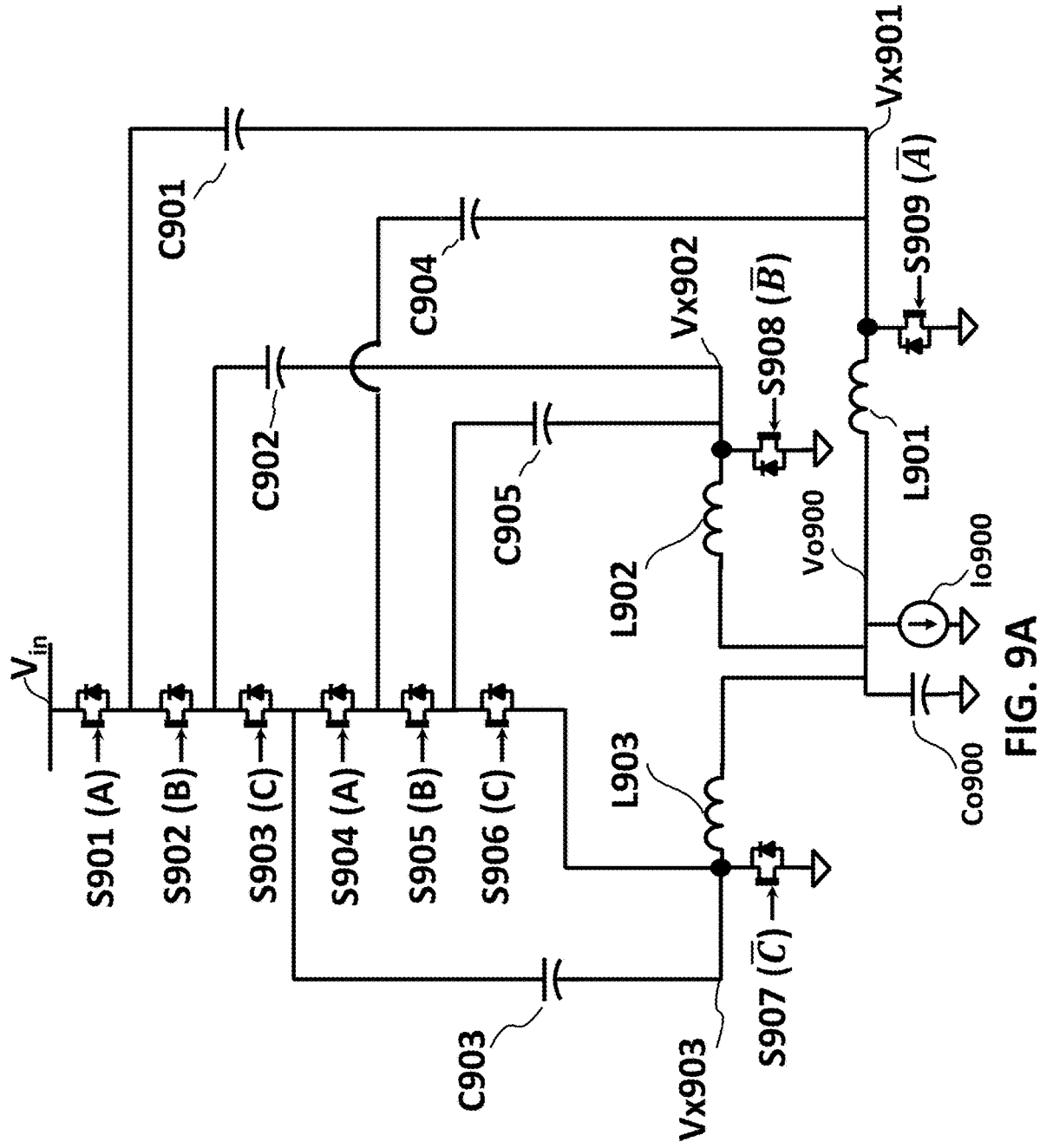
FIG. 9A illustrates a multiphase multi inductor extension of previously described DIHC that is called multi-phase multi-inductor hybrid converter (MPMIHC).

FIG. 9A illustrates an example of MIHC that has 5 capacitors, 3 inductors and 9 switches. Three output inductors are strategized that L901 and L902 are each directly connected to two flying capacitors, while L903 is connected to one capacitor C903. This converter MIHC has 6 operating states, including three interleaved inductor-charging phases A, B and C in states 1, 3, and 5, respectively, that are non-overlapped. As it has 3 energizing phases, it can also be called multi-phase MIHC, or MPMIHC.

FIGS. 9B, 9C, and 9D depict the connections of the converter in states 1, 3, and 5, while FIG. 9E illustrates the connections in states 2, 4, and 6. FIG. 9F shows operational waveforms of inductor currents, capacitor voltages and output voltage. In each energizing phases A, B, or C, one inductor soft-charges two branches of capacitors. Duty cycle of these energizing phases can be chosen to be equal, i.e. $D_A=D_B=D_C=D$. In steady state, the SC network with 5 capacitors generates 6 voltage levels including $$V_{in}, \frac{5V_{in}}{6}, \frac{4V_{in}}{6}, \frac{3V_{in}}{6}, \frac{2V_{in}}{6},$$

and $$\frac{V_{in}}{6},$$

ignoring the zero level. The average voltage across the capacitors C901, C902, C903, C904, and C905 are $$V_{C901} = \frac{5V_{in}}{6}, V_{C902} = \frac{4V_{in}}{6}, V_{C903} = \frac{3V_{in}}{6},$$

$$V_{C904} = \frac{2V_{in}}{6}, \text{ and } V_{C905} = \frac{V_{in}}{6},$$

respectively. Similar to other converters in the hybrid converter family, the MPMIHC's output voltage can be simply regulated by duty cycle control at $$\left(\frac{V_{in}}{6} * D\right).$$

Addition of inductors and multi-phase interleaving operation enable the converter to support a large output load while getting advantages in output voltage and current ripples, smaller output filtering capacitors, and frequency response to transient events, similar to multi-phase Buck converters.

In this MPMIHC, each inductor is directly connected to two capacitors except for L903 only directly connected to one capacitor branch. However, in operation shown in FIG. 9D, L903 still soft-charges 2 capacitor branches. Because of charge balance in the capacitors, charging the same number of capacitor branches lead to equal average current of $$\frac{Io900}{3}$$

in these inductors, as illustrated in FIG. 9F.

In some embodiments of the disclosed MPMIHC, more phases can be added to the operation of the converter. Similar to the MPDIHC, additional energizing phases can be added to allow an inductor to charge capacitors in its group separately. For example, phase A can be split into two phases A1 and A2 that are used to charge C901 and C904 separately.

In some embodiments of the disclosed MIHC, one inductor can be grouped with (directly connected to) two or more capacitors in the SC network. In one converter, one designer may want to choose one or a plural number of capacitors connected to one inductor, and one or a same plural number or a different plural number of capacitors connected to another inductor.

Figure 10:
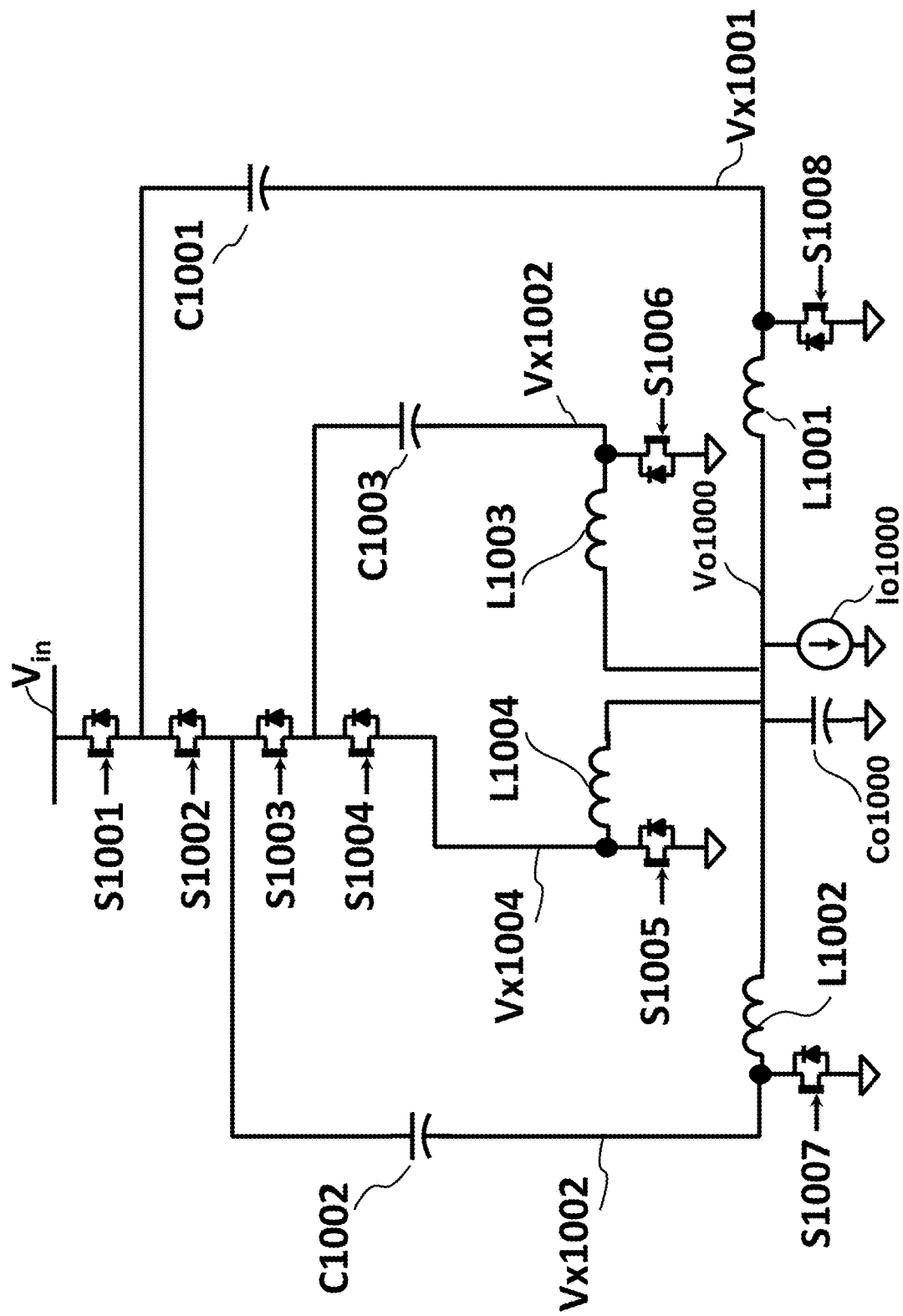
FIG. 10 shows a special case of multi inductor extension of DIHC in which one inductor is connected to only one capacitor either directly or in its operation. This converter is named a multi-individual-inductor hybrid converter (MIIHC).

FIG. 10 shows a special configuration of multi-inductor hybrid converter in the family in which each inductor is connected to only one capacitor, except for the last inductor L1004 is not directly connected to any capacitor. The converter has 3 flying capacitors, 4 inductors and 8 switches. The converter can be operated in a number of different ways. It can have two, three, or four inductor-charging phases while still maintaining the fundamental charge balance in capacitors.

Figure 11A:
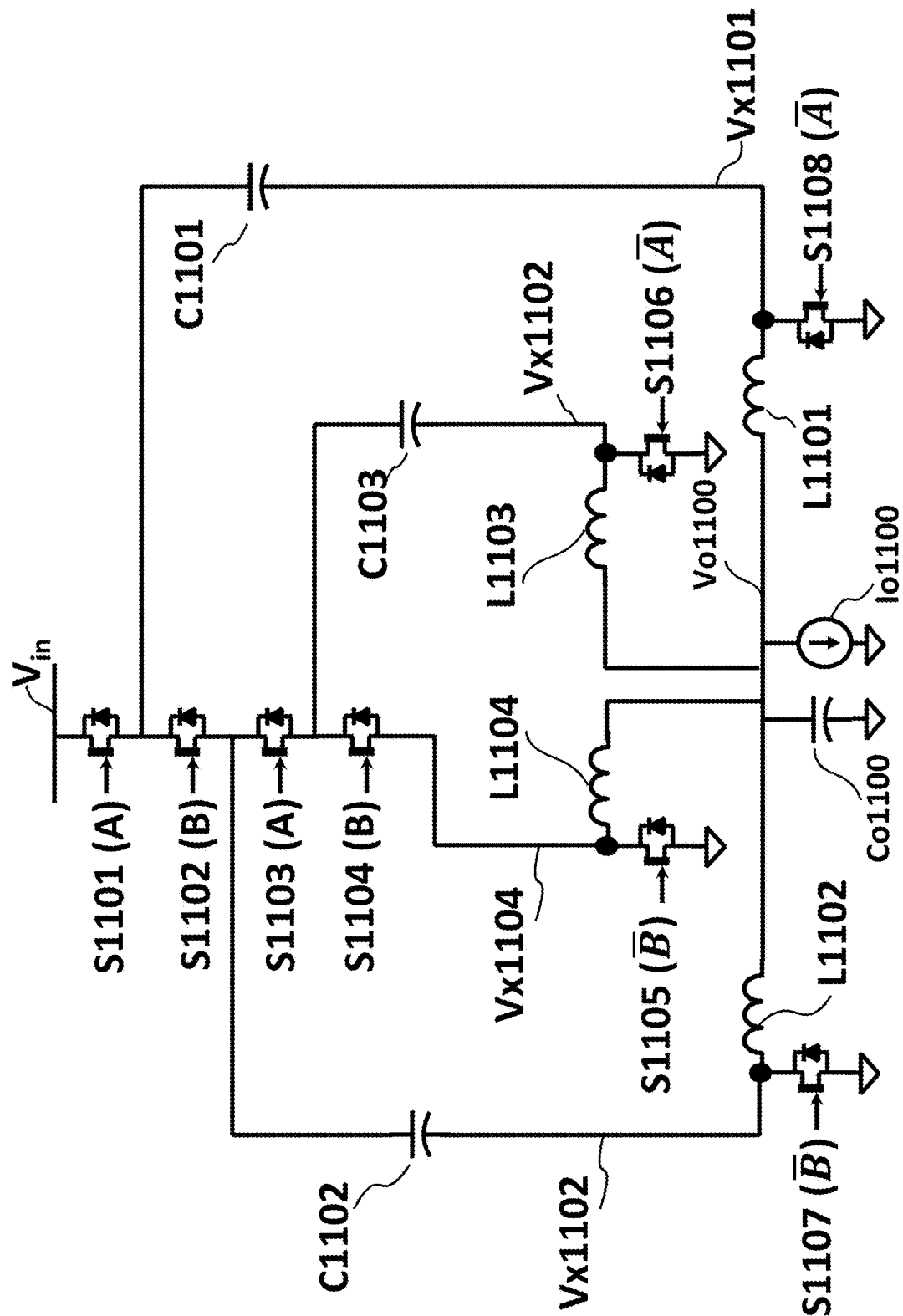

FIG. 11 shows an example of this converter operated in 4 states with two inductor-charging phases. It is also called dual-phase multi-individual-inductor hybrid converter (DP-MIIHC). The operation of DPMIIHC can be described similar to the DIHC converter FIG. 2 using FIGS. 11B, 11C, 11D, and 11E. Two charging phase A and B nominally have the same duty cycle $D=D_A=D_B$. The converter maintains key characteristics similar to the DIHC. In steady state, the capacitors C1101, C1102, and C1103 have average bias voltage of $$\frac{3V_{in}}{4}, \frac{2V_{in}}{4}, \text{ and } \frac{V_{in}}{4},$$

respectively. With duty cycle control, the output voltage Vo1100 is theoretically $$\left(\frac{V_{in}}{4} * D\right).$$

One key difference is that each inductor only carries a quarter of the output current. Since the copper loss in output inductors is a critical loss component, this reduction in inductor currents allows the DPMIIHC to support larger output loads, similar to adding additional phases to multi-phase Buck converters.

A key advantage of this converter is that since each inductor only charges or discharges one capacitor branch at a time, soft-charging is guaranteed regardless of capacitor values, inductor values, or possible mismatches in timing of switching actions.

Figure 12:
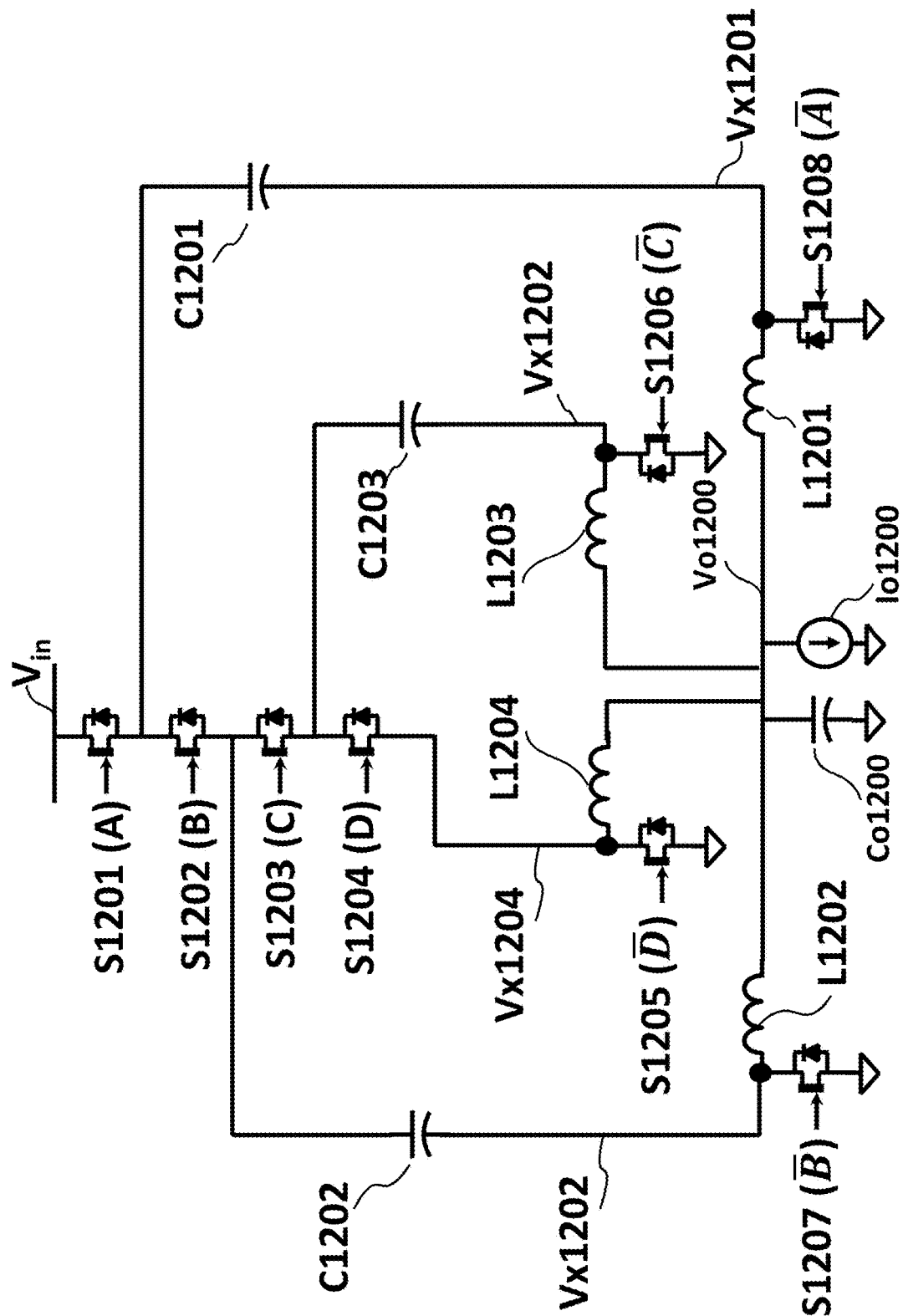
FIG. 12 illustrates the MIIHC with four-phase version of the to represent multi-phase multi-individual-inductor hybrid converter (MPMIIHC).

In some embodiments of the disclosed multi-individual-inductor hybrid converter (MIIHC), more than 2 inductor-charging phases can be employed. For example, the four inductors can be operated in four interleaved phases A-D, as shown in FIG. 12. This operation with more interleaving shall further improve output voltage and current ripple. Since the converter has more than 2 inductor-charging phases, it can be called multi-phase multi-individual-inductor hybrid converter (MPMIIHC).

In some embodiments of the disclosed MPMIIHC, similar to the MPDIHC above the phase sequence can be any combination of A, B, C, and D.

Similar to other converter topologies in the disclosed hybrid converter family, this converter can be extended to one that has a plural number of inductors which each is directly connected to the bottom plate of a capacitor in the SC network, except for one last inductor connected to the top plate of the bottom capacitor via a switch.

In some embodiments of the disclosed hybrid converter family, any version of the converter topologies above can be operated bi-directional. That means beside the current step-down operation, the converters can be controlled so that charge flows from the output back into the input, forming step-up converters.

In some embodiments of the disclosed converters in the hybrid converter family, the power switches can be implemented using Metal Oxide Semiconductor (MOS) switches or wide band-gap switches, including GaN switches.

In some embodiments of the disclosed converters in the hybrid converter family, the capacitors can be implemented using off-chip capacitors, for example ceramic capacitors, electrolytic capacitors, tantalum capacitor, film capacitors, etc. They can also be implemented using integrated capacitors, such as deep trench capacitors, metal-insulator-metal (MIM) capacitors, metal-oxide-metal (MOM) capacitors, or other types of integrated capacitors.

The output voltages from the converter topologies in the family described in this disclosure, including Vo200, Vo400, Vo500, Vo600, Vo700, Vo800, Vo900, Vo1000, and Vo1100, can be used to supply a wide range of loads in different applications. For example, the load can be processors or other functional blocks on server boards in a server rack of a data center. It can also be computing and electronic circuits in telecommunication stations, aircrafts, missiles, spacecrafts, and RADAR systems.

The output voltage can also provide power to output loads of any platforms capable of computations and communication. Non-limiting examples include televisions (TVs), video projectors, set-top boxes or set-top units, digital video recorders (DVR), computers, netbooks, laptops, and any other audio/visual equipment with computation capabilities. The output loads can be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The output load can also provide a variety of user interfaces such as a keyboard, a touch screen, a trackball, a touch pad, and/or a mouse. The output load may also include speakers and a display device in some embodiments. The output load can also include a bio-medical electronic device.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

The converter described above can be generally described as a combination of a switched-capacitor (SC) network connected to the input and followed by an inductive network that is synchronously operated with the operation of the SC network. Either or both the SC network and the inductive network can be implemented using different structures to achieve intended operation, converter characteristics and performance.

The SC network can be in form of a Dickson SC converter as described above. It can also be other types of SC converters, for example a ladder, series-parallel, FCML, or another type SC converter architecture. The SC network generates operational signals similar to those from a full bridge, multiple half bridges, or multiple full-bridges to feed to the inductive network. Note that unlike regular known bridge structures mentioned above, the SC network generates these bridge-like signals while efficiently converting the input voltage level to a significantly lower level to best utilize the following inductive network.

Figure 13A:
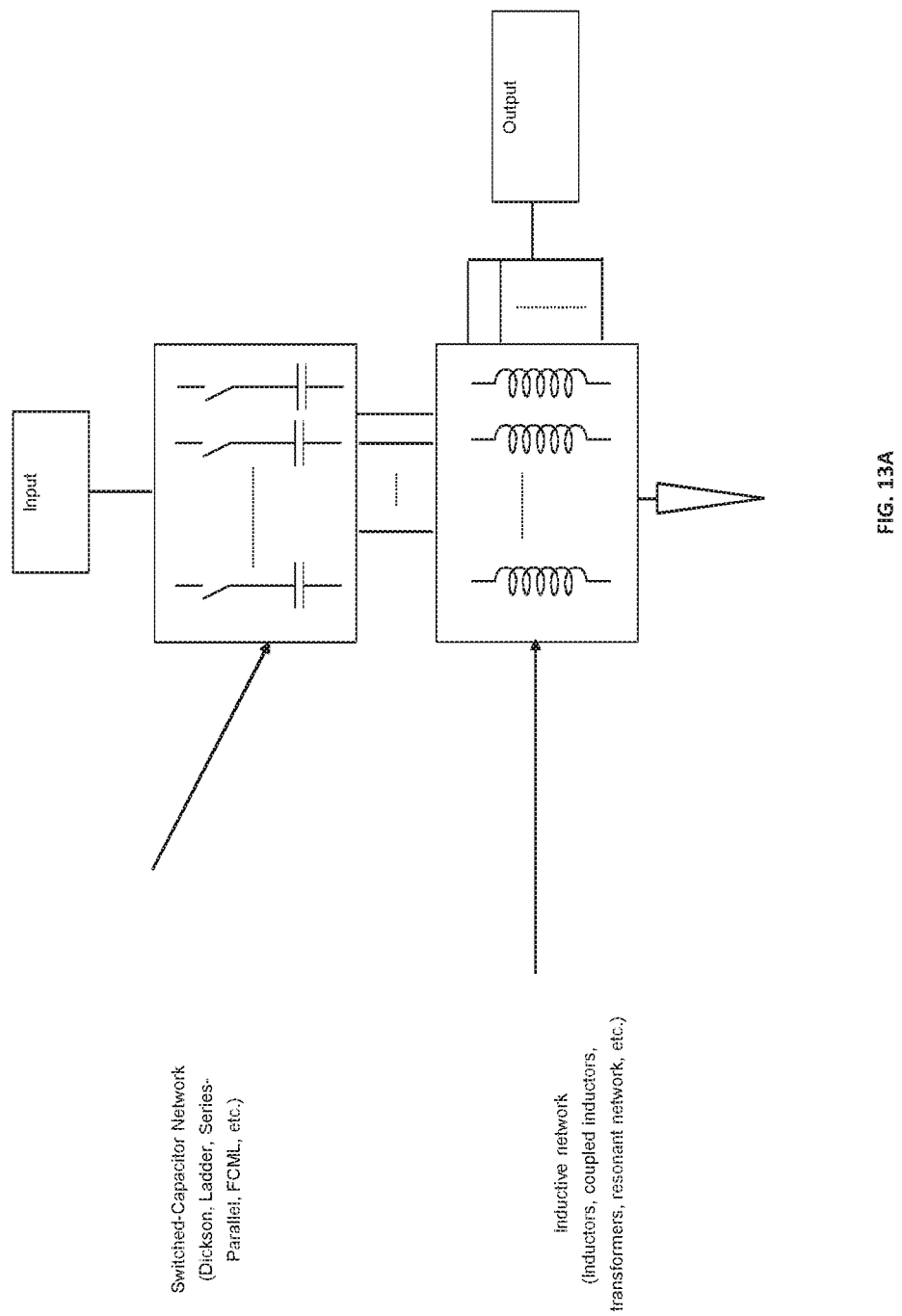
FIG. 13A illustrates a general drawing of the hybrid DC-DC converter where charge can be transferred from an input to an output using multiple current paths through a switched-capacitor network and an inductive network with multiple capacitors and multiple inductor.

The inductive network can be in form of simple Buck-like filter structure as described above. It can also be implemented using other types of inductive networks, including coupled inductors, transformers, resonant networks, etc. The choice of inductive network depends on different weights in design priorities, including efficiency, power density, zero-voltage switching (ZVS), zero-current switching (ZCS), dynamic response, total implementation size, and weight, etc. FIG. 13B illustrates some examples of resonant networks that can be used for the inductive network, including LLC, LCC, series resonant, CLLC, CL$^3$C, and LC$^3$L. A key advantage of resonant network is to have resonant operations that enable the converter to achieve soft switching for all power switches, i.e. ZVS and ZCS, in addition to soft charging for all flying capacitors in the SC network as described above. The inductive network can also be implemented with the impedance control network (ICN) as shown in FIG. 13C.

Since the different configurations of the SC network and inductive network mentioned above are known in the field and would require no further descriptions, the following part of this disclosure will focus on some specific configurations that are less known and would benefit from more detailed descriptions. These configurations include coupled inductors, transformers, and tapped inductors for the inductor network; and cascade SC network for the SC stage.

Figure 14:
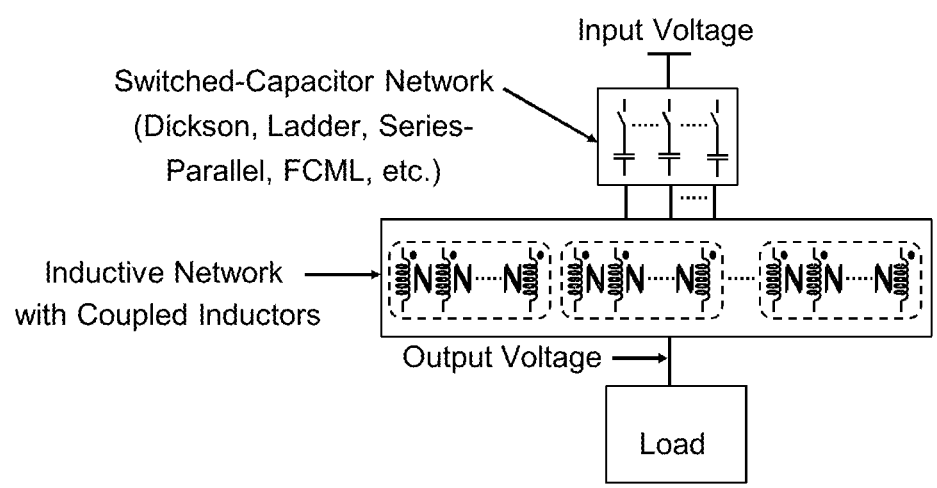
FIG. 14 illustrates an extended version of the disclosed DC-DC converter architecture where the inductive network is implemented by coupled inductors.

FIG. 14 shows an extended version of the disclosed DC-DC converter architecture where the inductive network is implemented by coupled inductors. As described above, the SC network can be in form of a Dickson SC converter, a ladder, series-parallel, FCML, or another type SC converter architecture. The switched-capacitor network comprising multiple switches and one or more capacitors is connected with an input voltage node. The switched-capacitor network connect with two or more inductors in the inductive network. The inductors in the inductive network can be coupled together in one, two, three or more groups. Each mentioned group of coupled inductor share one magnetic core. Therefore, this method is to save inductor core structure counts and thus the total implementation size and cost.

Figure 15A:
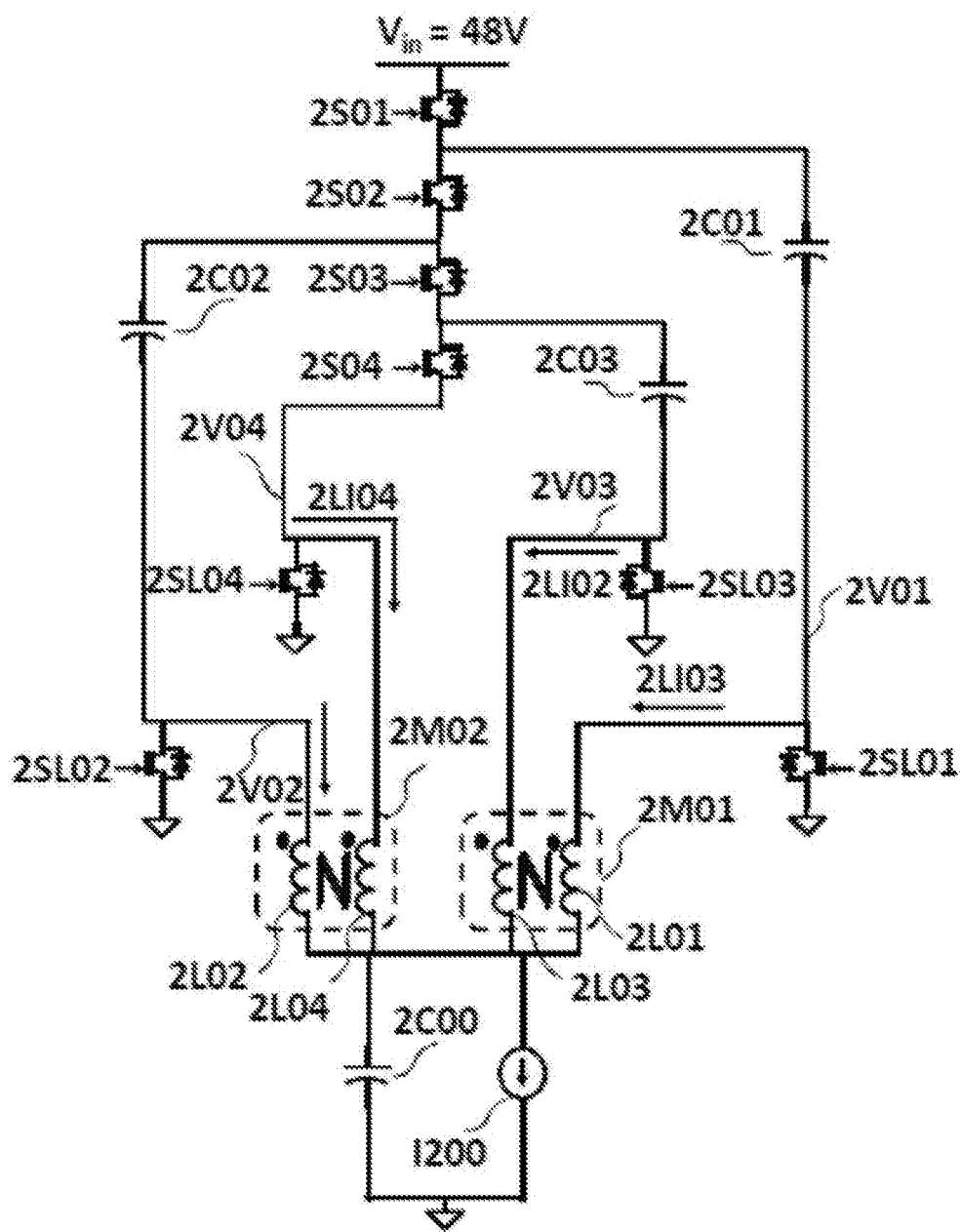
FIGS. 15A-15D present two examples of hybrid DC-DC converter using the disclosed converter invention with coupled inductors.
Figure 15B:
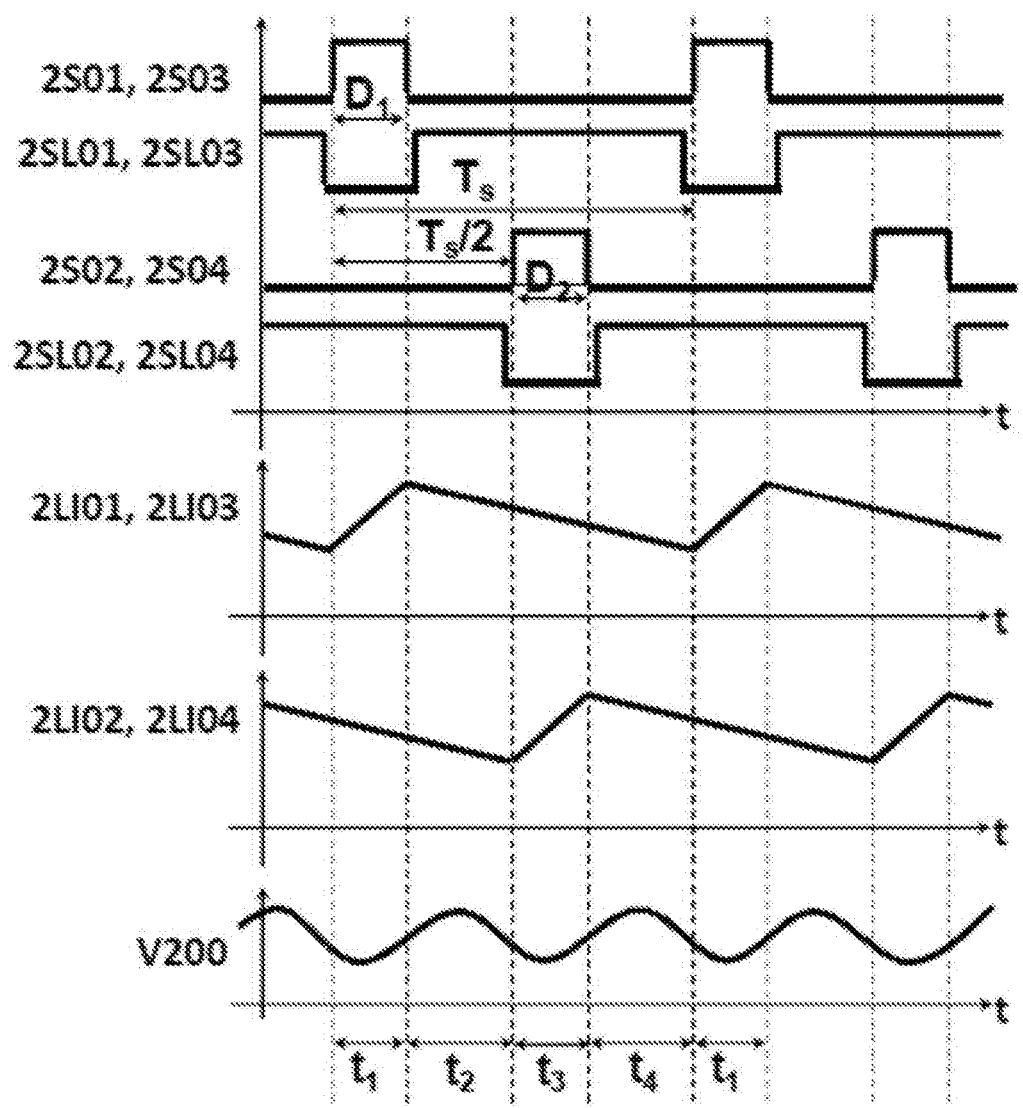

In FIG. 15A, an example of coupled inductor hybrid converter is shown. This is a four-level converter ignoring the ground level which has total number of eight switches, three capacitors and two coupled inductors. Four top level switches 2S01 to 2S04 and one low level switch 2SL04 are connected in series between the input voltage node and ground. Each of the capacitors, 2C01 to 2C03 are connected to the intermediate nodes of the series switch chain from top to bottom. The lowest intermediate node in the series switch chain is 2V04 and it is connected with an inductor 2L04. Second terminals of the capacitors are also connected to an individual inductor and a low side switch. All the inductors are tied together to the output node 2OV02. The inductors with the odd numbers can be coupled together and the inductors with the even numbers can be coupled together. The output node can support load at lower voltage than the input voltage.

Two sets of non-overlapping PWM signals and their inverted versions drive the eight switches in the converter, odd numbered high side switches 2S01 and 2S03 with one particular PWM signal with the lower level odd numbered switches 2SL01 and 2S103 by the inverted version of the signal and even number high switches 2S02 and 2S04 with the other PWM signal and the even numbered lower level switches 2SL02 and 2SL04 with the inverted version. The timing diagrams of the switches are shown in FIG. 2B. The inductor currents for 2LI01 and 2LI03 goes linearly up from at the on time of the PWM signal for odd numbered high side switches and linearly goes down for the rest of the period. The other inductor currents go linearly up during the ON time of the even numbered high side switches goes down for the rest of the period.

Figure 15C:
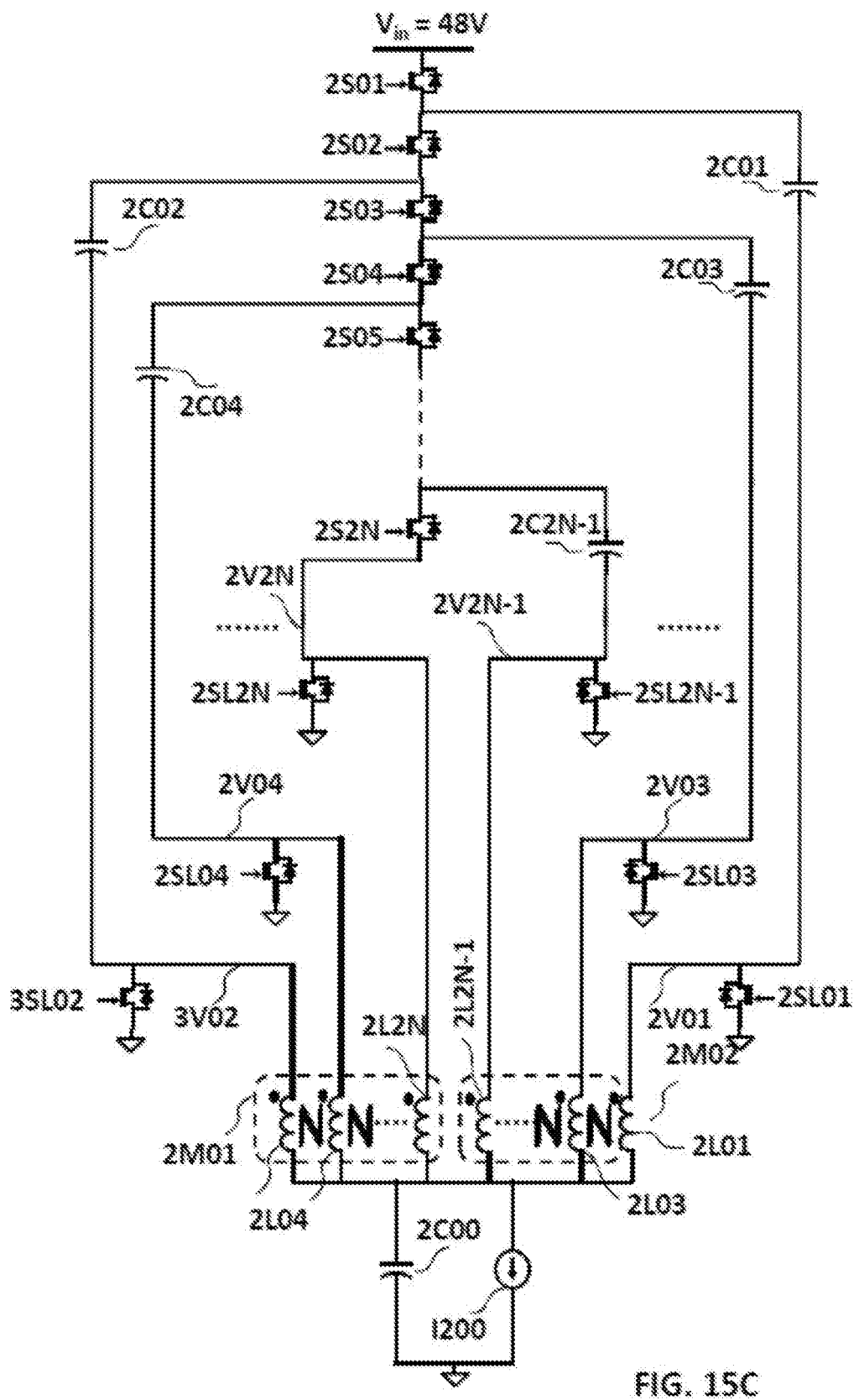
Figure 15D:
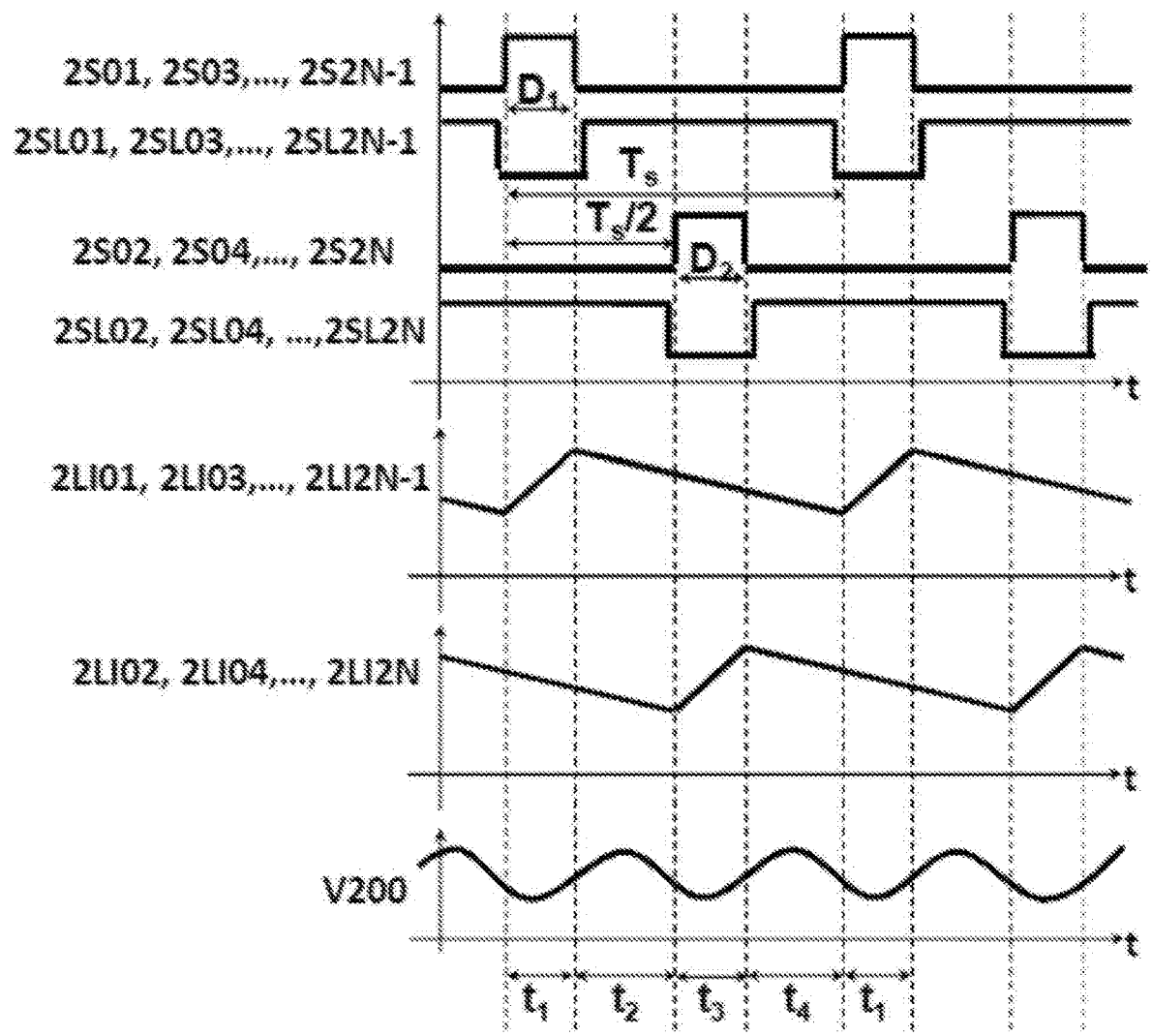

FIG. 15C shows the 2N level expansion of the example converter. Operation and gate driving signals are same like the converter of FIG. 15A. The timing diagrams and waveforms of the converter has been shown in FIG. 15D. Note that, although the figures are shown for even level converters, this topology is also applicable for odd levels. In that case, the number of inductors in the magnetic structures will vary, but the converter will operate.

FIG. 16_presents a similar DC-DC converter like the converter of FIG. 15_except it works in three phases instead of two, having three magnetic structure in network which is different in architecture, but exhibits the same operation and can be reduced again to the inverting network of FIG. 15_.

Figure 16A:
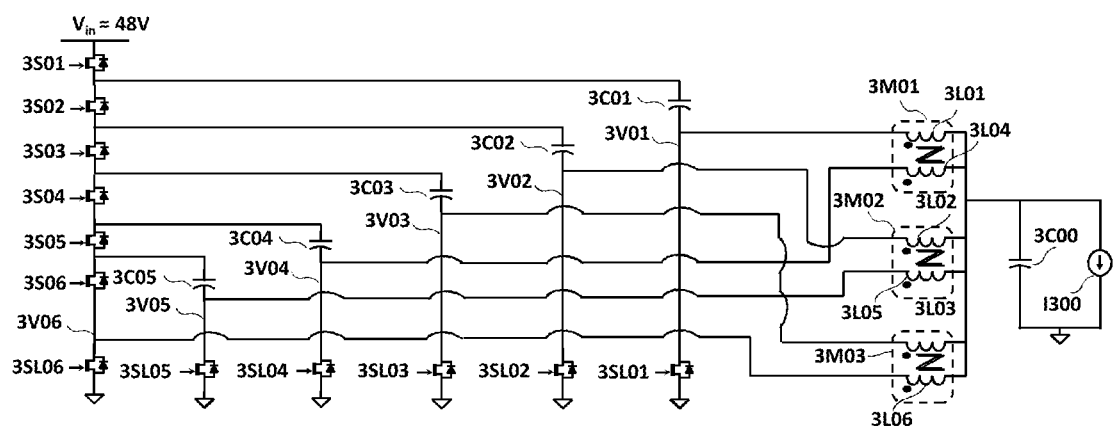
FIG. 16 presents three-phase examples of the converter with three groups of coupled inductors, developed from FIG. 15.
FIG. 16B and FIG. 16D shows the timing diagrams and important wave shapes of the simple and more general examples of the converter shown in FIG. 16A and FIG. 16C, respectively.

FIG. 16A shows a six-level converter ignoring the ground level. It has six high side switches six low side switches, five flying capacitors, six inductors coupled in pairs in three magnetic structures. It has a similar series switch chain in combination of all the high side switches, 3S01 to 3S06 and one low side switch, 3SL06. Five capacitors 3C01 to 3C05 are connected to the upper intermediate nodes of the series switch chain. The lowest node of the switch chain is 3V06. Switches 35L01 to 3SL05 are connected to the nodes 3V01 to 3V05 which are the second terminals of the capacitors. Six inductors 3L01 to 3L06 are connected with the nodes 3V01 to 3V06. Inductors 3L01 and 3L04 can be coupled into a single magnetic structure. Inductors 3L02 and 3L05 can also be coupled in another single magnetic structure as well as the other inductors in another magnetic structure. All the inductors' second terminals are tied to one node 3OV06 which is the output voltage node of this converter.

Figure 16B:
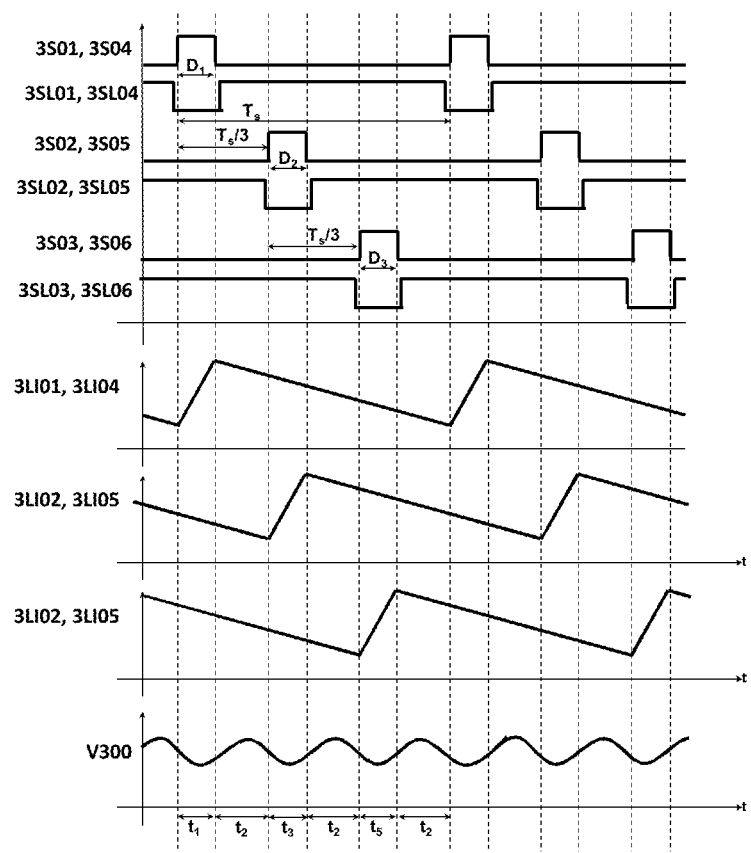

The converter of FIG. 16A is driven by three PWM signals and their complementary signals. The timing diagrams and ideal waveforms of the converter are shown in FIG. 16B. The PWM signals cannot be overlapping and for least output voltage ripple, they are required to be evenly distributed over a switching period or 120-degree phase shifted from other two signals. During the ON time of a particular PWM signal, related inductors' current goes linearly up and then again goes down for the rest of the period.

Figure 16C:
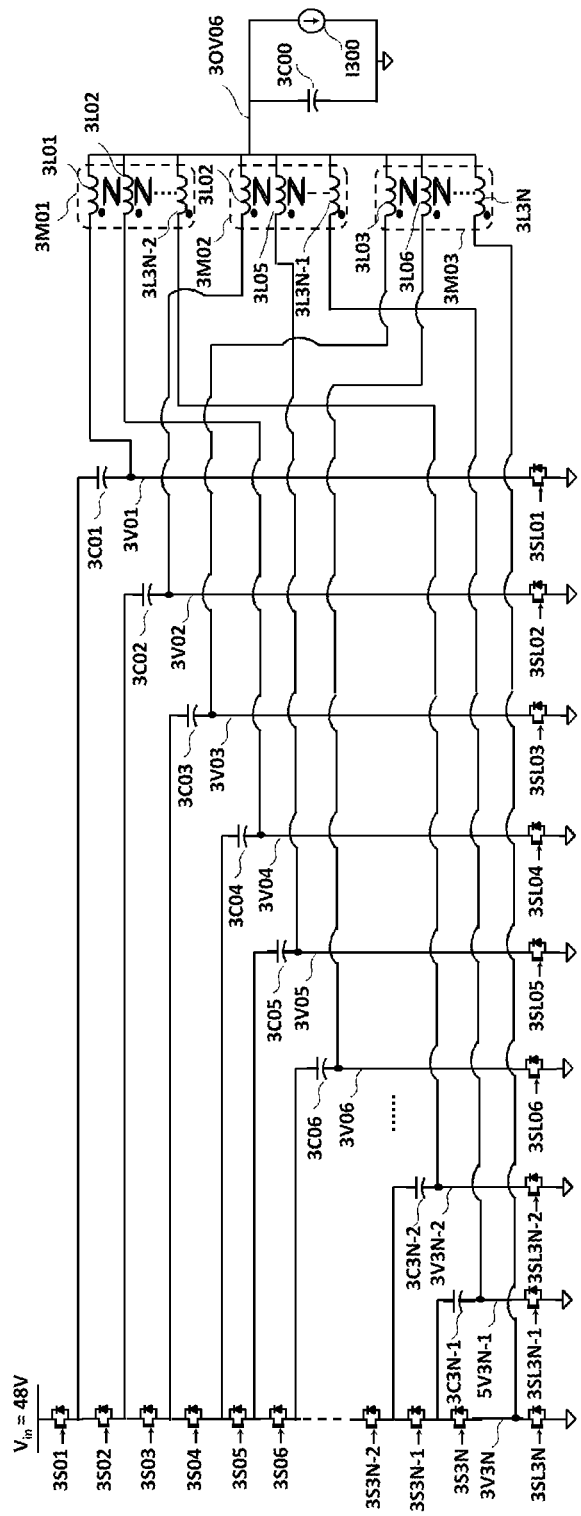
Figure 16D:
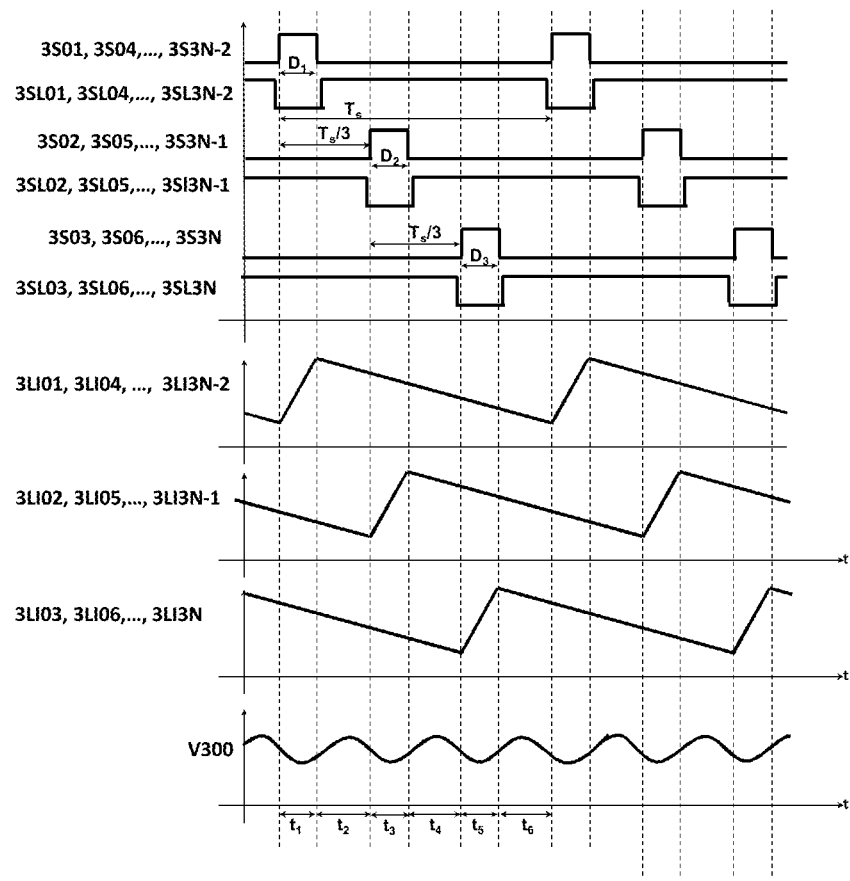

FIG. 16C is a 3N level extension of the converter of FIG. 16A. Having three magnetic structures, it accommodates more number of switches in the series switch chain and inductors in the magnetic structures themselves. The timing diagrams and ideal waveforms are shown in FIG. 16D for this converter. Note that, the converter architecture can be extended to any number of levels which need not to be a multiplier of three (phase number), which, if built, may have different number of inductors in the magnetic structures. However, the phase number of operation and magnetic structure number can be extended to any higher number optimized by loss modeling of the converter.

Figure 17A:
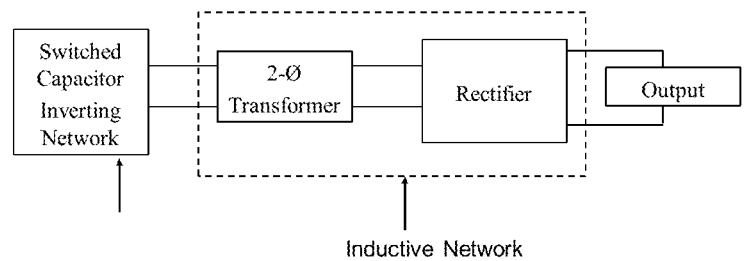
FIGS. 17A-17C illustrates application of the example embodiments in transformer-based DC-DC converters and resonant converters.
Figure 17B:
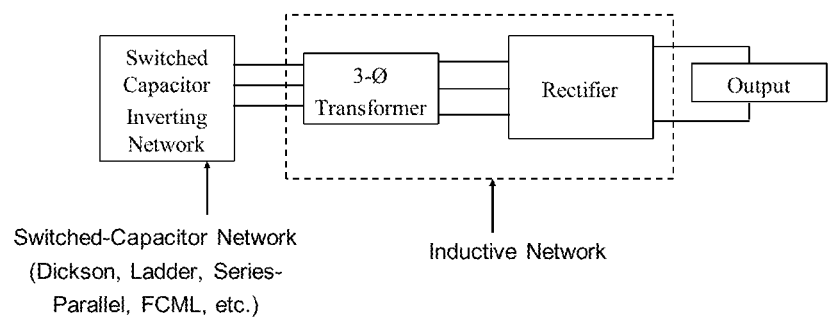
Figure 17C:
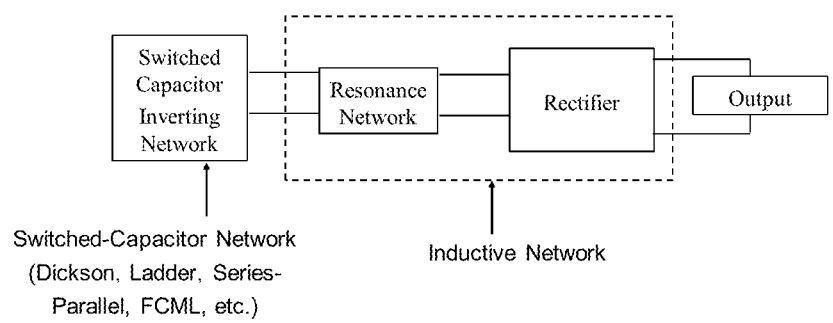

FIG. 17A-C show extended versions of an example DC-DC converter architecture where the inductive network can be implemented by transformers or resonant networks followed by a rectification stage to support a DC output. The transformers can have two-phase coupling or three-phase coupling as depicted in FIG. 17A or 17B, respectively. As described above, the SC network can be in form of a Dickson SC converter, a ladder, series-parallel, FCML, or another type SC converter architecture. The switched-capacitor network comprising multiple switches and one or more capacitors is connected with an input voltage node. The switched-capacitor network connects with two or more transformers or resonant networks in the inductive network. The using transformers and resonant networks, described in more details below, enable much larger conversion ratios since additional voltage gain can be provided by the turn ratios in the transformers and/or configurations of the resonant networks.

FIGS. 17A-17C show the common application architectures of an example implementation. In a conventional isolated DC-DC converter, an inverter feeds the intermediate transformer primary side and transformed voltage at the secondary side is processed by a rectifier. Instead of using dual active bridge for single phase transformation and three half-bridges for three phase conversion in the inverter side, this implementation uses a switched capacitor network, which pre-divides the DC voltage and inverts it to feed to the transformer. FIGS. 17A and 17B illustrates the embodiments of using switched capacitor network in inverting applications. FIG. 17C illustrates the embodiments of using the switched capacitor inverting network in application of resonant networks.

Figure 18A:
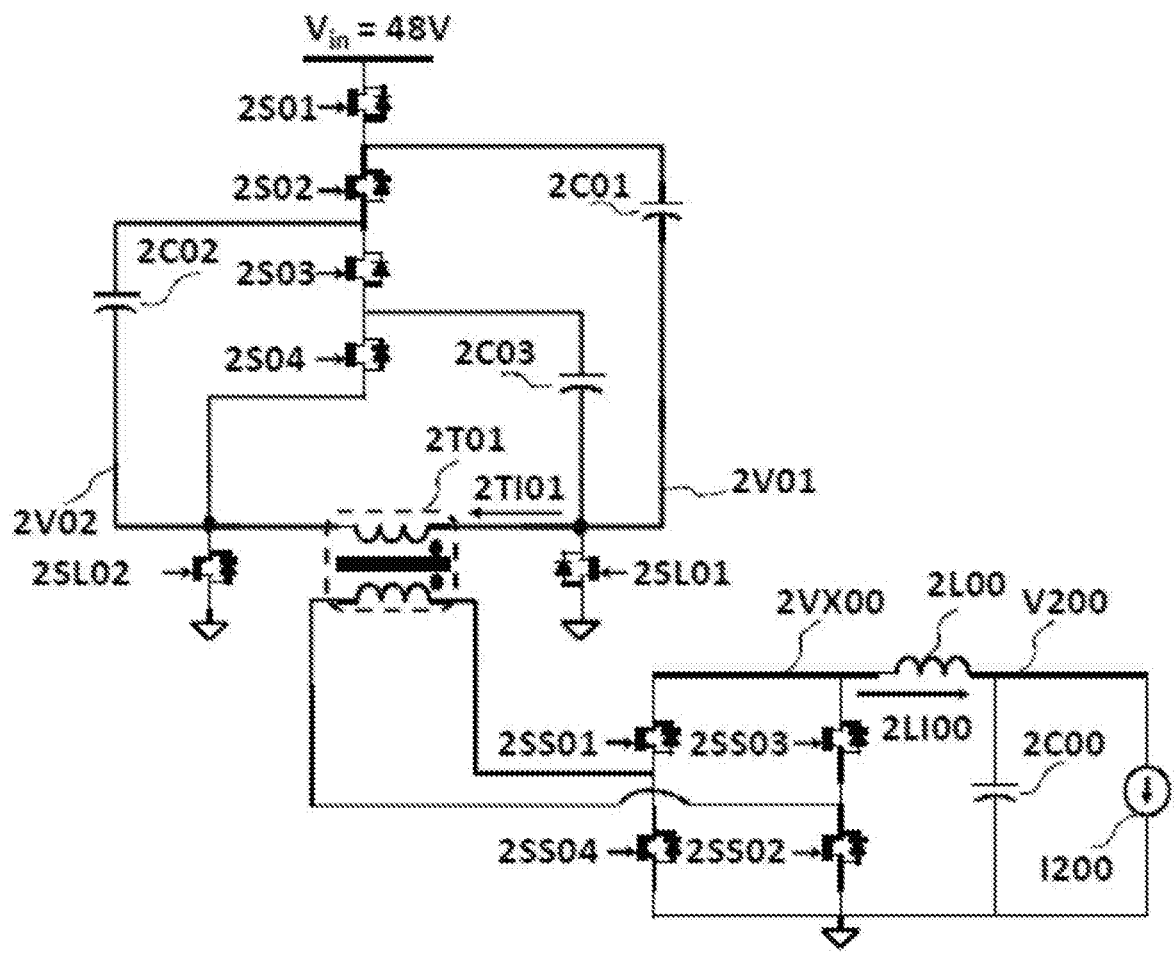
FIGS. 18A-18D present a simplest switched capacitor inverting network.

In FIG. 18A, there is an example of a transformer-based DC-DC converter having the invented switched capacitor inverting network for the inverting purpose preceding the transformers. After the transformer in the regulator, there is a simple full bridge rectifier followed by a low pass filter for shaping the voltage at 2VX00 and generate a lower level DC voltage at 2V00. The switches of the full bridge rectifier can be replaced with diodes for simpler operation but those may increase power loss in the regulator.

In the primary side of the transformer, the inverting circuit is a switched capacitor network. There are six switches, two lower level ones 2SL01 and 2SL02 and 4 in the main network 2S01 to 2S04. Switches 2S01 to 2S04 are in series with the lower level switch 2SL2 creating four intermediate nodes in the series chain. Three capacitors 2C01 to 2C03 present in the network are connected with the upper three nodes of the series chain with one of their terminals. The other terminals are connected with the lower level switches at nodes 2V01 and 2V02 alternatively.

Figure 18B:
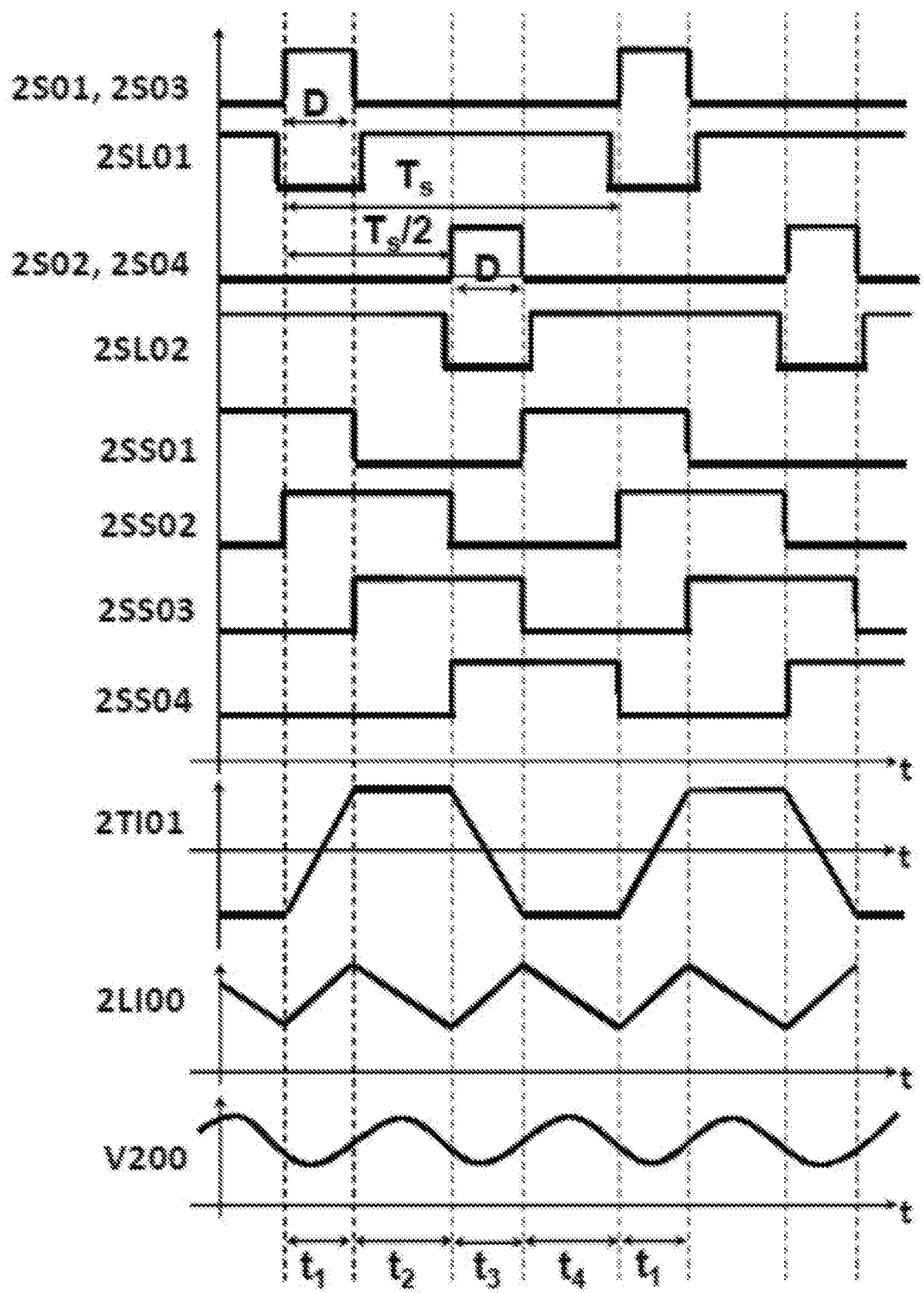

Two sets of PWM signals and their inverted versions drive the six switches in the network, odd numbered switches in the main network 2S01 and 2S03 with one particular PWM signal with the lower level odd numbered switch 2S01 by the inverted version of the signal and even number switches in the main network 2S02 and 2S04 with the other PWM signal and the even numbered lower level switch 2SL02. The timing diagrams of the switches are shown in FIG. 18B. The transformer current goes linearly up from positive to negative at the on time of the PWM signal for odd numbered main network switches and linearly goes back to negative value during the on time of the PWM signal for the even numbered main network switches. Rest of the time the capacitor network remains inactive and the transformer current maintain its course in positive or negative direction.

The inverting network blocks most of the input voltage in the network and provides smaller swings at node 2V01 and 2V02. After transformation, rectification and filtering, a lower level output DC voltage is generated at node V200.

By controlling the pulse-width of the PWM signals in the inverting network, the magnitude of the DC voltage can be regulated. For proper operation, the main two PWM signals are 180-degree phase shifted and are of same amount of pulse-width or duty-cycle.

Figure 18C:
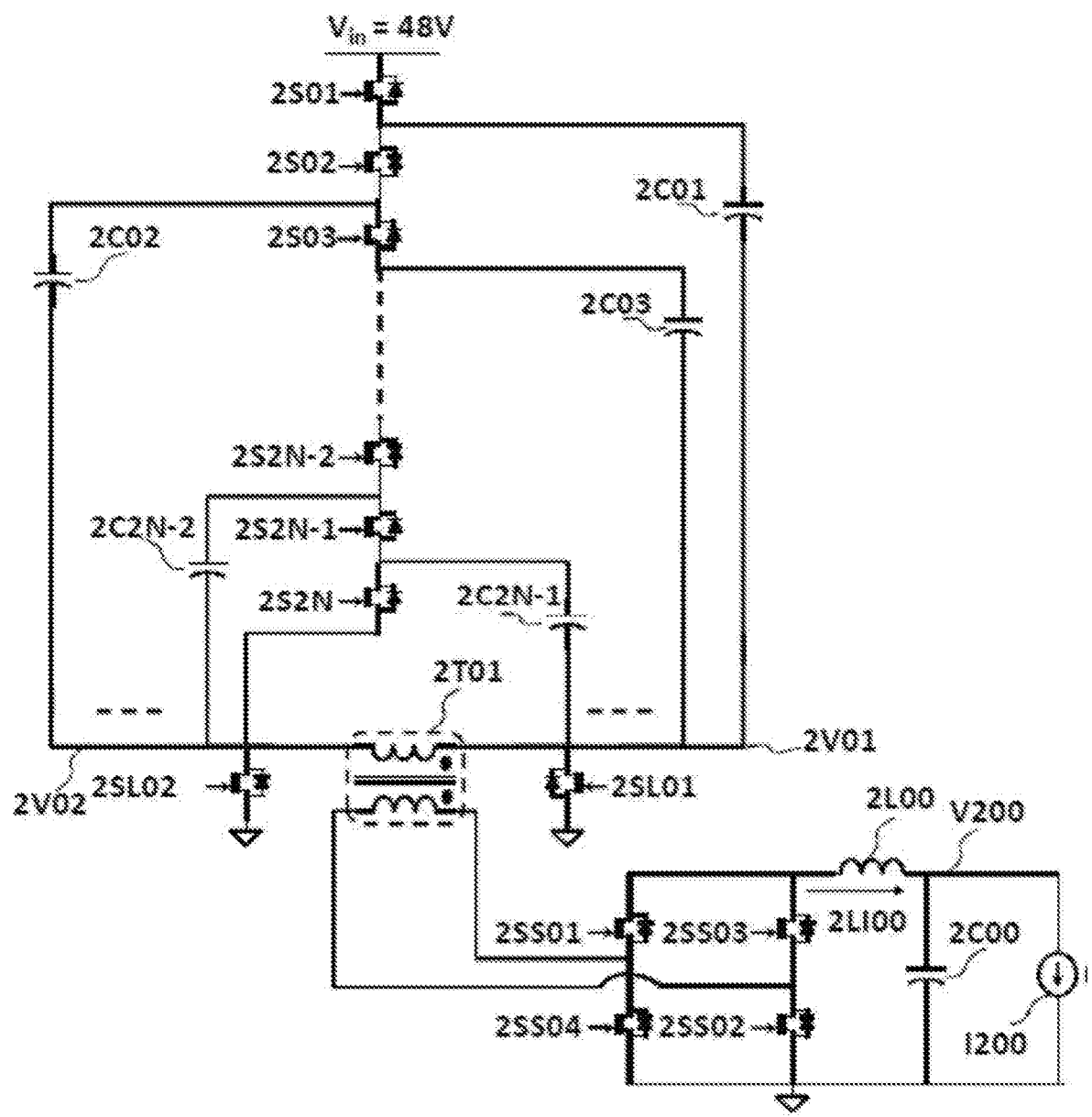
Figure 18D:
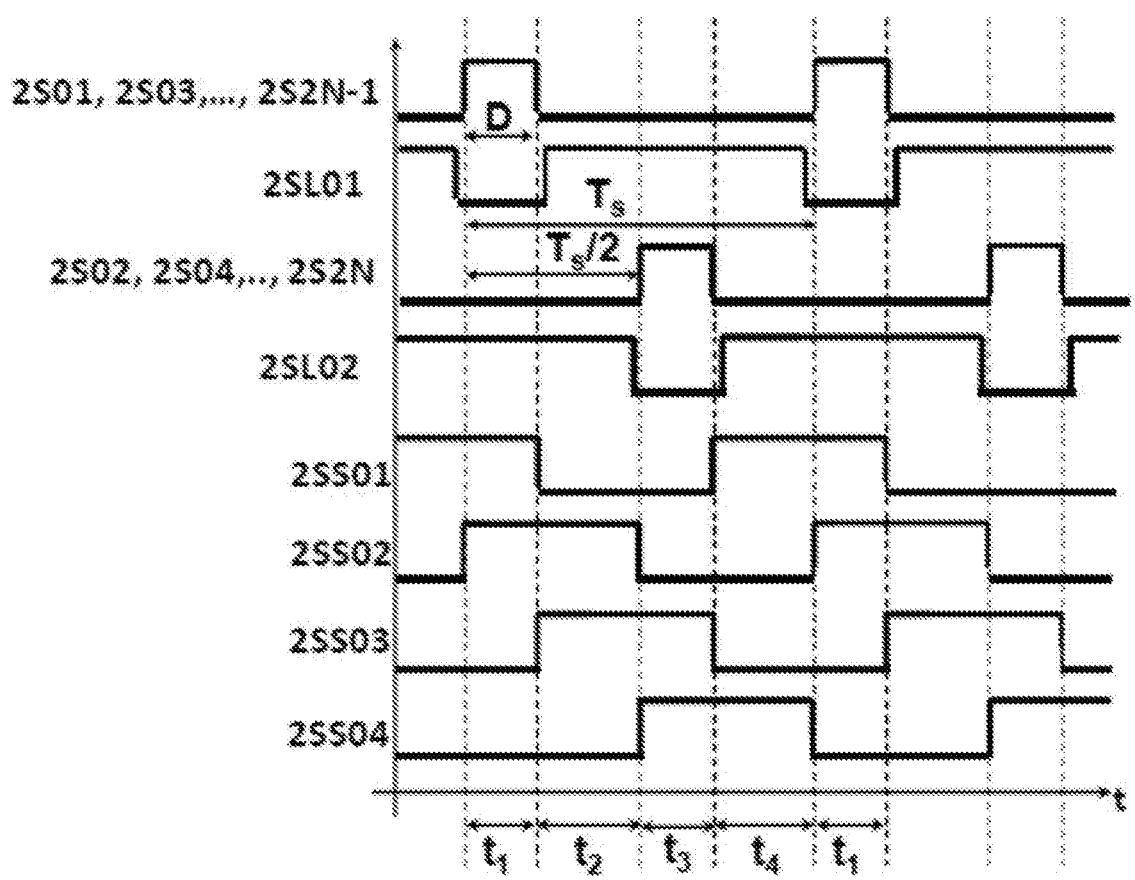

Regulator presented in FIG. 18A is extended to 2N+1 levels in FIG. 18C considering ground as one level. It has 2N number of higher-level main network switches, two lower level switches and 2N−1 number of capacitors. All the odd numbered capacitors in the network are connected to node 2V01 with their second terminal, while all the even numbered capacitors are connected to 2V02. In this particular implementation, as the transformer needs symmetricity in its primary two ports, presented switched capacitor inverting network should only be extended to odd number of levels, although, it can also be operated if the level number is even. FIG. 18D includes the timing diagrams for the 2N+1 level extension in FIG. 18C.

The same inverting network can be operated in other ways, too. Such as, the higher level main network switches can be provided with on individual PWM signals with a total number of phases equaling the number of the levels and keeping on the lower level switches 2S01 and 2SL02 while related phases of PWM signals low, which will increase the frequency of them but will give the opportunity of selecting a smaller size transformer, thus, save space.

FIGS. 19A-19D present a similar switched capacitor inverting network which is different in architecture, yet the same in operation and can be reduced again to the inverting network of FIGS. 18A-18D.

Instead of tying all the odd numbered capacitors together and even numbered capacitors together, the second terminals of each capacitor, in these examples, is connected to a lower level switch with using the intermediate nodes as individual switching nodes. This makes the number of switching nodes equal to one less than the number of levels.

Figure 19A:
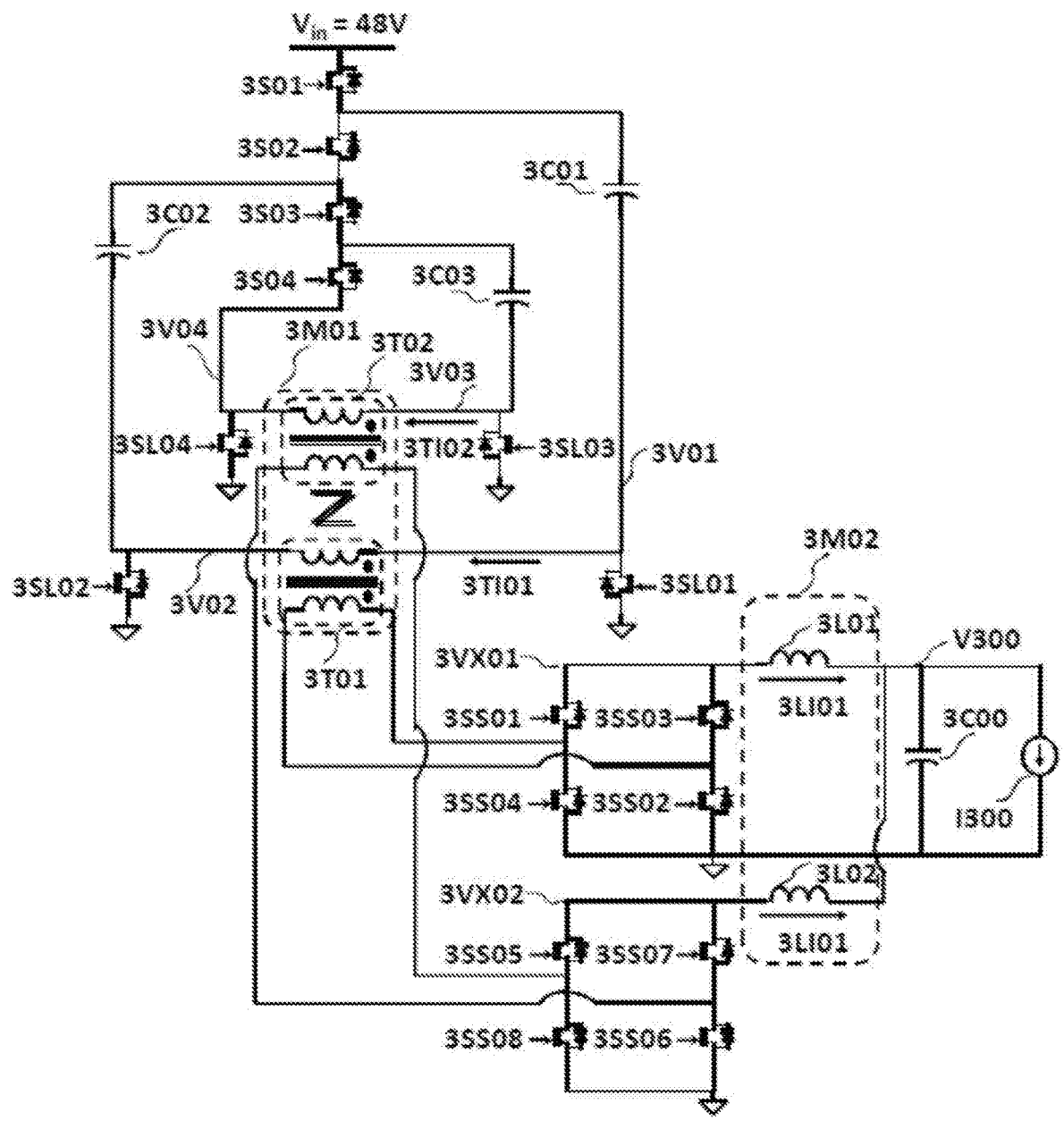
FIGS. 19A-19D show a derived version of an inverting network from FIGS. 18A-18D, which has a higher number of switches in the network and can be interfaced with higher number of transformers.

In FIG. 19A, a five-level network considering ground as one level, is present which has four switching nodes 3V01 to 3V04, four lower level switches 3SL01 to 3SL04. Higher number of switching nodes can also drive more transformers and rectifiers as evident from the figure that the voltage regulator has two transformers and two rectifiers followed by two output inductors. Having multiple paths for output current flow is advantageous that it divides the current path and reduces power losses in the regulator. For higher current, it is common to include multiple regulator module to serve one load. With the same inverting network, the regulator is combination of multiple modules from transformers to filter inductors stages. For better efficiency and integration, the transformers can be integrated in one single magnetic structure. This is also true for the output filter inductors.

Figure 19B:
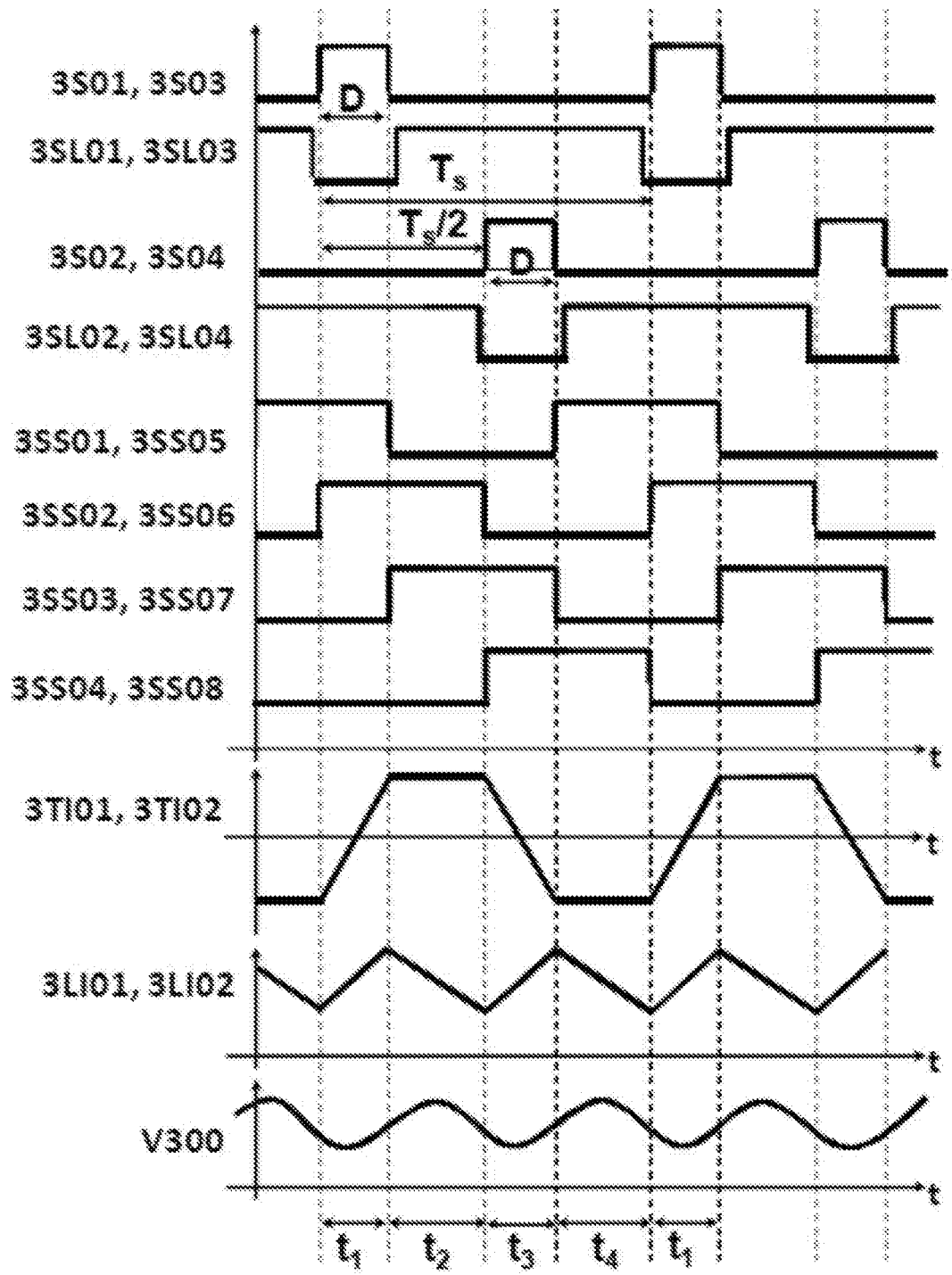
Figure 19C:
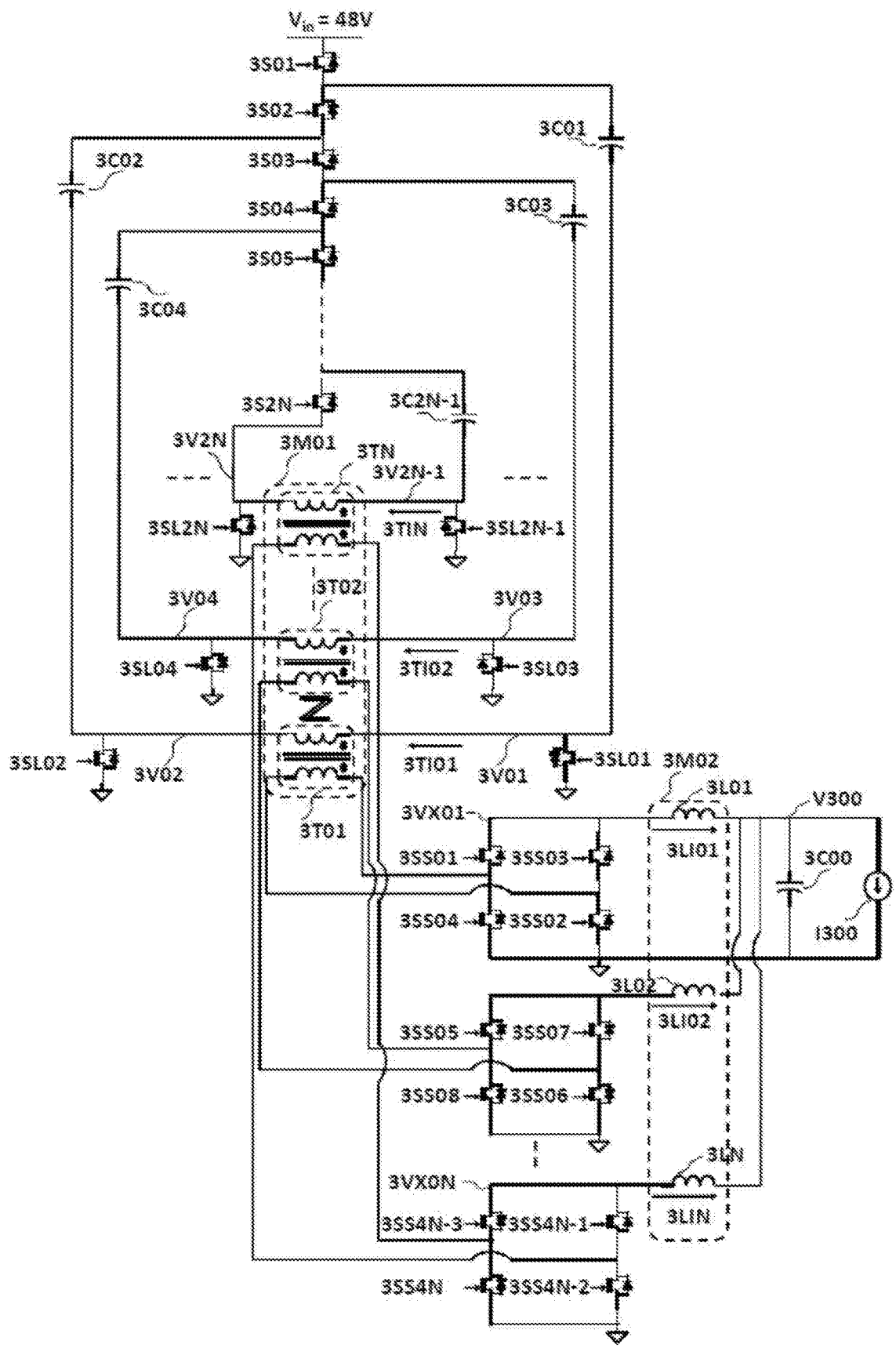
Figure 19D:
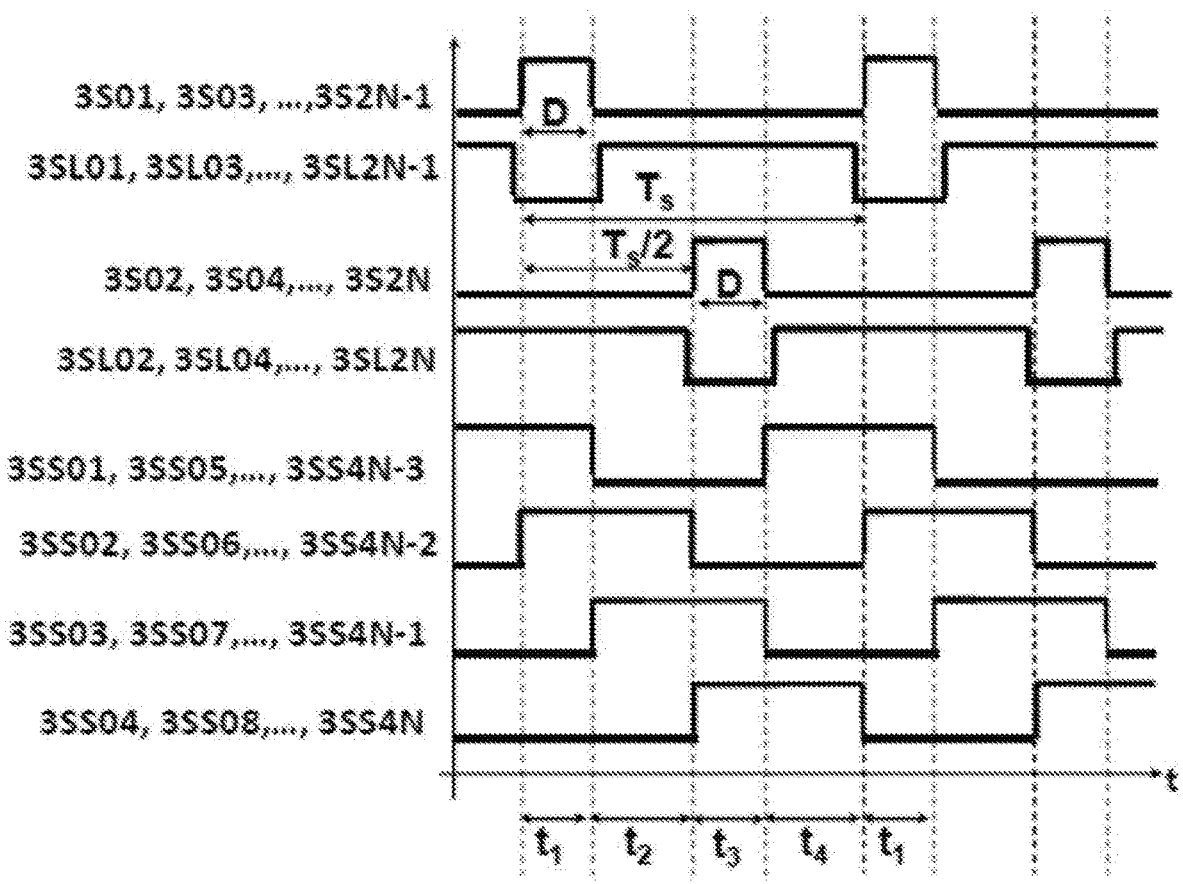

FIG. 19B shows the timing diagrams and wave shapes for the regulator in FIG. 19A. FIG. 19C is an example multi-level extension of this type of switched capacitor inverting network. It has 2N+1 number of levels, where, N can be any number greater than 1. Also, the timing diagrams for the multilevel version is shown in FIG. 19D.

Note that, for N=1, regulators of FIGS. 18C and 19C will be same. Moreover, all the operation possible for the regulators of FIGS. 18A-18D are also possible in the regulators shown in FIGS. 19A and 19C. Also, this regulator can be operated with any number of pairs of 180-degree phase shifted signals for the main network switches less than 2N. The only constraints for this operation is that any two-consecutive switches in the main network cannot be on at the same time. The output filters after the rectifiers cannot be coupled together with keeping the converter's operation ranging for a wide output voltage range.

Figure 20A:
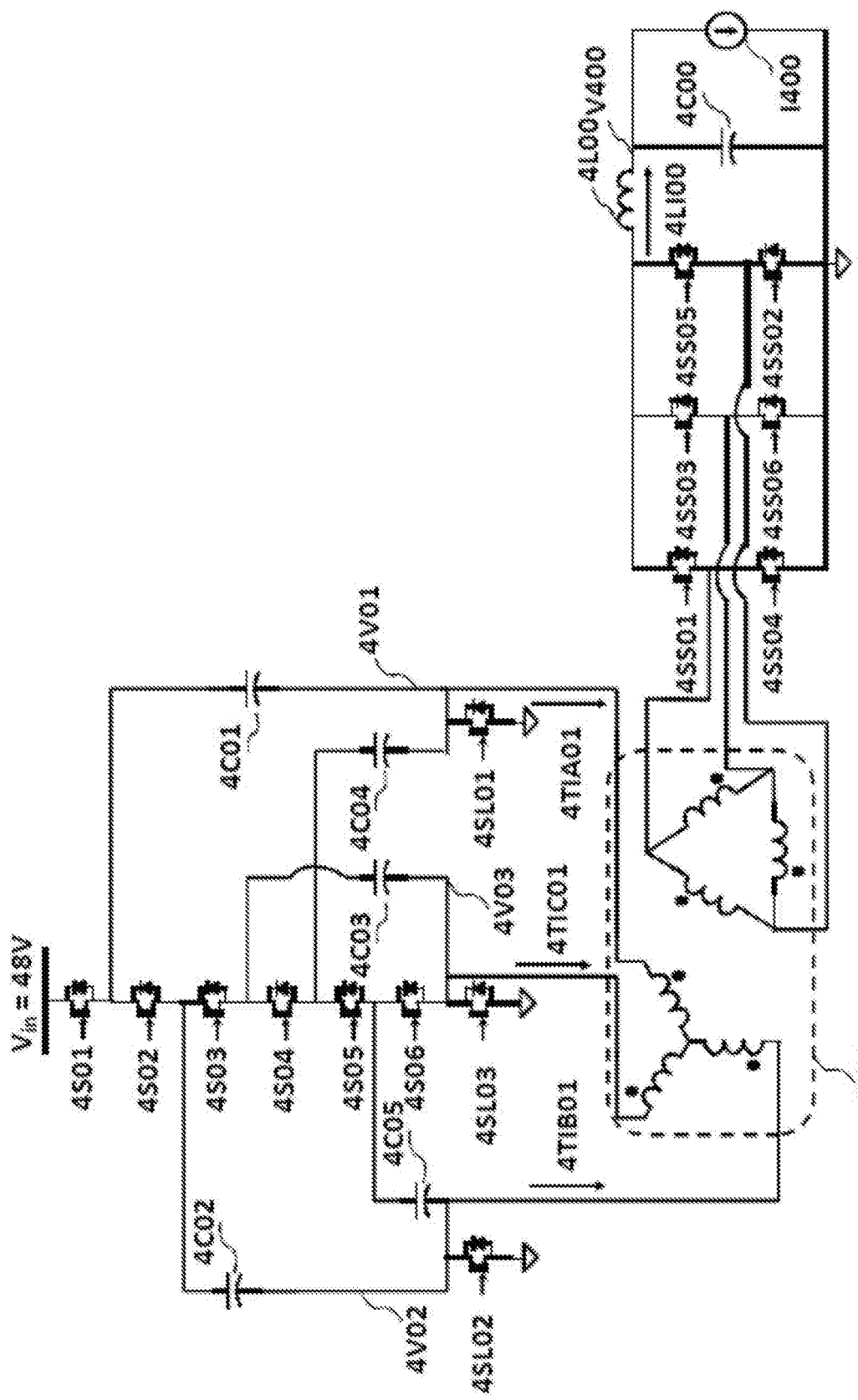
FIGS. 20A-20D and 21A-21D are example three phase version of the voltage regulators presented in FIGS. 18A-18D and 19A-19D, respectively.
Figure 20B:
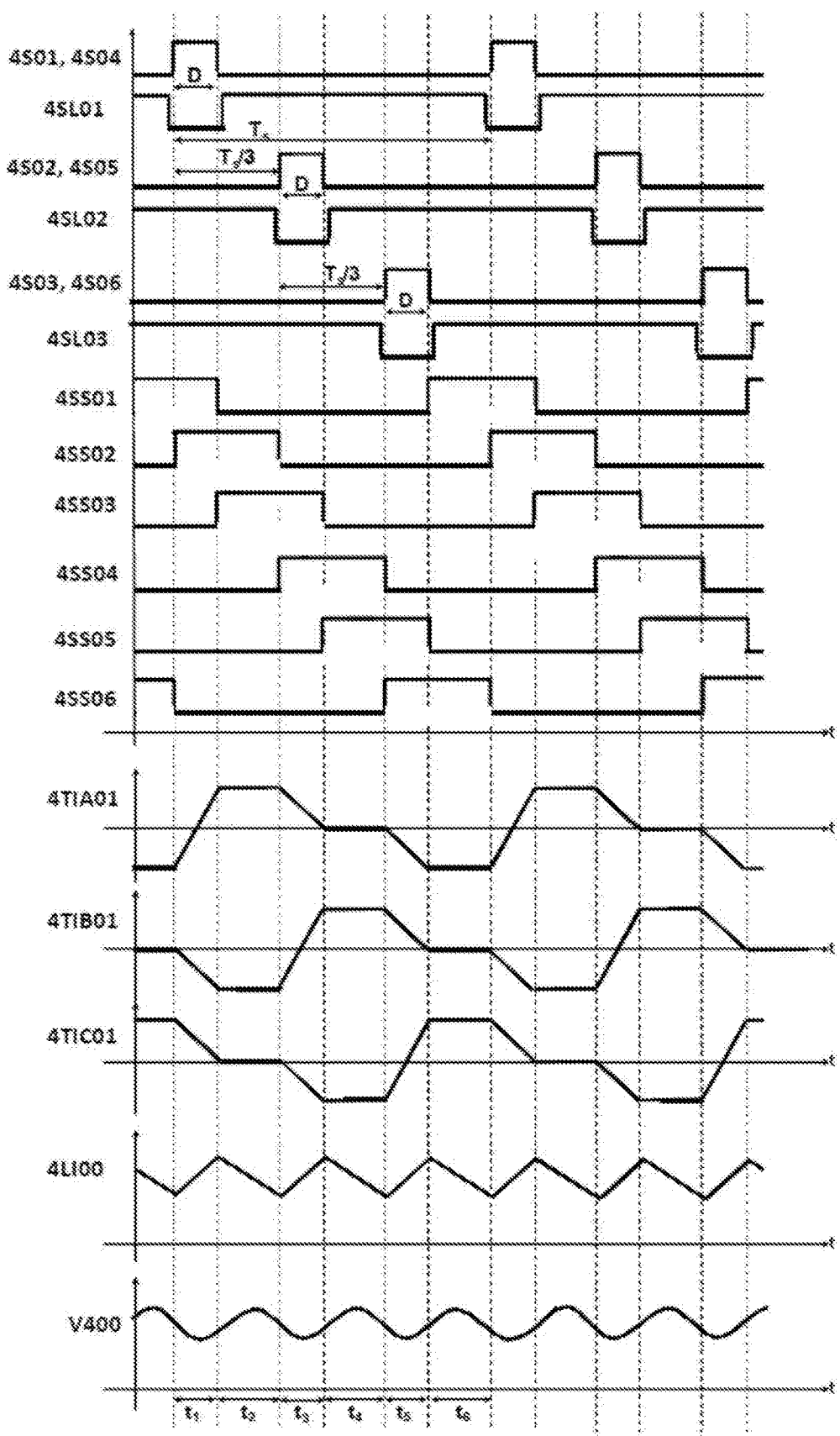

FIGS. 20A-20D show example three-phase extensions of the switched capacitor inverting network from FIGS. 18A-18D. The regulator in FIG. 20A generates three-phase inverting voltage at nodes 4V01 to 4V03. These voltages are fed into a three-phase transformer. Because of the focused application in these particular examples is for high conversion ratio converters, the three phase transformer has been selected as Wye-Delta connection. It can essentially be replaced with other type of three phase transformers. A main inverting network presented in FIG. 20A is a seven-level version considering ground as one level, which have six main network switches, three lower level switches and five capacitors. Example timing diagrams of the regulator are shown FIG. 20B. Three 120-degree phase shifted signals and their inverter signals drive the main network switches. The main PWM signals can have a maximum duty ratio of 33% and, in this particular embodiment, should be exactly of the same phase shifted for the proper operation of the transformer. In each of the on time of the PWM signals, one of the three inductor currents linearly increases from negative to positive and in the next two on times of the PWM signals, it decreases back to negative. Such as current 4TIA01 increase in the on time of the switch 4S01 and 4S04, then it goes to negative in two steps in the on time of 4S02 and 4S05 and in the on time od 4S03 and 4S06.

Figure 20C:
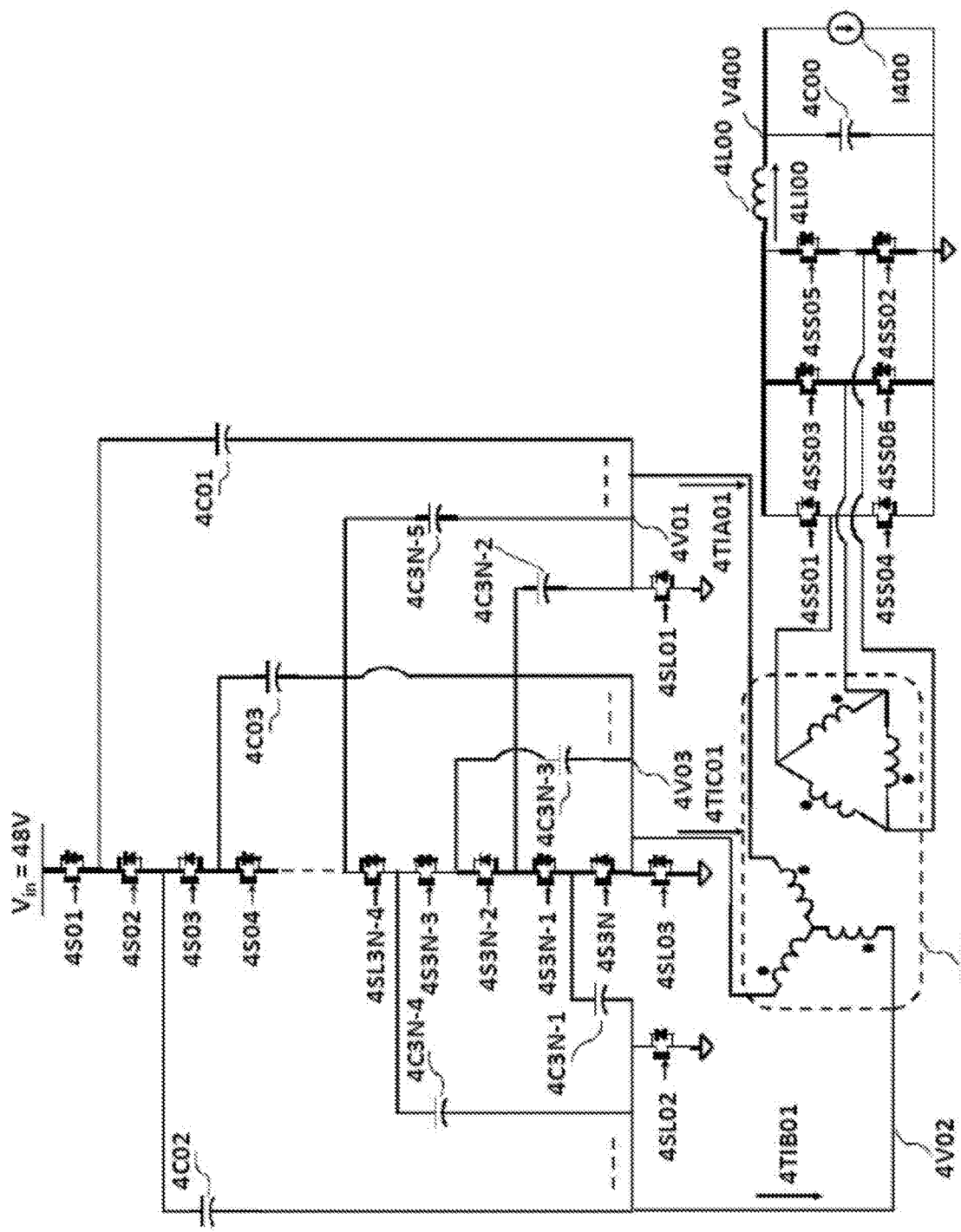
Figure 20D:
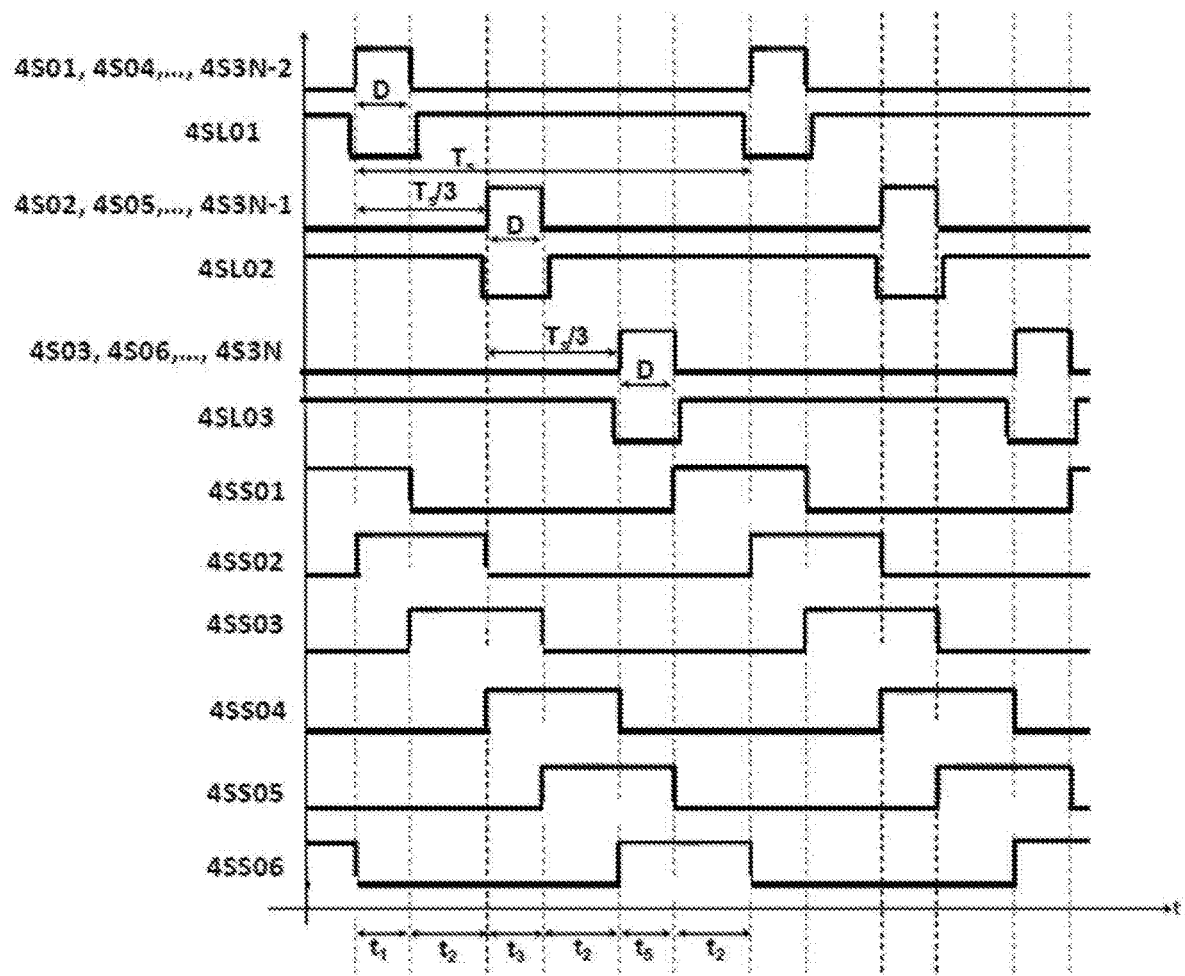

FIG. 20C is a 3N+1 level extension of the regulator, where N being any integer number greater or equal to one. FIG. 20D shows the timing diagrams of the multi-level version. This converter can operate in all the operations possible for the regulator in FIG. 18D, except that three phase signals are provided.

Figure 21A:
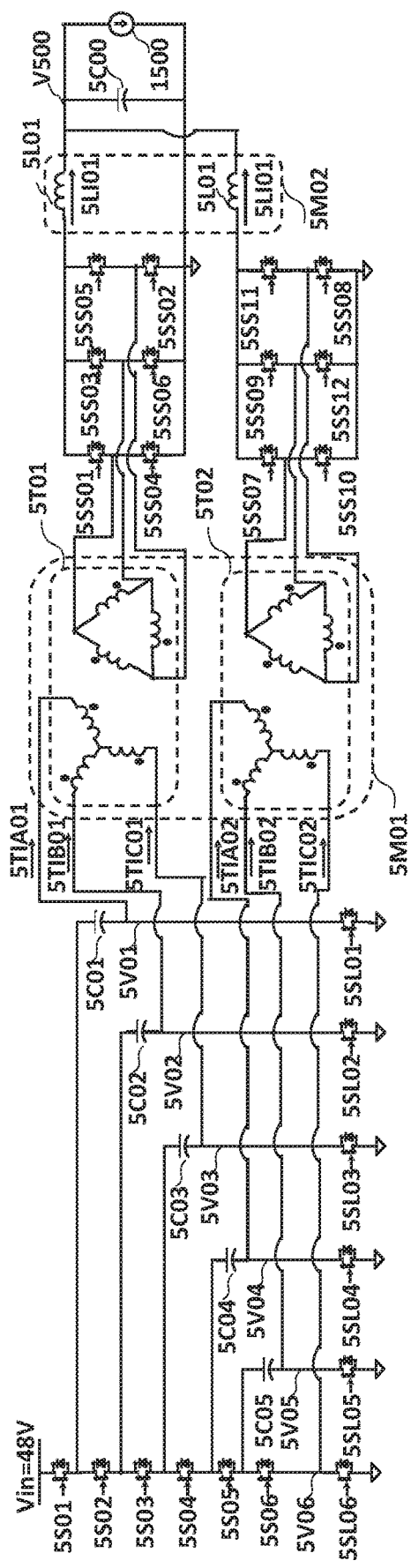
Figure 21B:
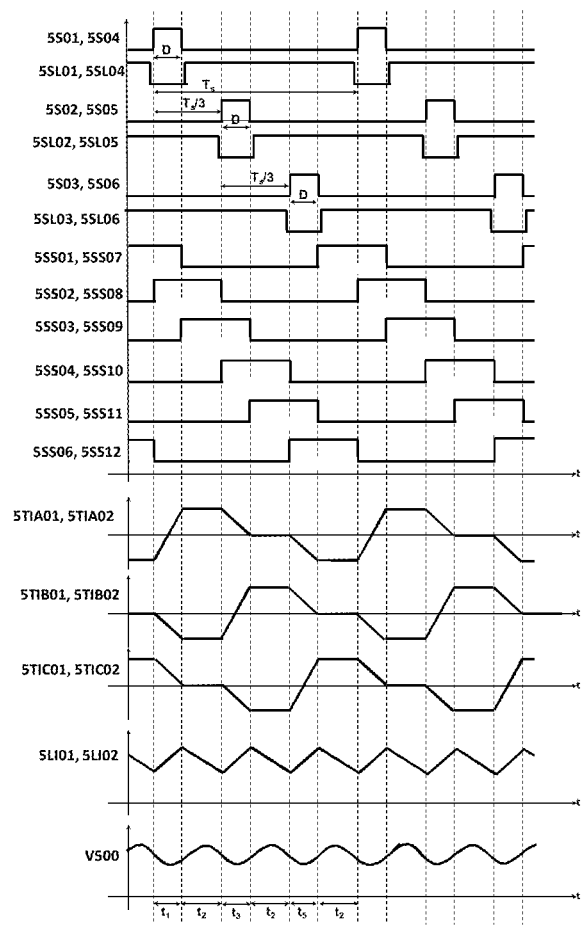

FIGS. 21A-21D show a three phase extension of the regulator in FIGS. 19A-19D. Such as, in FIG. 21A, all the second terminals of the capacitors are separated and connected with lower level switches 5S01 to 5S06 which are at the ground level. A set of three 120-degree phase shifted signals can drive the main network switches while their inverted signals can drive the lower level switches. This regulator generates two sets of three phase inverting signals at nodes 5V01 to 5V06. Nodes 5V01 to 5V03 drive a three phase transformer while the rest of the three nodes can drive another transformer. The current into each transformer branch are shown in FIG. 21B along with the timing signals required for the operation.

Figure 21C:
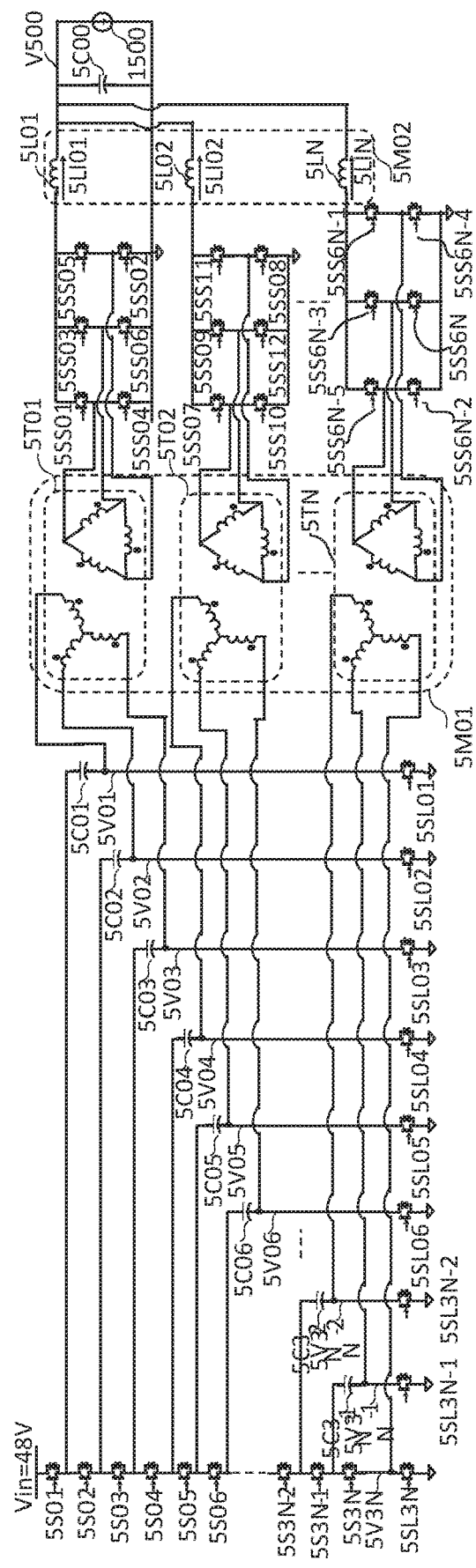
Figure 21D:
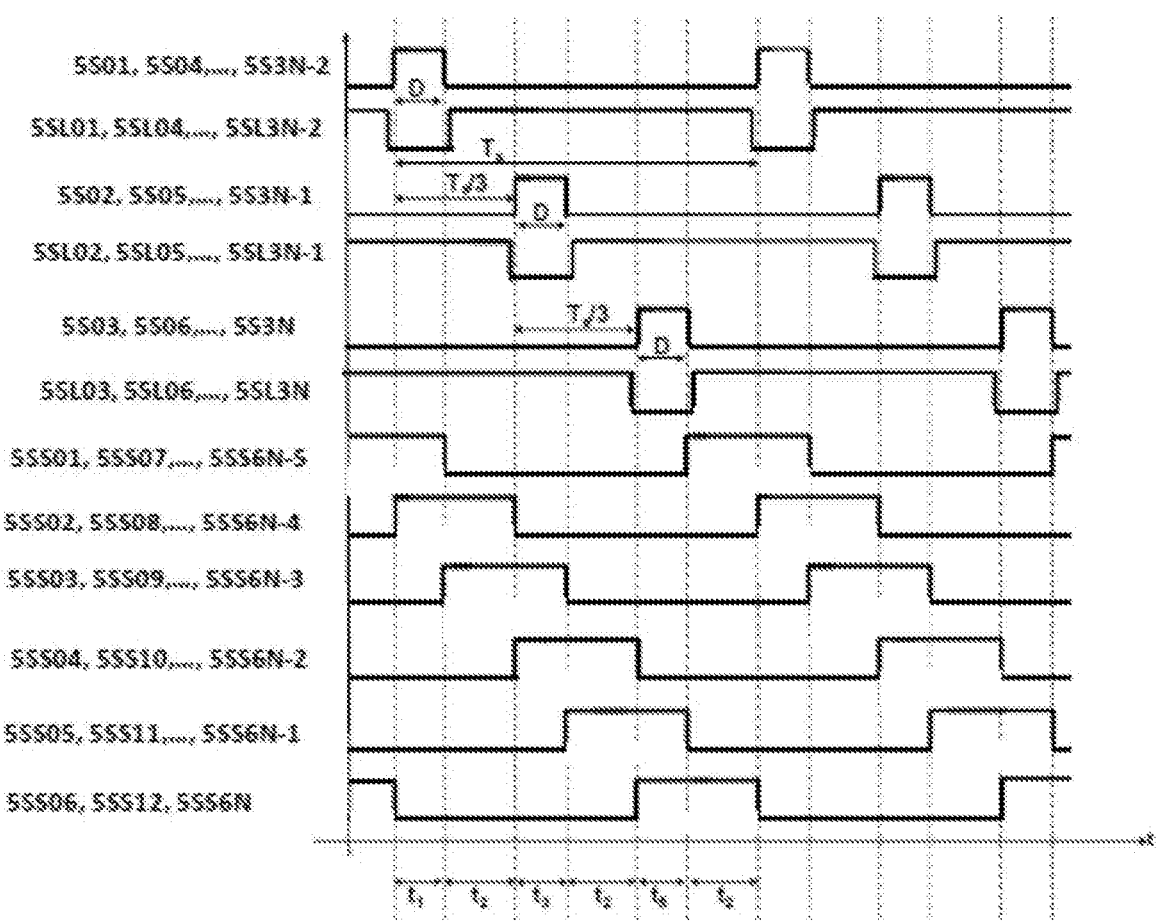

FIG. 21C represents a 3N+1 level version of these type of regulator having N transformers considering ground as one level. All the transformers can be implemented in one magnetic structure and also the output filter inductor can also be couple in another single magnetic structure. FIG. 21D shows the timing diagrams for the multi-level version of these type of converters.

Note that, this converter can be operated in all possible operation by the regulator of FIGS. 19A-19D, except requiring the three phase gate driving signals. Also, the regulator of FIGS. 21A-21D can be reduced if same type of switching nodes are tied together. That will reduce the total number of transformers, rectifiers and output filter inductors. Doing so for all the nodes will re-create the regulator of FIGS.

20A-20D, respectively. With the drawn structure it can already operate in all the operating conditions of FIGS. 20A-20D.

Figure 22A:
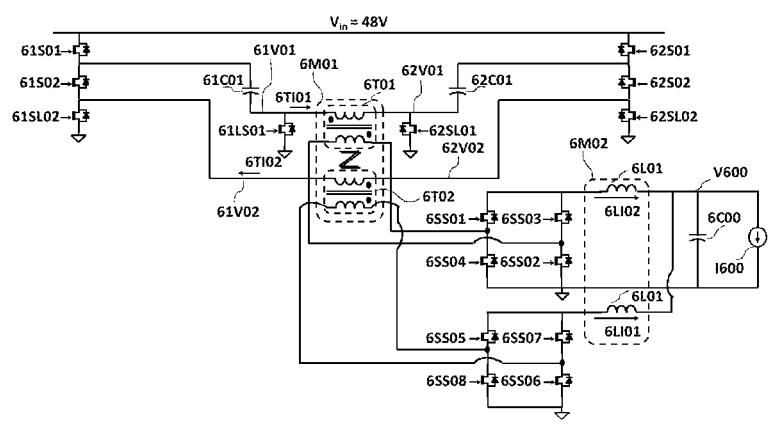
FIGS. 22A-22D and 23A-23D use the same switched capacitor inverting network in FIGS. 19A-19D, but operate symmetrically with transformers with two networks for single phase (FIGS. 22A-22D) and with three networks for three phase (FIGS. 23A-23D).
Figure 22B:
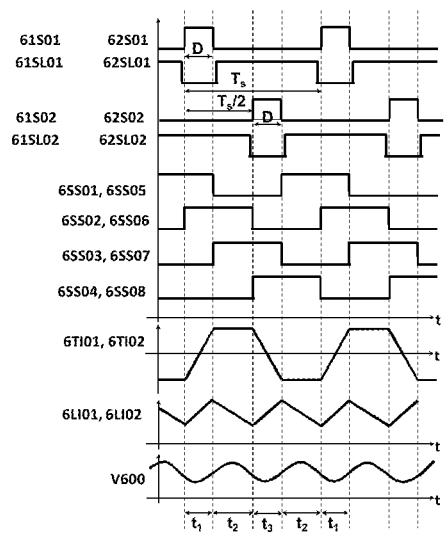

FIGS. 22A-22D present another type of transformer-based DC-DC converter utilizing the switched capacitor inverting network of FIG. 19A-19D. In this arrangement, same type of switching nodes from two different inverting network drive two ports of each transformer giving full symmetric operation for the transformer. FIG. 22A presents the simplest possible version of symmetric switched capacitor inverting networks. Two symmetric networks drives transformers.

Figure 22C:
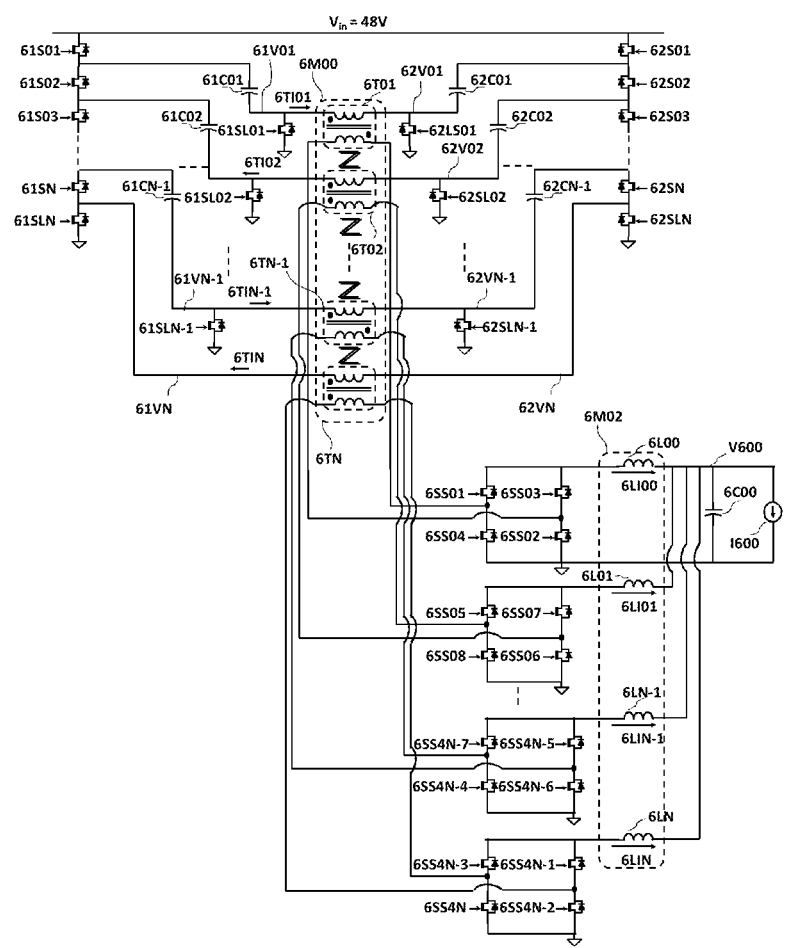
Figure 22D:
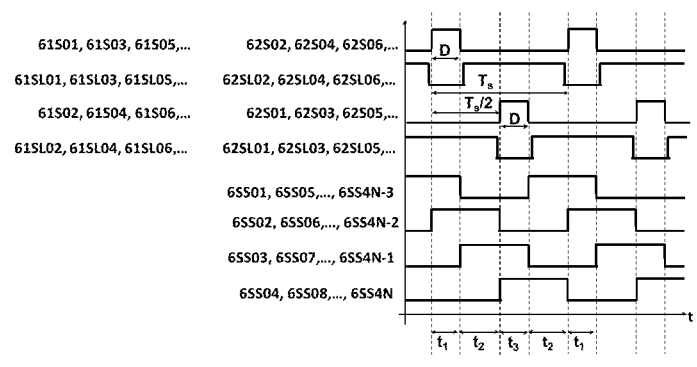

FIG. 22C drives is the multilevel extension of the symmetric inverting networks. The inverting networks can be of any levels. But the structure of transformers changes depending on the number of the level, it is connected. It can be seen that, transformers connected to odd numbered switching nodes from the top have dots in the opposite sides while transformer connected with even numbered switching nodes have dots in the same side.

Figure 23A:
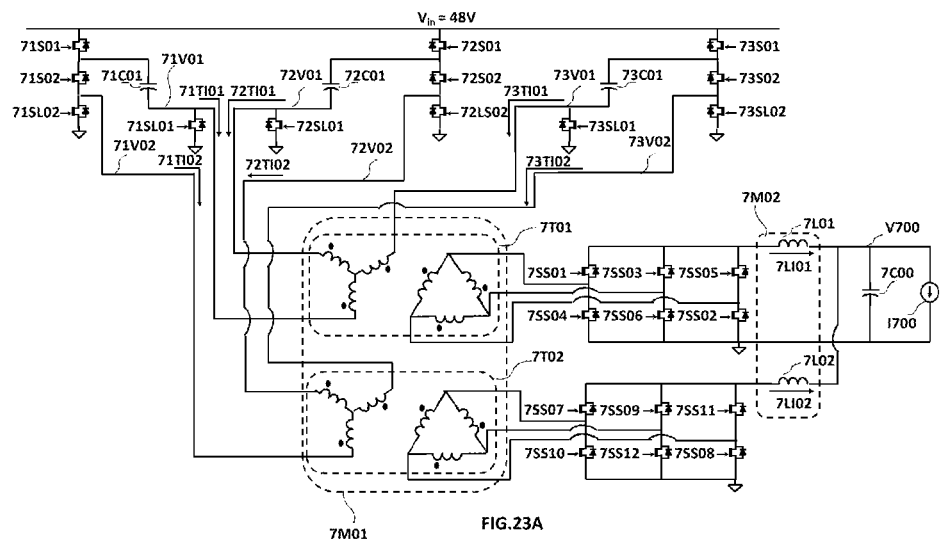
Figure 23B:
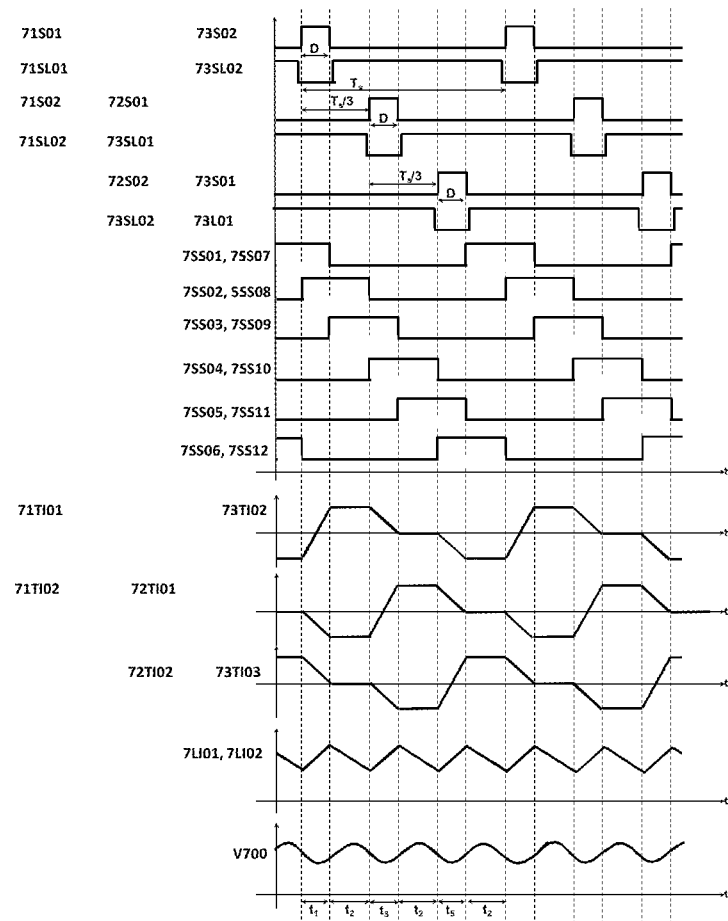
Figure 23C:
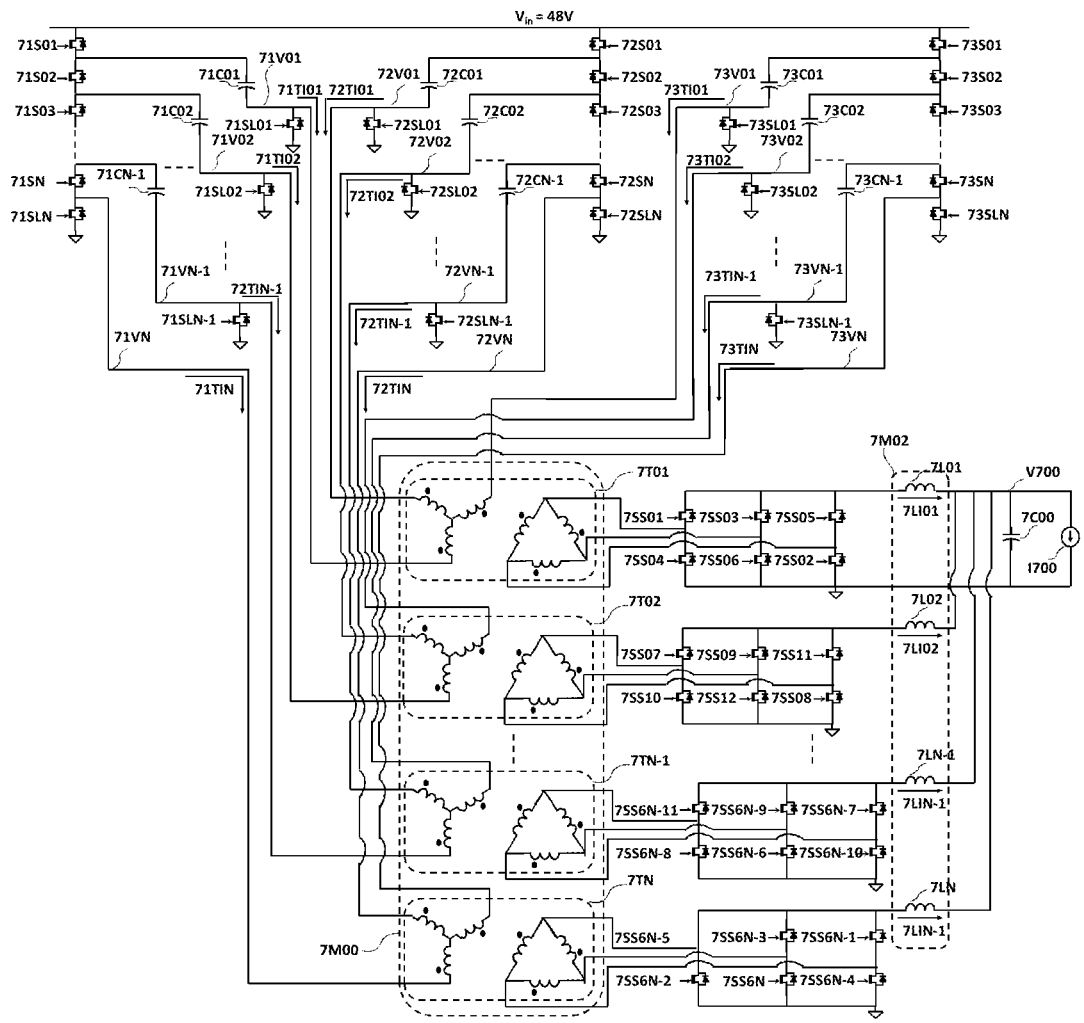
Figure 23D:
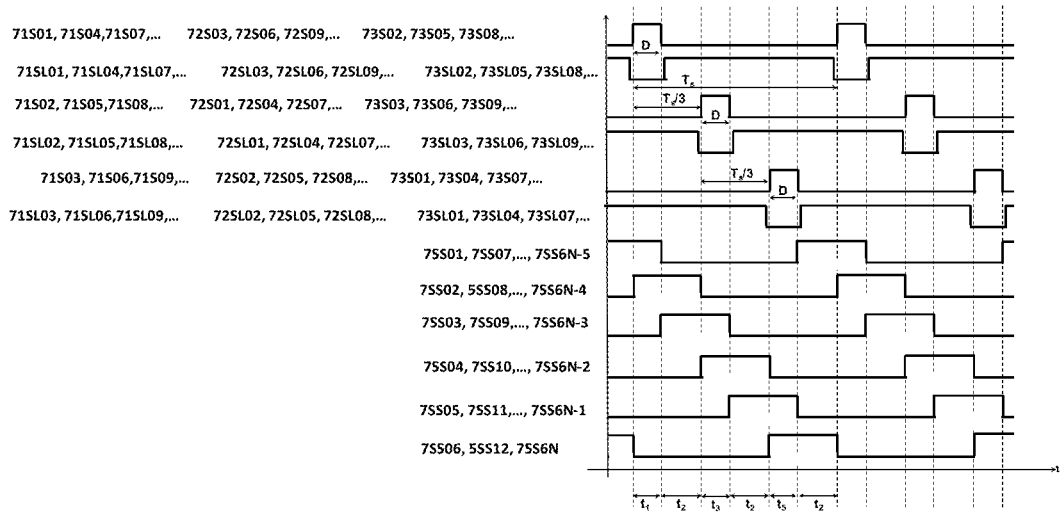

FIGS. 23A-23D show three phase extensions of the regulators shown in FIGS. 22A-22D and utilizes the switched capacitor network from FIGS. 19A-19D. Three switched capacitor inverting networks drive a three phase transformer so that each phase of the transformer sees same type of switching voltages at their primary side. FIG. 23A is the simplest possible regulator of this type. The timing diagrams for this regulator are shown in FIG. 23B along with wave shapes. FIG. 23C is a multilevel extension of this type of regulator.

Figure 24A:
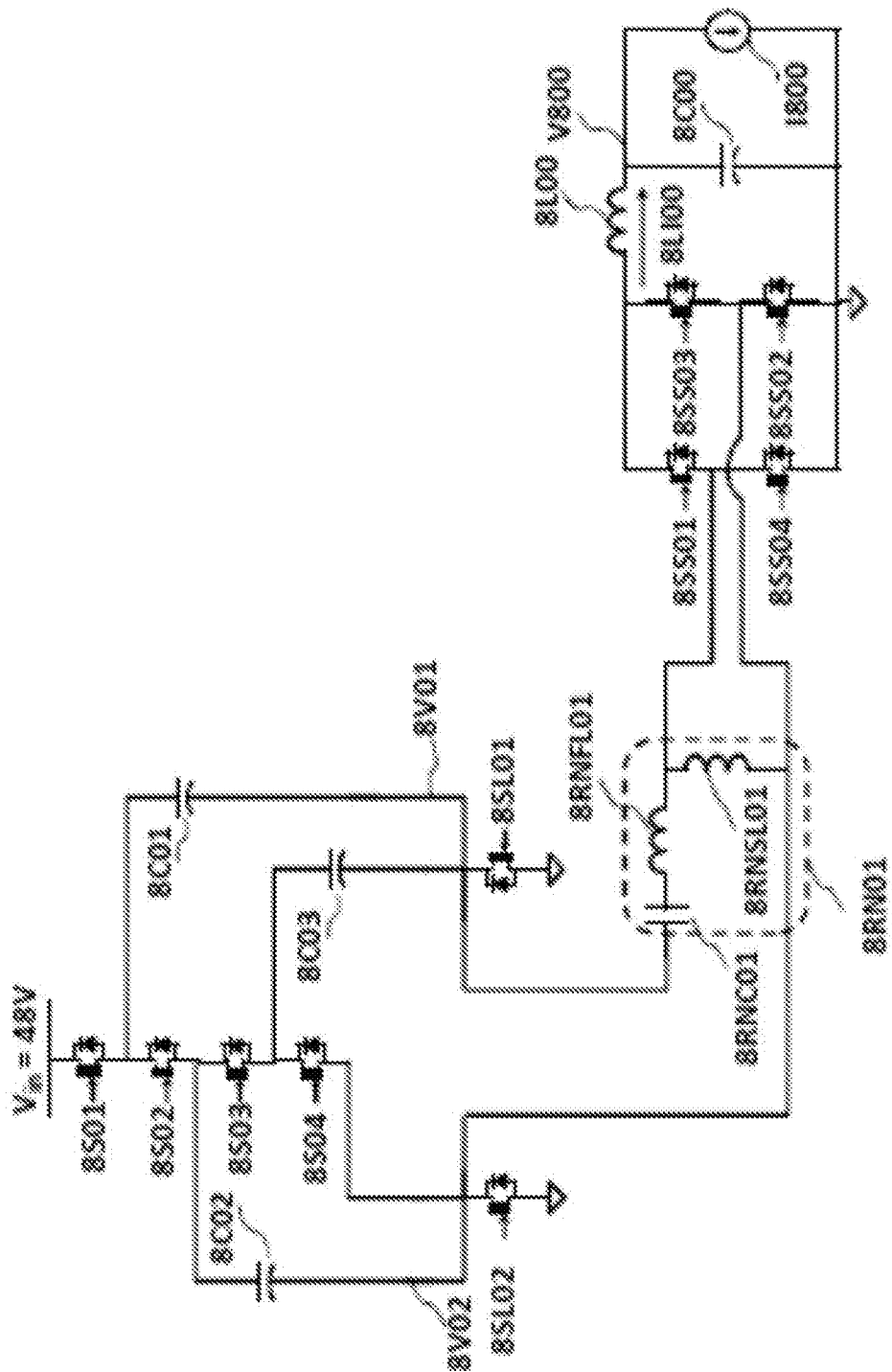
FIGS. 24A-24D use the same switched capacitor inverting network in FIGS. 18A-18D with a resonance network.
Figure 24B:
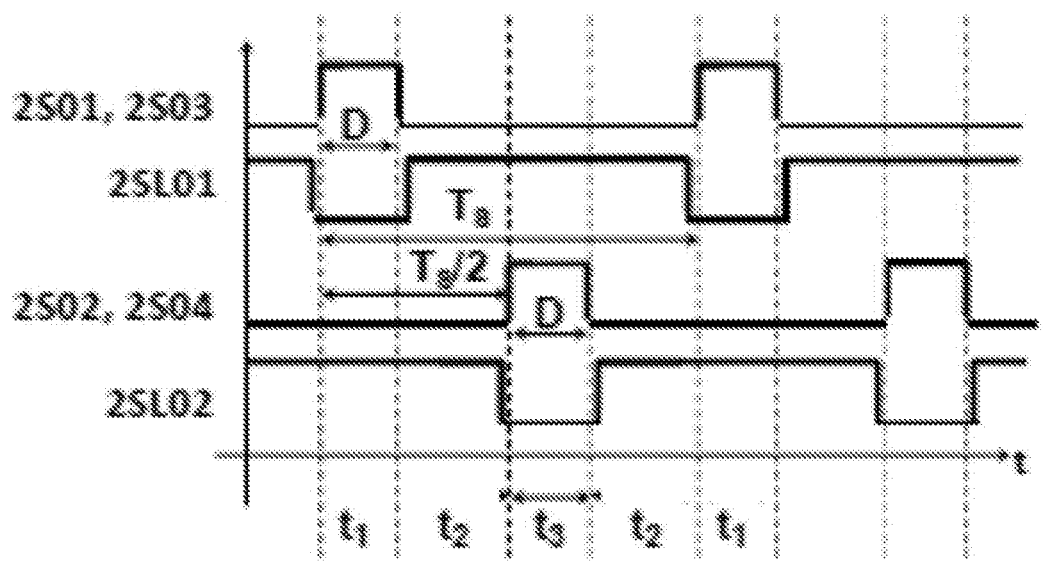
Figure 24C:
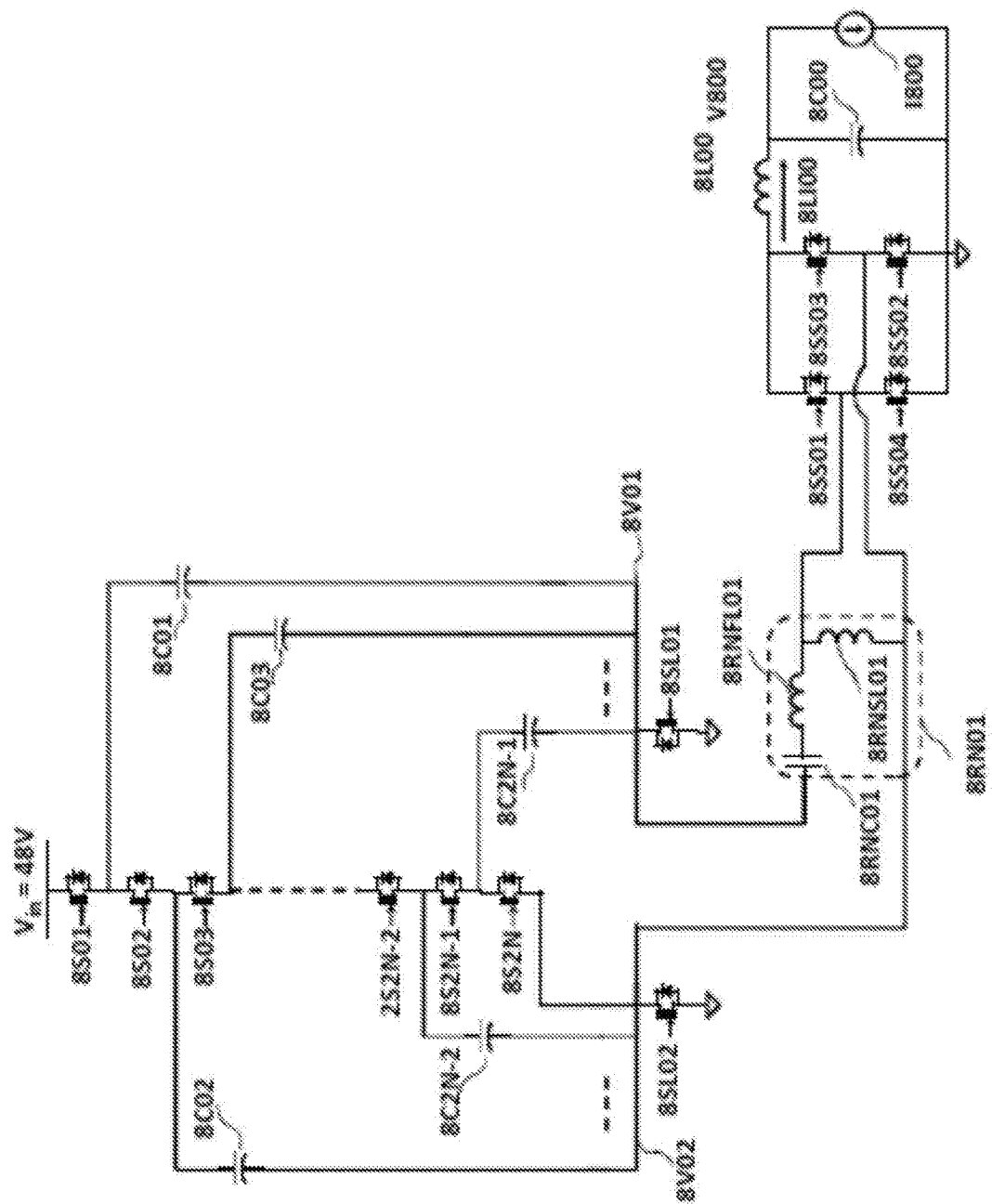
Figure 24D:
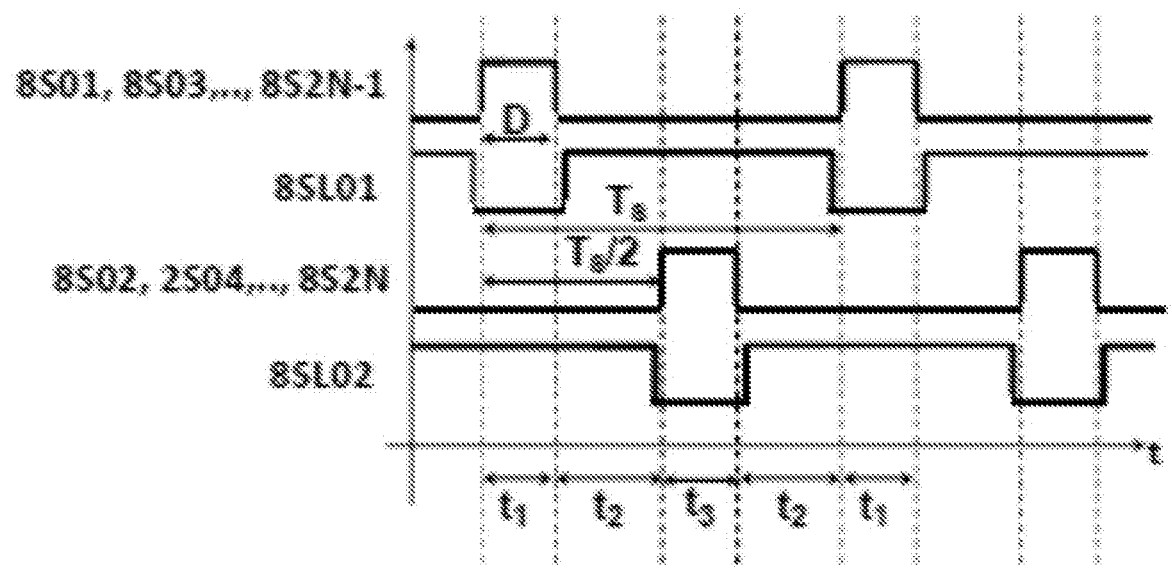
Figure 25A:
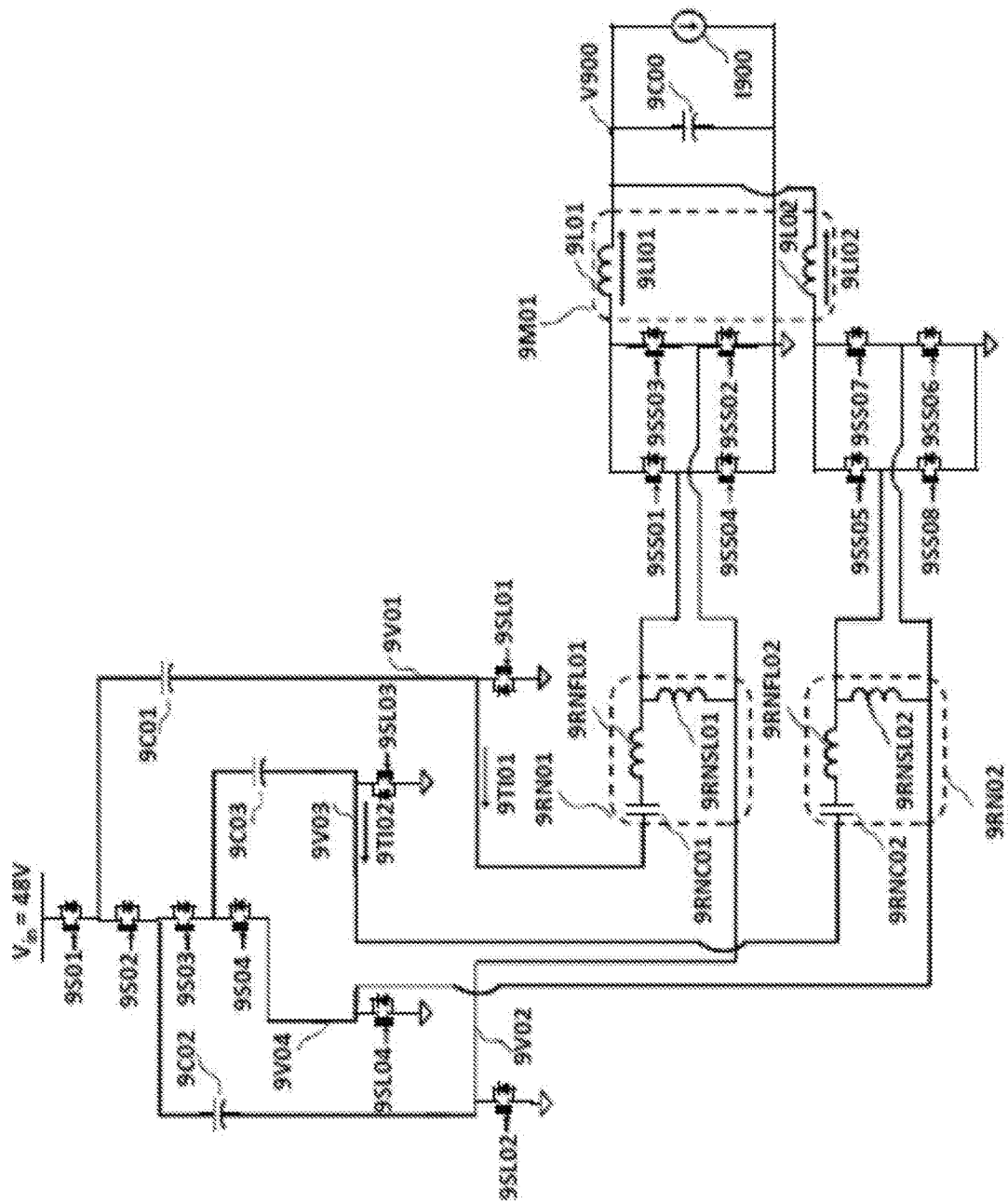
FIGS. 25A-25D use the inverting network from FIG. 19A-19D with a resonance network.
Figure 25B:
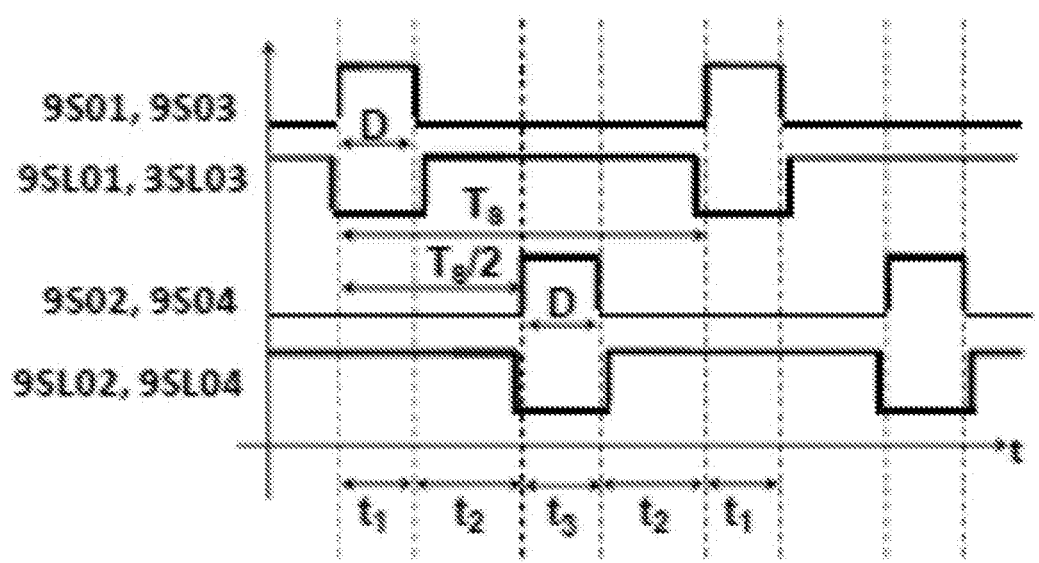
Figure 25C:
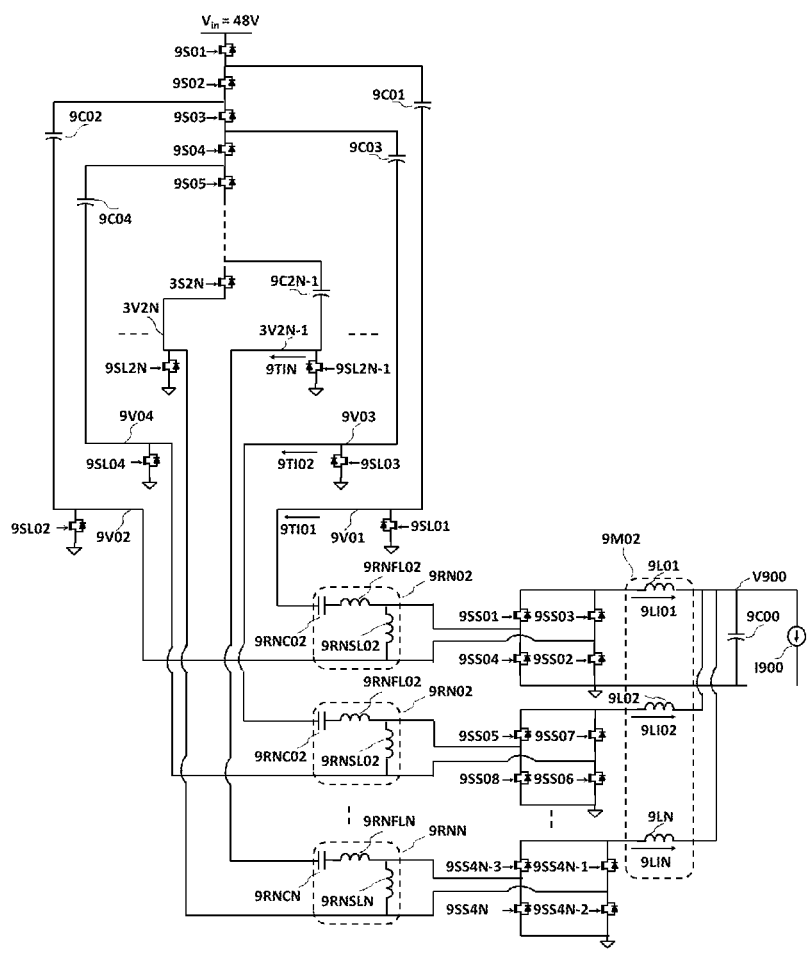
Figure 25D:
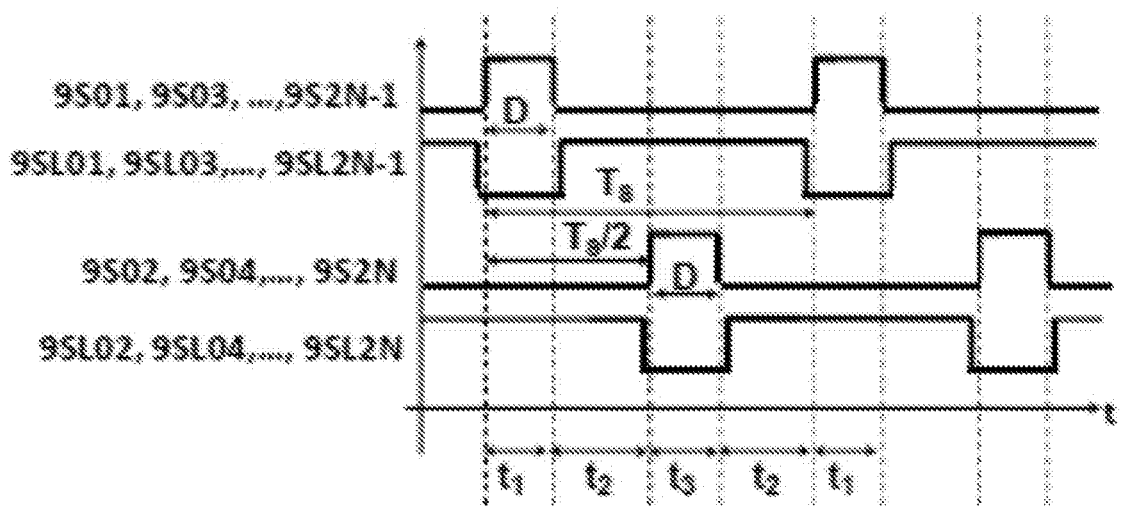

FIGS. 24A-24D utilize the inverting network from FIGS. 18A-18D and show an implementation in a resonant DC-DC converter. FIG. 24A is a simpler version while FIG. 24C is a multilevel extension of this type of converter. The resonant network used in the regulator is an LLC network, although, other networks can also be used. And discarding the rectifying operation, this can also be used in resonant inverter application. FIG. 24B and FIG. 24D shows the timing diagrams required for the regulator of FIGS. 24A and 24C, respectively.

FIGS. 25A-25D utilize the inverting network of FIGS. 19A-19D for a resonant converter application. This can also be extended to multi-level showed in FIG. 25C. Same type of switching nodes can be tied together in this regulator, and doing so for all the switching nodes, will reduce this regulator to the regulator of FIGS. 24A-24D.

Figure 26A:
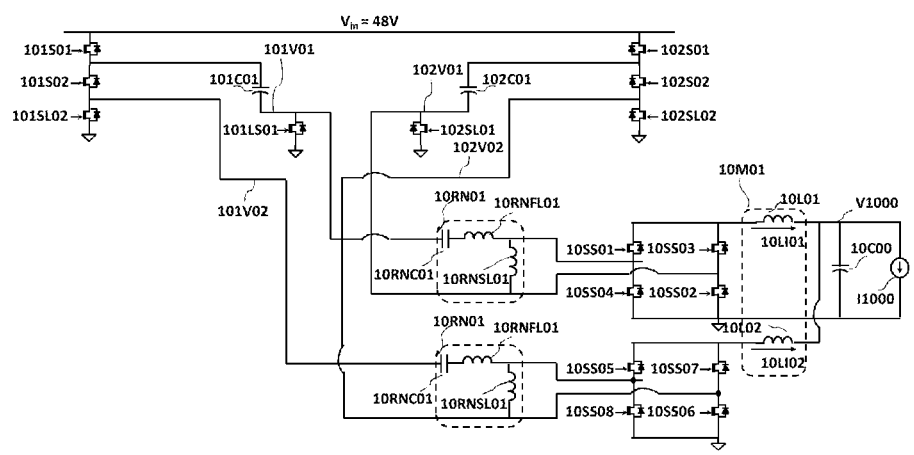
FIGS. 26A-26D also use the same inverting network from FIG. 19A-19D but operates symmetrically with the resonance networks. Each of the figures with suffix A for FIGS. 18A to 26A provide a relatively simple embodiment of a converter. In contrast each of the figures with a suffix C for FIGS. 18C to 26C provide a relatively more complex multilevel extension of the respective converters. Each of the figures with a suffix B for FIGS. 18B to 26B show example timing diagrams and waveshapes for the converters shown in the respective FIGS. 18A to 26A, while the figures with a suffix D for FIGS. 18D to 26D show example timing diagrams for the converters shown in the respective FIGS. 18C to 26C.
Figure 26B:
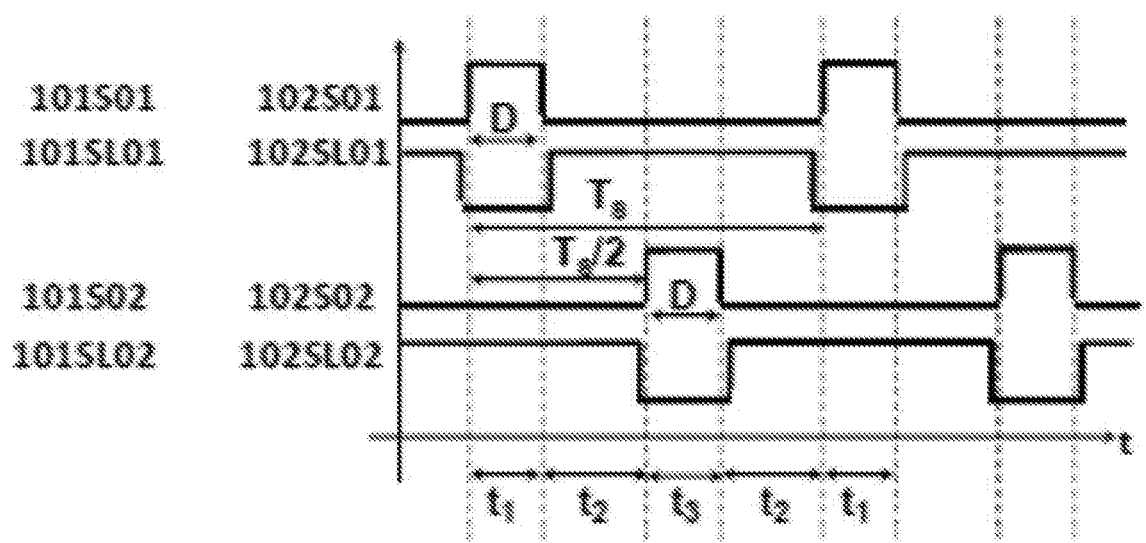
Figure 26C:
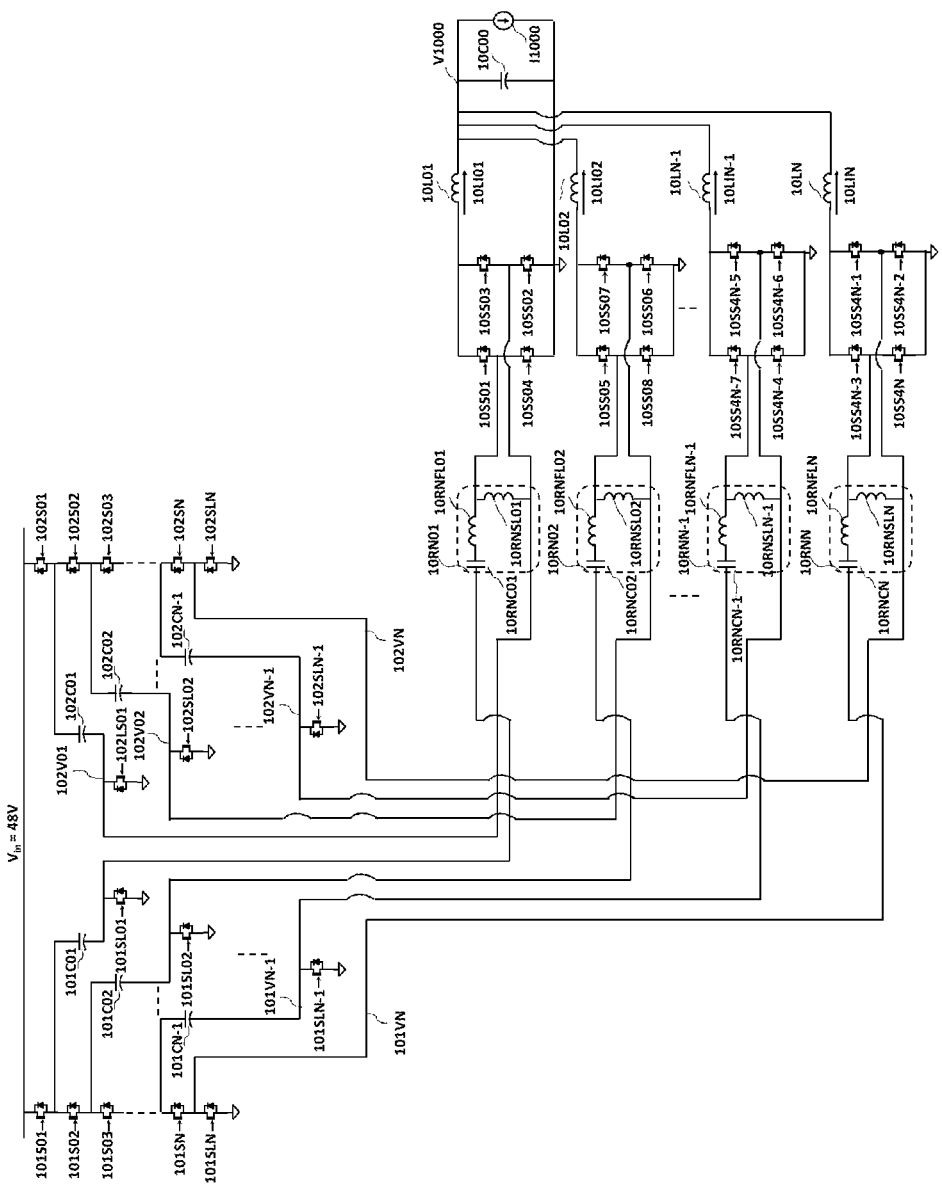
Figure 26D:
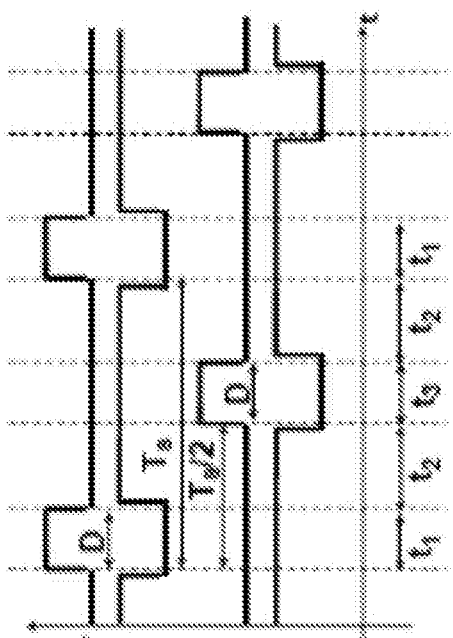

FIGS. 26A-26D utilize the same inverting network as in FIGS. 19A-19D like regulators from FIGS. 19A-19D, 21A-21D, 22A-22D, 23A-23D and 25A-25D. The examples in FIGS. 26A-26D employ two separate inverting networks which provide symmetric voltages for the resonance networks. FIG. 26C is a multilevel extension of the regulator while FIG. 26B and FIG. 26D are the timing diagrams of FIGS. 26A and 26C, respectively.

Figure 27A:
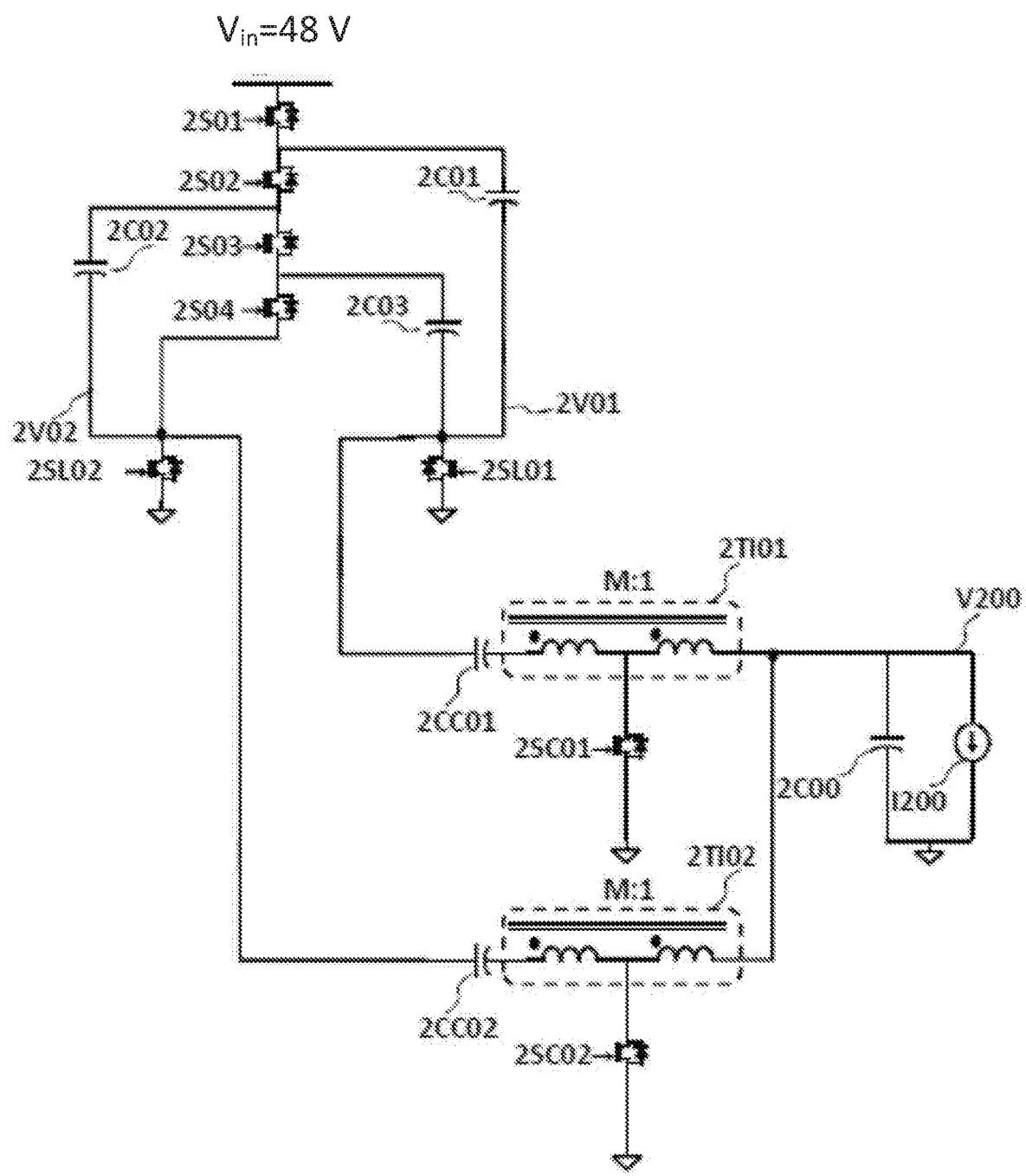
Figure 27B:
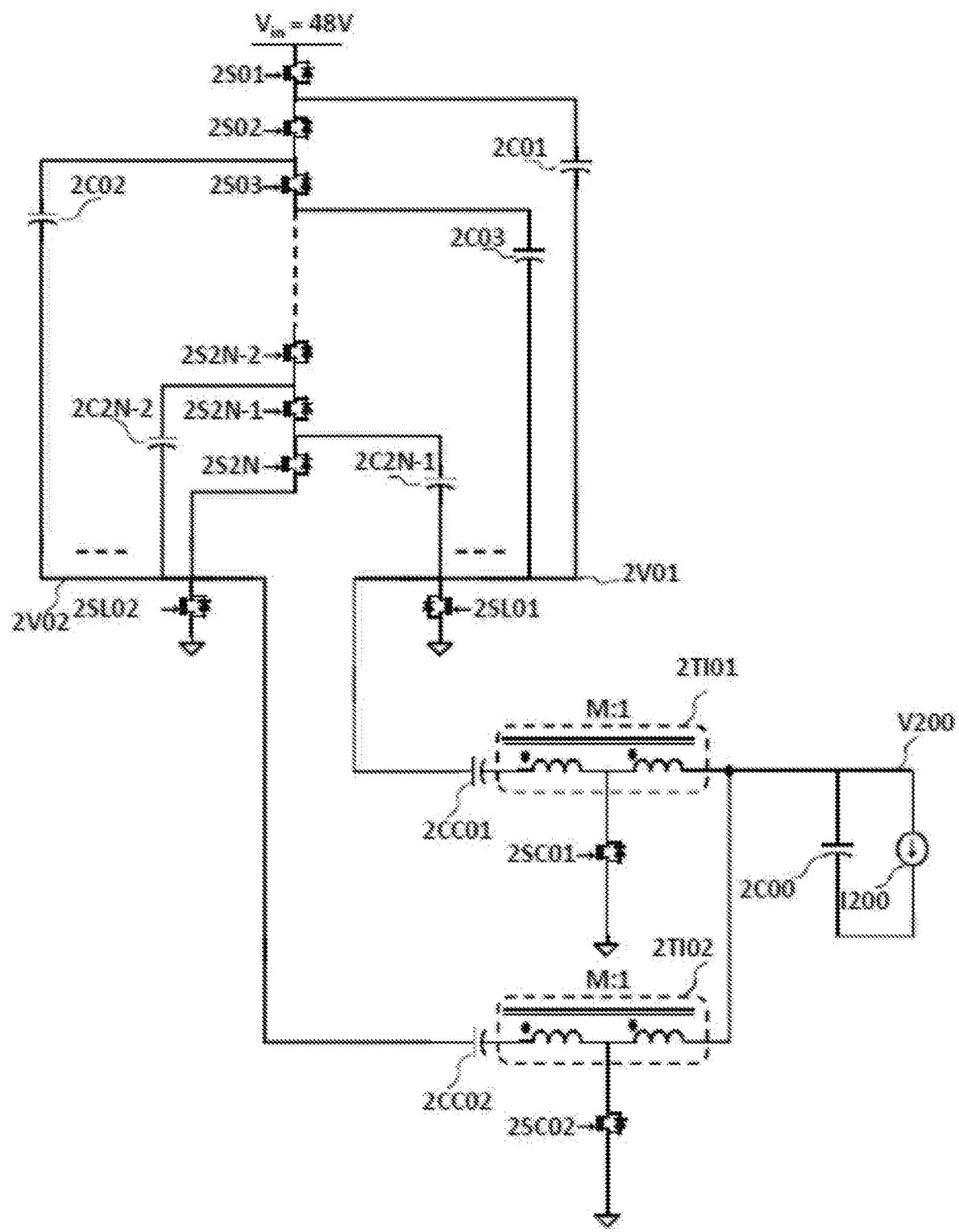

FIGS. 27A-27B show an example DC-DC converter architecture where an inductive network is implemented by a series capacitor tapped-inductor Buck converter which follows a switched capacitor network. As described above, the SC network can be in form of a Dickson SC converter, a ladder, series-parallel, FCML, or another type SC converter architecture. The switched-capacitor network comprises a plurality of switches and one or more capacitors connected with an input voltage node. The switched-capacitor network connects with two or more series capacitor tapped-inductor networks in the inductive network. The series capacitor tapped-inductor networks in these implementations are a type of resonant network that enable to the converter to achieve ZVS and/or ZCS operations for higher overall efficiency.

In FIG. 27A, an example of a DC-DC converter is provided where the inductive stage is formed by a series capacitor tapped inductors Buck converter which follows a switched capacitor network. The switched capacitor network in this example comprises a total of six switches 2S01-04 and 2SL01-02 and three capacitors 2C01-03. Each series capacitor tapped inductor portions comprises one transformer, one capacitor and one switch. This switch can also be replaced with diodes. The shown two series capacitor tapped inductor inductive stages are formed of transformers 2TI01-02, capacitors 2CC01-02 and switches 2SC01-02.

Switches 2S01,03 and 2S02,04 receives 180° phase shifted two PWM signals and 2SL01 and 2SL02 receives their inverted PWM signals. Switched capacitor networks generates pulses voltages of $V_{in}/4$ at nodes 2V01-02 which excite the series capacitor tapped inductor inductive stages connected with them. The turning on of switches 2SC01 and 2SC02 are synchronized with switches 2SL01 and 2SL02 respectively.

When, switches 2S01 and 2S03 are on, because of the voltage at 2V01 current flows through the capacitor 2CC01 and both the windings of the transformer 2TI01 to output. Energy is stored in 2CC01 and the transformer 2TI01.

When switch, 2SL01 is on, 2V01 is tied to ground. 2SC01 is also turned on and free-wheeling divides into two portions and flows from ground through the two windings of the transformer 2TI01. The secondary winding current directly flows to the output V200. The primary winding current discharges the capacitor 2CC01.

The other series capacitor tapped inductor Buck connected to 2V02 also behaves in the same way. The leakage inductances of the transformers can be used to resonate the capacitor and reduce the current through the switches 2SC01 and 2SC02. By selecting proper values of the passive components in the circuit, it is possible to achieve ZVS for all the switches in the circuit and still having the controllability through duty cycle. The transformers in the circuit also gives additional voltage redactor of a factor M which are the turn ratios of the transformer from primary to secondary winding.

FIG. 27B depicts an N level extension of the example of FIG. 27A where, the nodes 2V01 and 2V02 generates pulses of $V_{in}/N$.

Figure 28A:
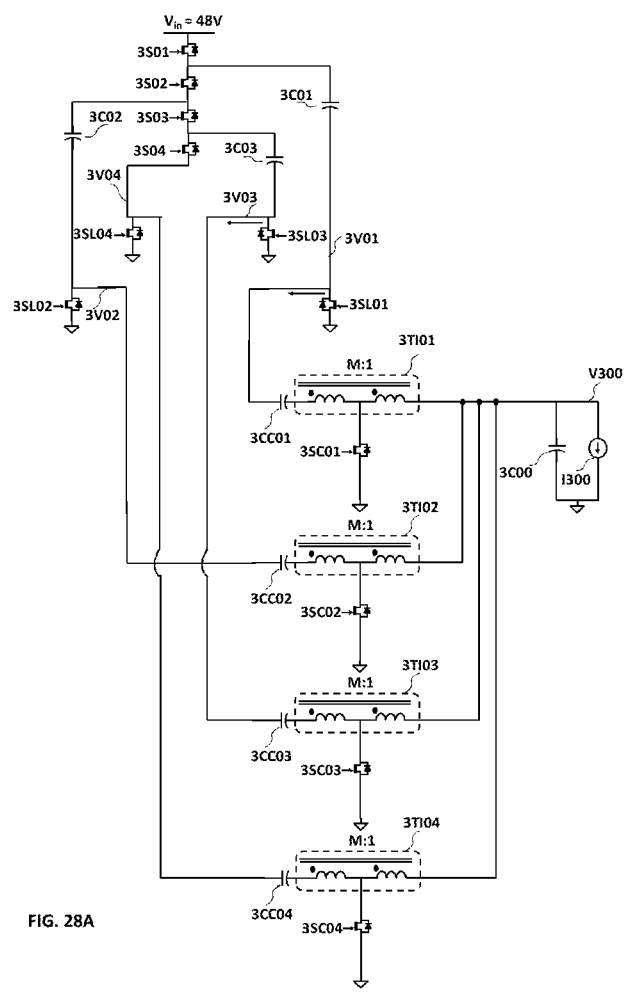
Figure 28B:
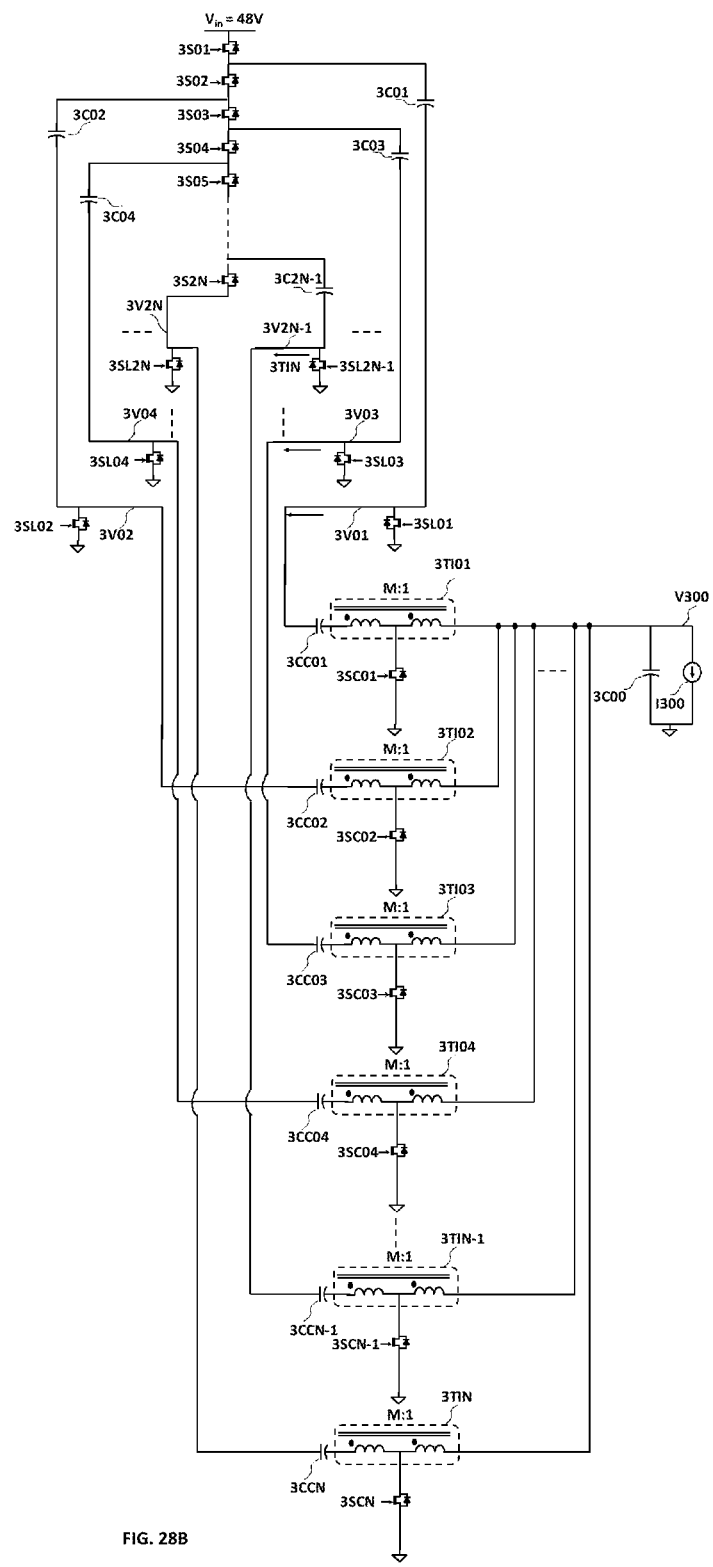

It is possible to split the switching nodes of FIG. 27A with addition of extra switches. All the split switching node can accommodate their own inductive stages. FIG. 28A shows an example circuit. FIG. 28B depicts an N level extension of the circuit example of FIG. 28A.

Figure 29A:
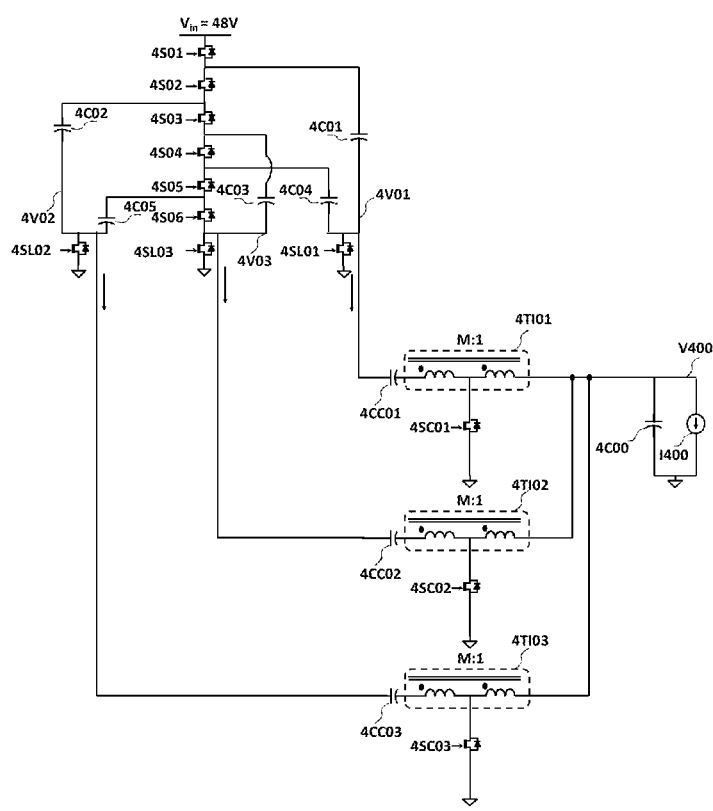

FIG. 29A depicts an example three phase, six level version of the circuit example of FIG. 27A, which can accommodate three inductive stages after the switched capacitor network.

Figure 29B:
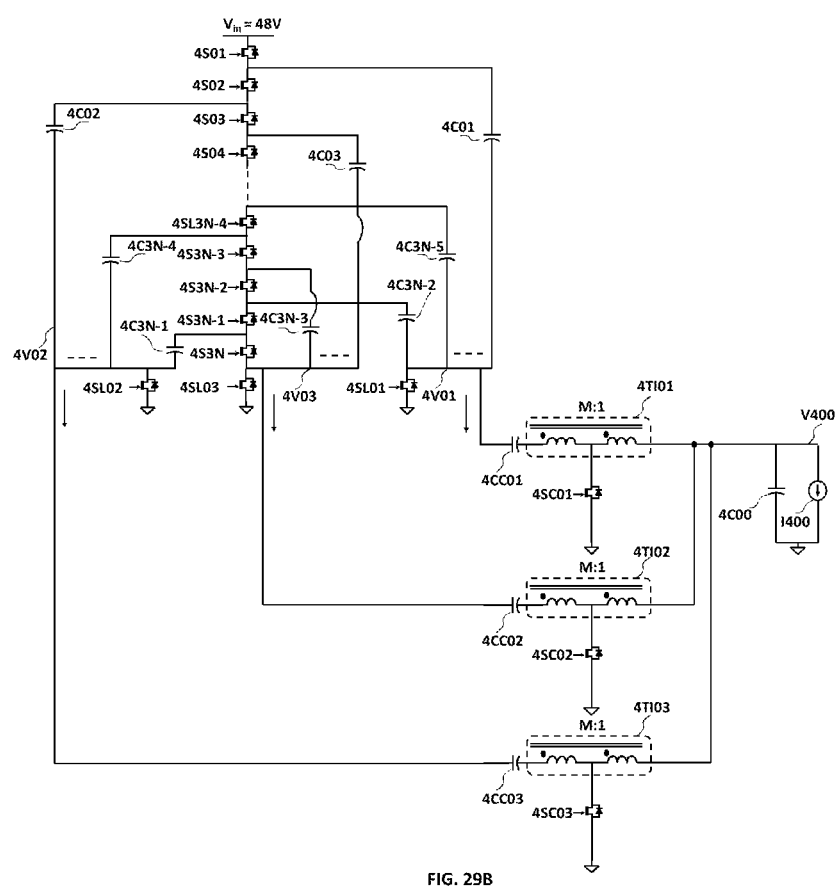

FIG. 29B depicts an N level version of the circuit example of FIG. 29A.

Figure 30A:
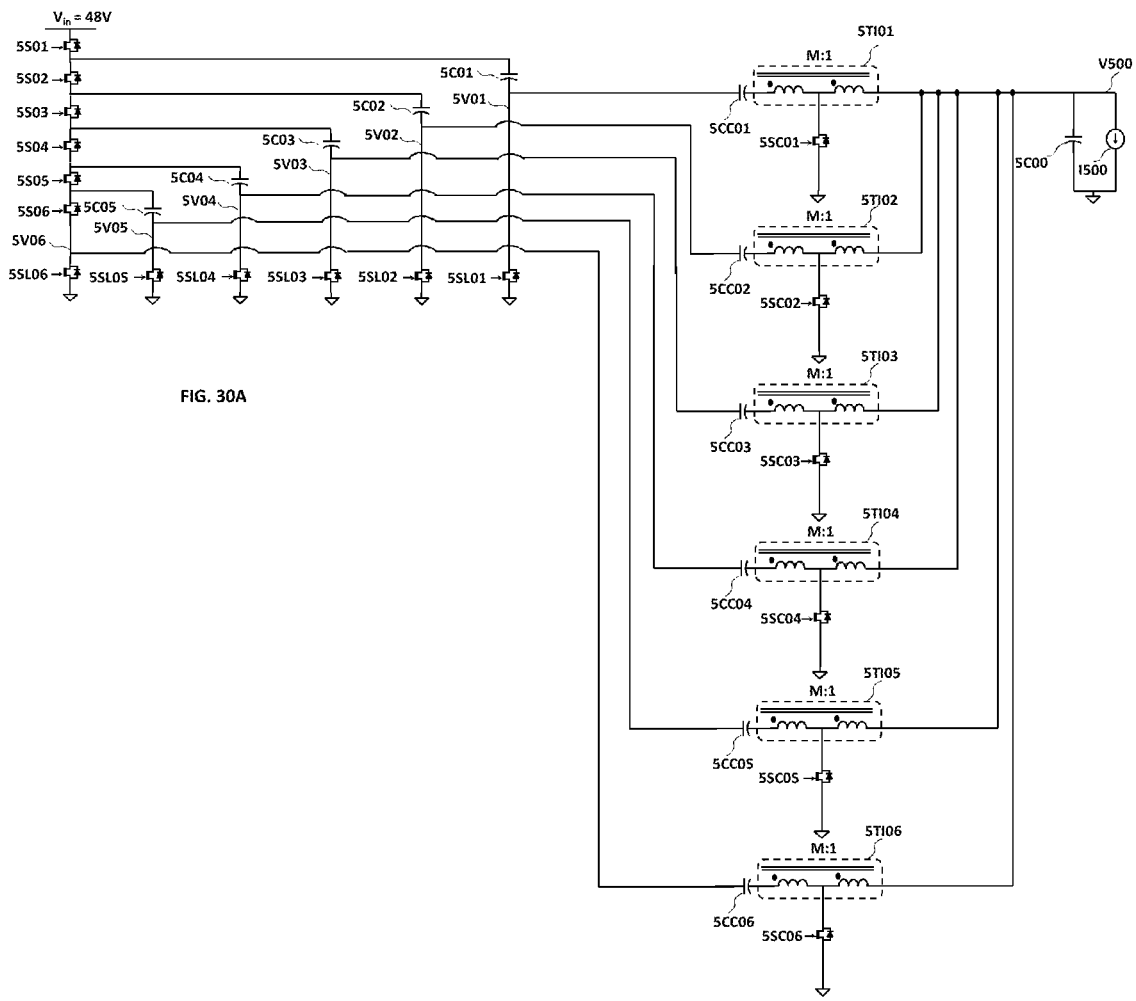
Figure 308:
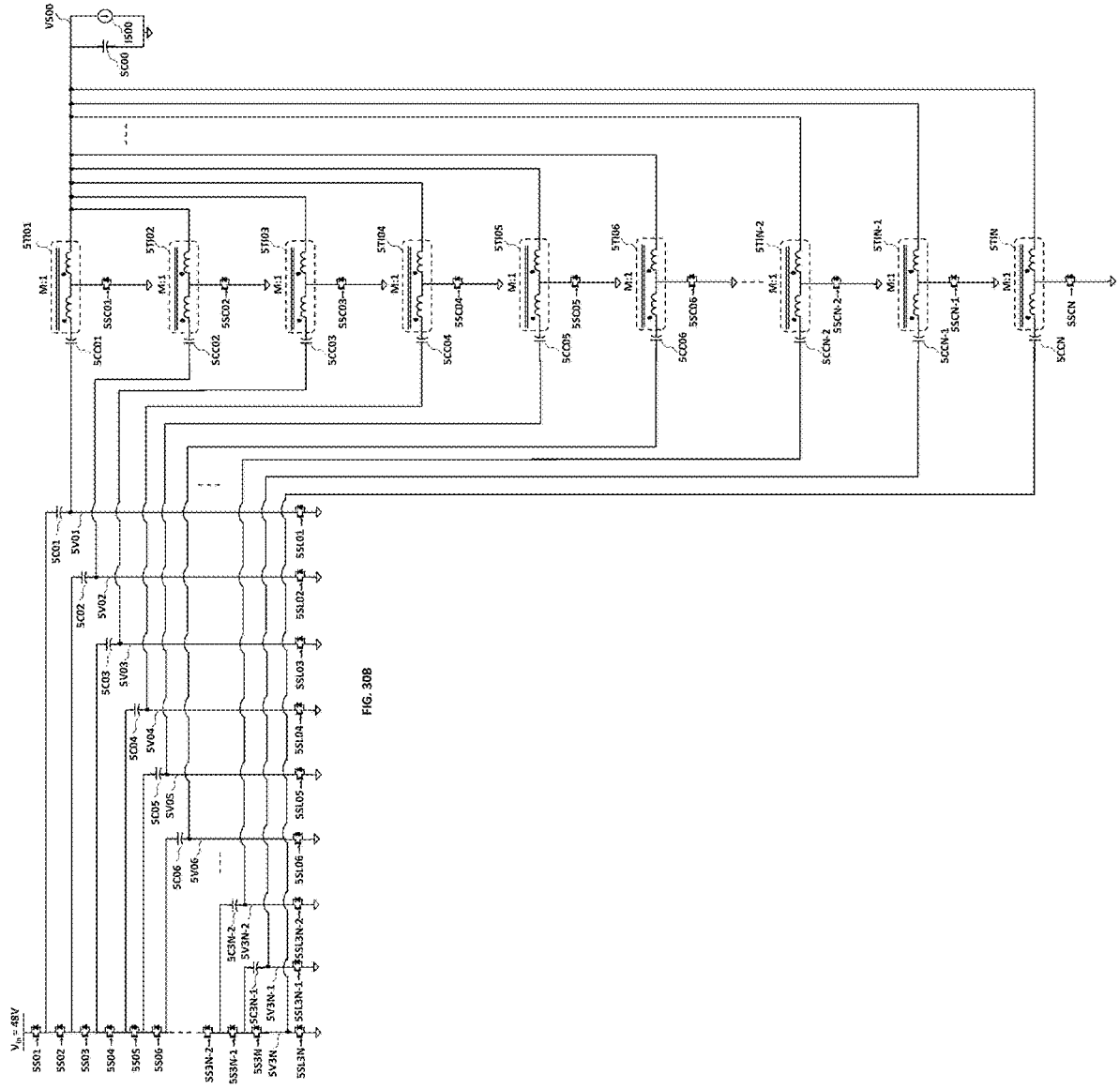

FIG. 30A depicts an example six level version of the circuit shown in FIG. 27A, which can operate in any phase number between two to six and accommodate six different inductive stages.

FIG. 30B shows an N level extension of FIG. 30A which can operate in any phase number between 2 to N and can accommodate N inductive stages.

Figure 31:
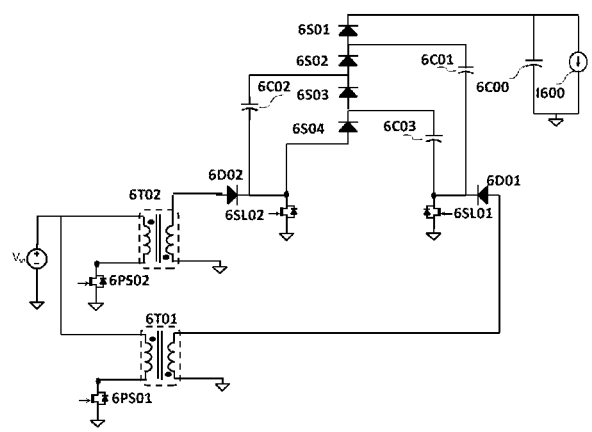
FIG. 31 shows an example of circuit comprising a flyback converter as an inductive stage.

FIG. 31 shows a step-up version of a converter where the inductive stages are a flyback type which works synchronizedly with a switched capacitor network. The switched capacitor network comprises diodes 6S01-6S04 and 6SL01-6SL02 and capacitors 6C01-6C03. The diodes can also be replaced with active switches. The two flyback type inductive stages are comprise one active switch, one diode (replaceable with active switch) and one transformer for each flyback. Switches 6SL001 and 6SL02 receives two non-over-lapping PWM signals and switches 6PS01 and 6PS02 receive their inverted signals. Switched capacitor stage multiplies the voltages generated by the flyback stage which is in this case 4. The number of levels in the switched capacitor network can be increased if higher output voltages are required.

Figure 32:
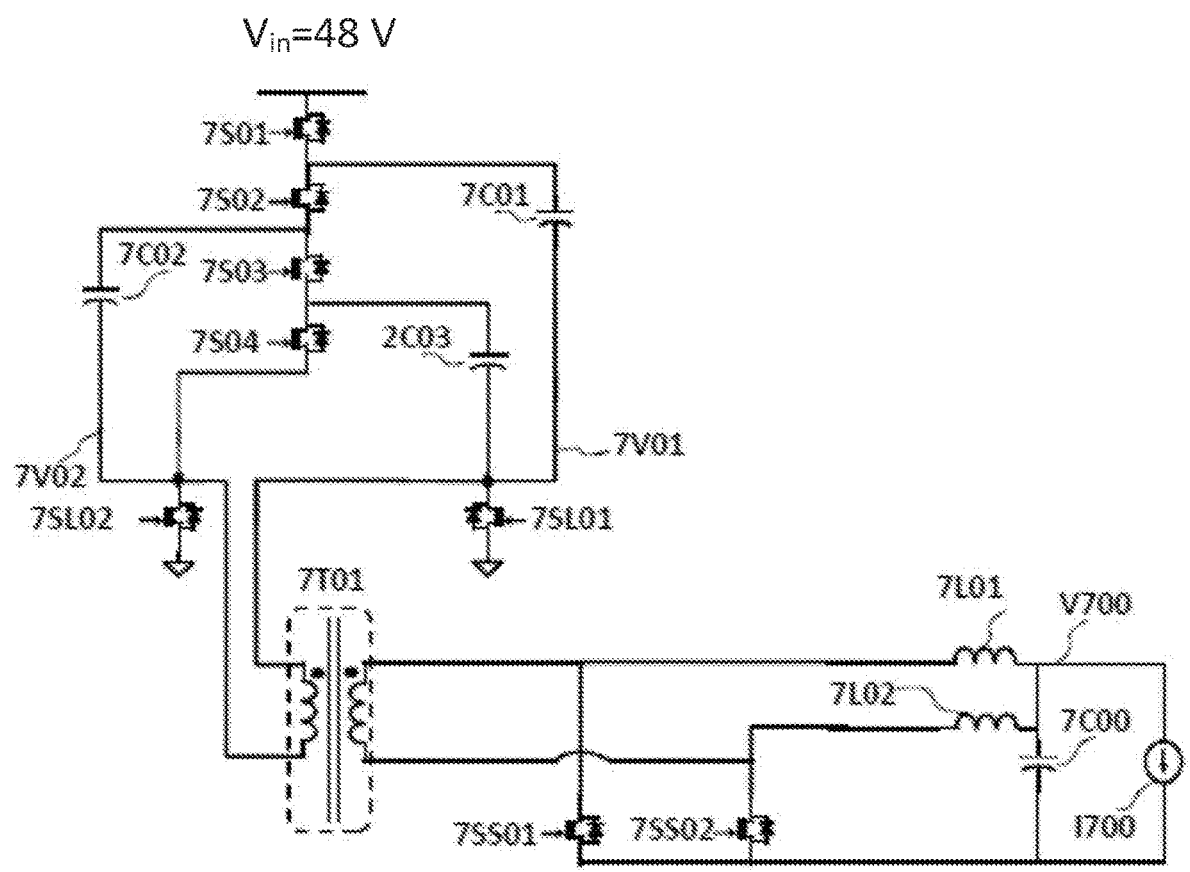
FIG. 32 depicts an example implementation in which an inductive stage comprises a transformer followed by a current doubler.

FIG. 32 depicts another example step down converter where an inductive stage comprises a transformer followed by a current doubler rectifier.

Figure 33:
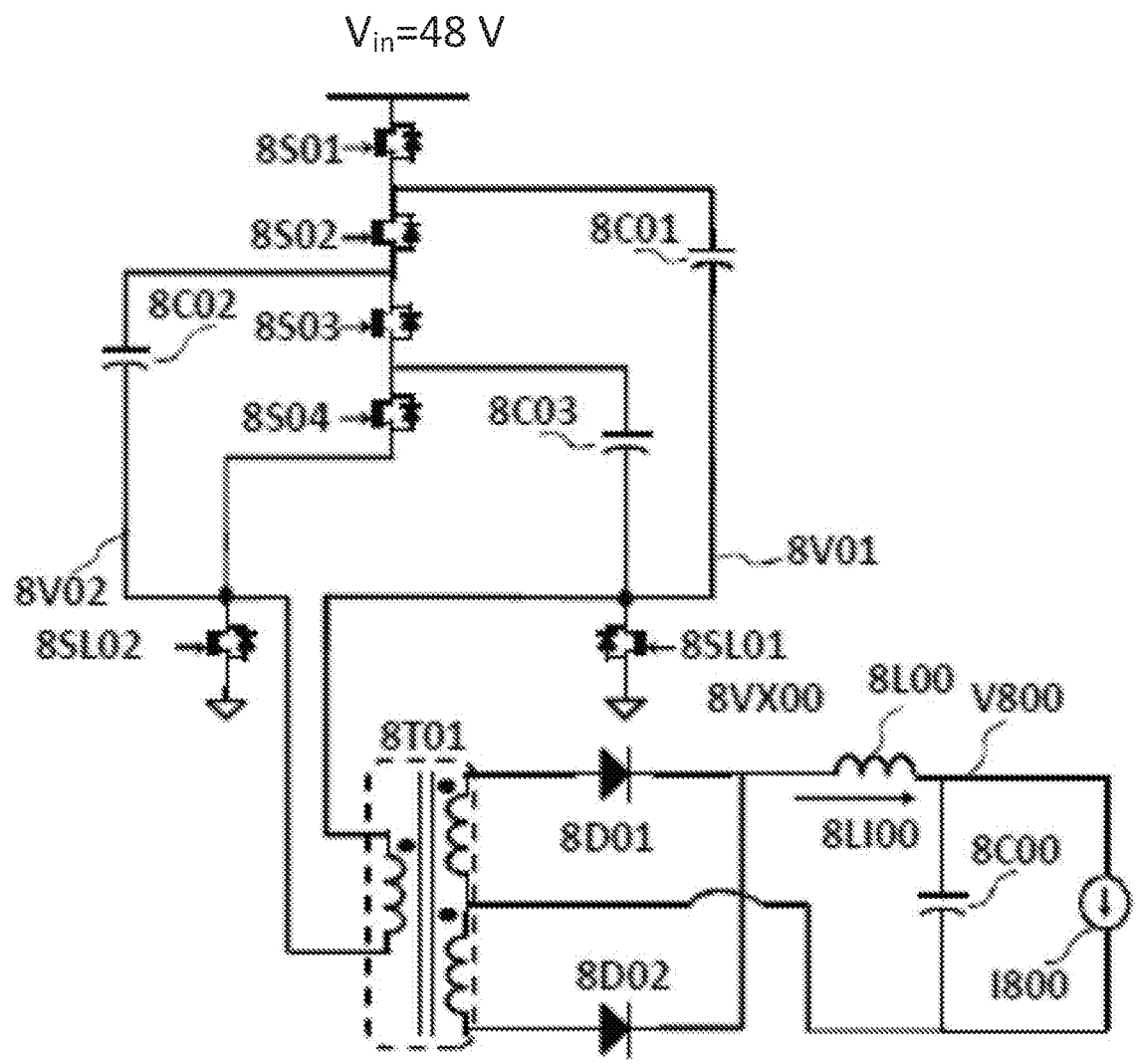
FIG. 33 depicts an example circuit with an inductive stage comprising an isolated Buck converter.

FIG. 33 depicts an example of a step-down converter where a switched capacitor network is followed by a isolated Buck converter.

Figure 34:
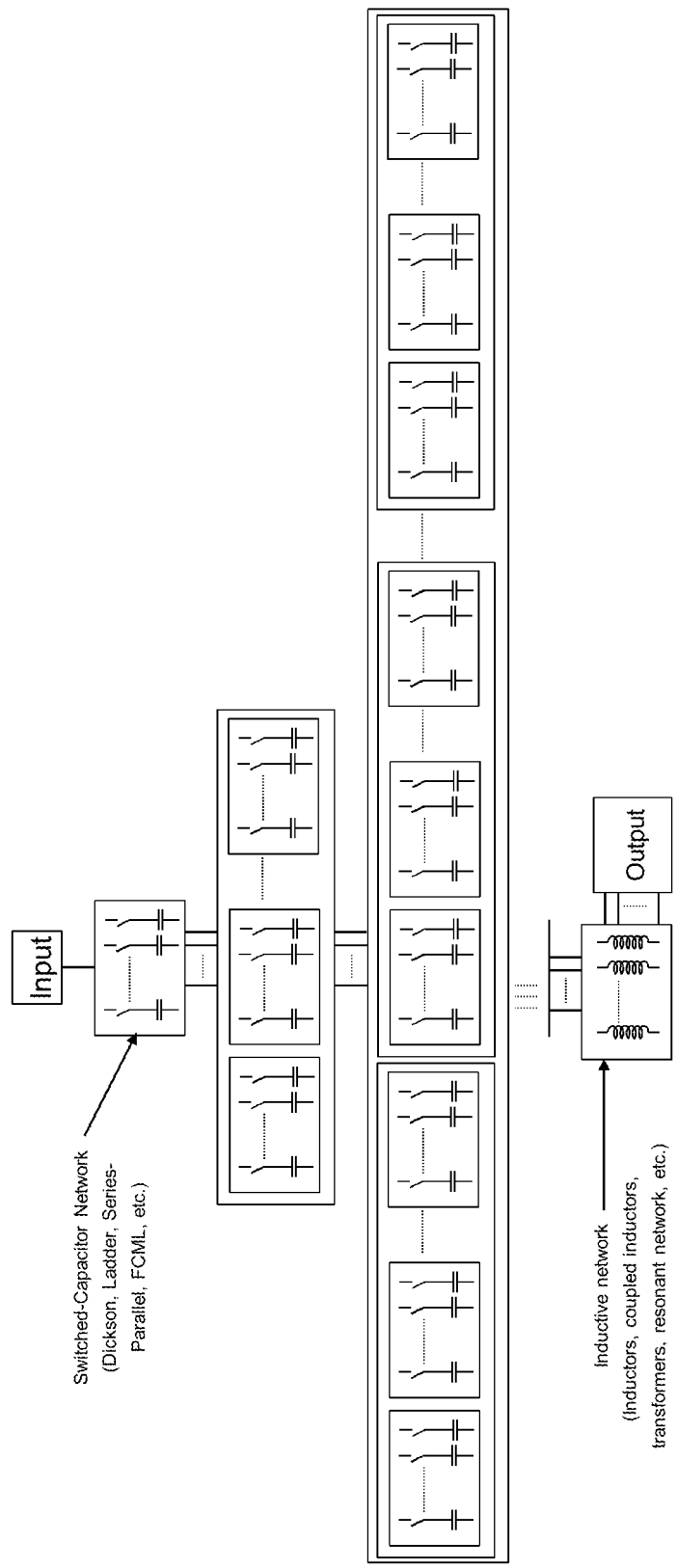
FIG. 34 illustrates an extended version of a DC-DC converter architecture where a plurality of switched capacitor networks are cascaded on top of each other and a common inductive network.

FIG. 34 shows an extended version of an example DC converter architecture where multiple switched capacitor network are cascaded on top of each other and a common inductive network. As described above, the SC network can be in form of a Dickson SC converter, a ladder, series-parallel, FCML, or another type SC converter architecture. The switched-capacitor network comprises multiple switches and one or more capacitors is connected with an input node and multiple output node. One output node of one switched capacitor network can act as the input node of another switched capacitor network. The inductive network can be connected with all the output nodes of all switched capacitor networks which are placed in the immediate upper level of the inductive network. Stacking or cascading of multiple switched capacitor networks reduces the voltage stresses on the inductive network resulting in better choice of inductive components in terms of magnitudes, sizes and costs.

Figure 35:
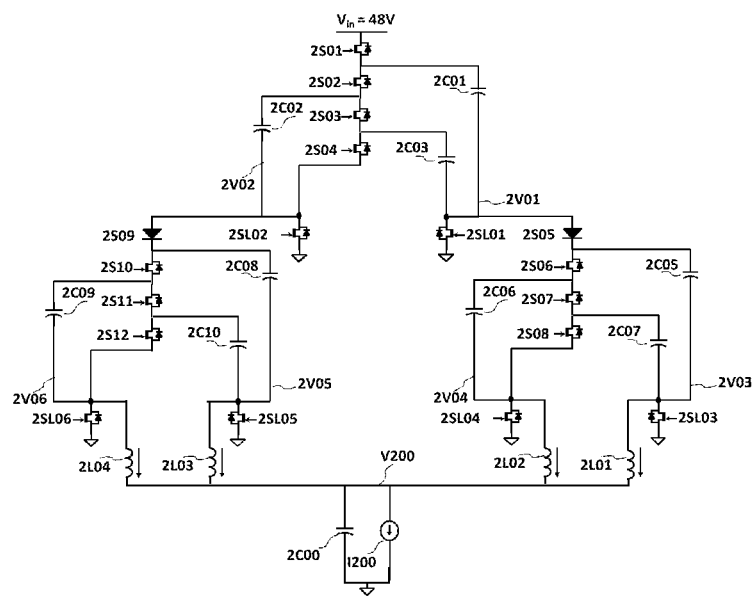
FIG. 35 presents an example DC-DC converter using a hybrid converter.

In FIG. 35, an example of cascaded hybrid converter is shown. Here, a four-level Dickson switched capacitor network has been chosen as unit switched capacitor network to cascade. Two output nodes of one Dickson SC converter can be connected with another two 4-level Dickson SC converter. The four output nodes of the second two 4-level Dickson SC can be connected with the inductive network which are four inductors in the example figures. Nodes 2V01 and 2V02 generate pulses of voltages of $V_{in}/4$ and nodes 2V03, 2V04, 2V05 and 2V06 generate pulses of voltages of $V_{in}/16$. Thus, the four inductors can be selected in smaller magnitudes and sizes.

Figure 36A:
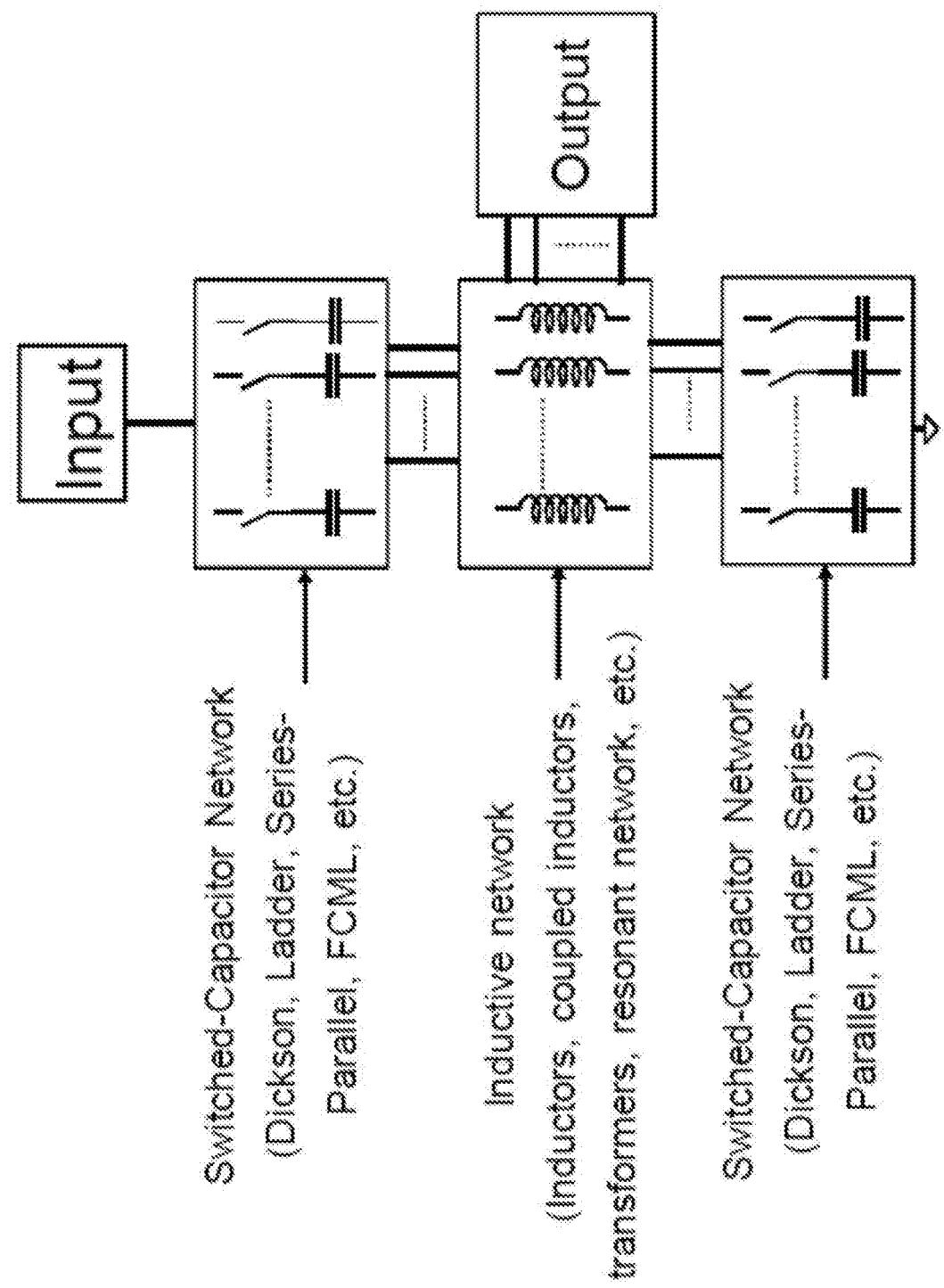
FIG. 36A illustrates an example embodiment of an extended version of a DC-DC converter architecture where an inductive network can be placed between two switched capacitor networks to make the operation fully symmetric.

FIG. 36 shows an extended version of the disclosed DC-DC converter architecture where inductive network can be placed between two switched capacitor networks to make the operation fully symmetric. As described above, the SC network can be in form of a Dickson SC converter, a ladder, series-parallel, FCML, or another type SC converter architecture. Placement of the inductive network between two SC network reduces the voltage stresses on the switches and capacitor to ~½ of nominal values by the cost of increase of number of switches and capacitors.

Figure 36B:
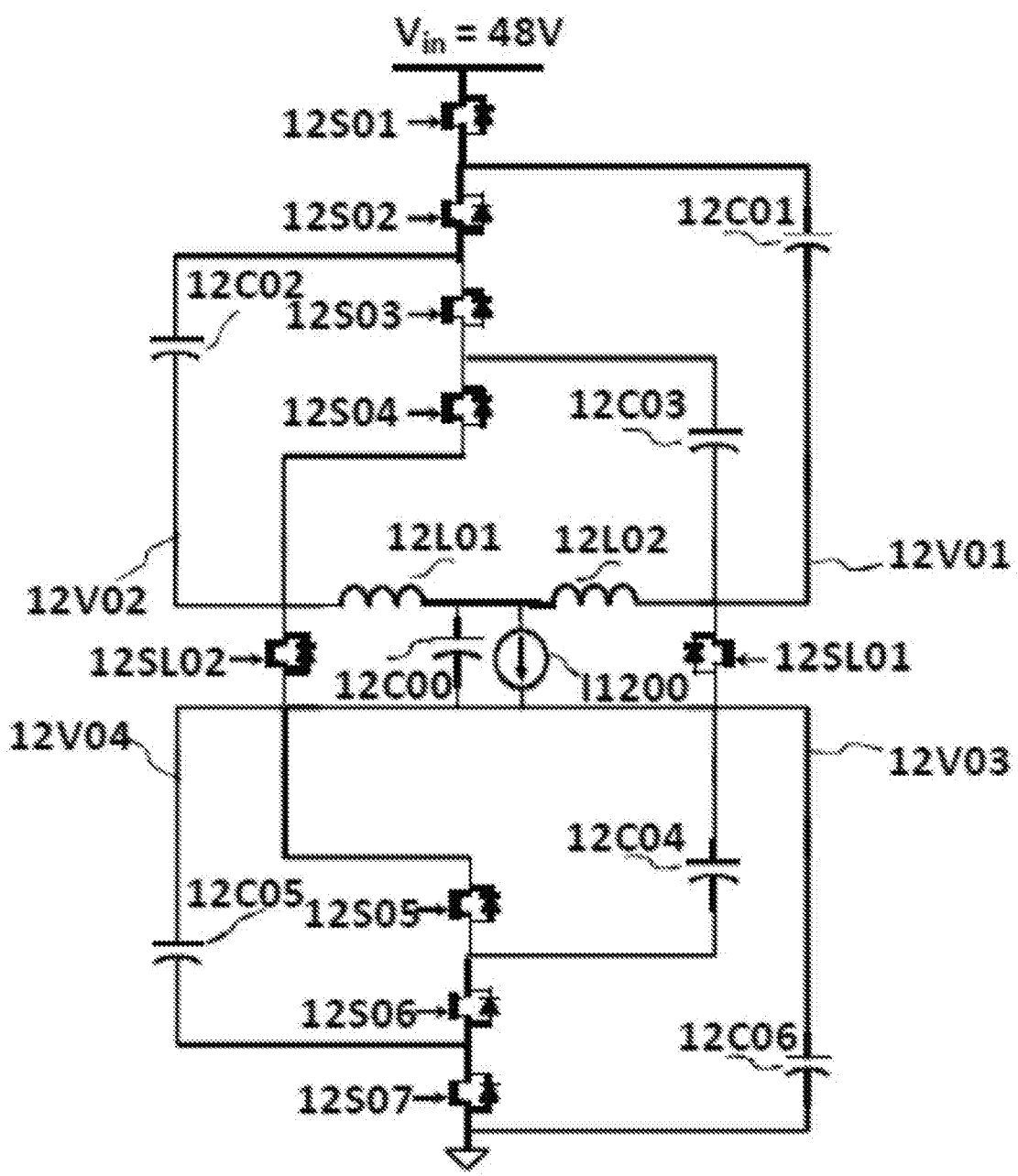
FIG. 36B presents another example embodiment of a DC-DC converter.

In FIG. 36B, an example of fully symmetric Hybrid converter has been provided. The inductive network formed by two inductors has been placed between one 4 level Dickson SC network and another flipped 4 level Dickson SC converter. The SC networks and the inductive networks work synchronously to provide a DC output voltage for I1200 load. Because of this structure, the capacitors 12C01-06 have voltage stresses reduced by ~½ comparing to the structure including one SC network. Voltage stresses of most of the switches have also been reduced because of this structure.

Figure 36C:
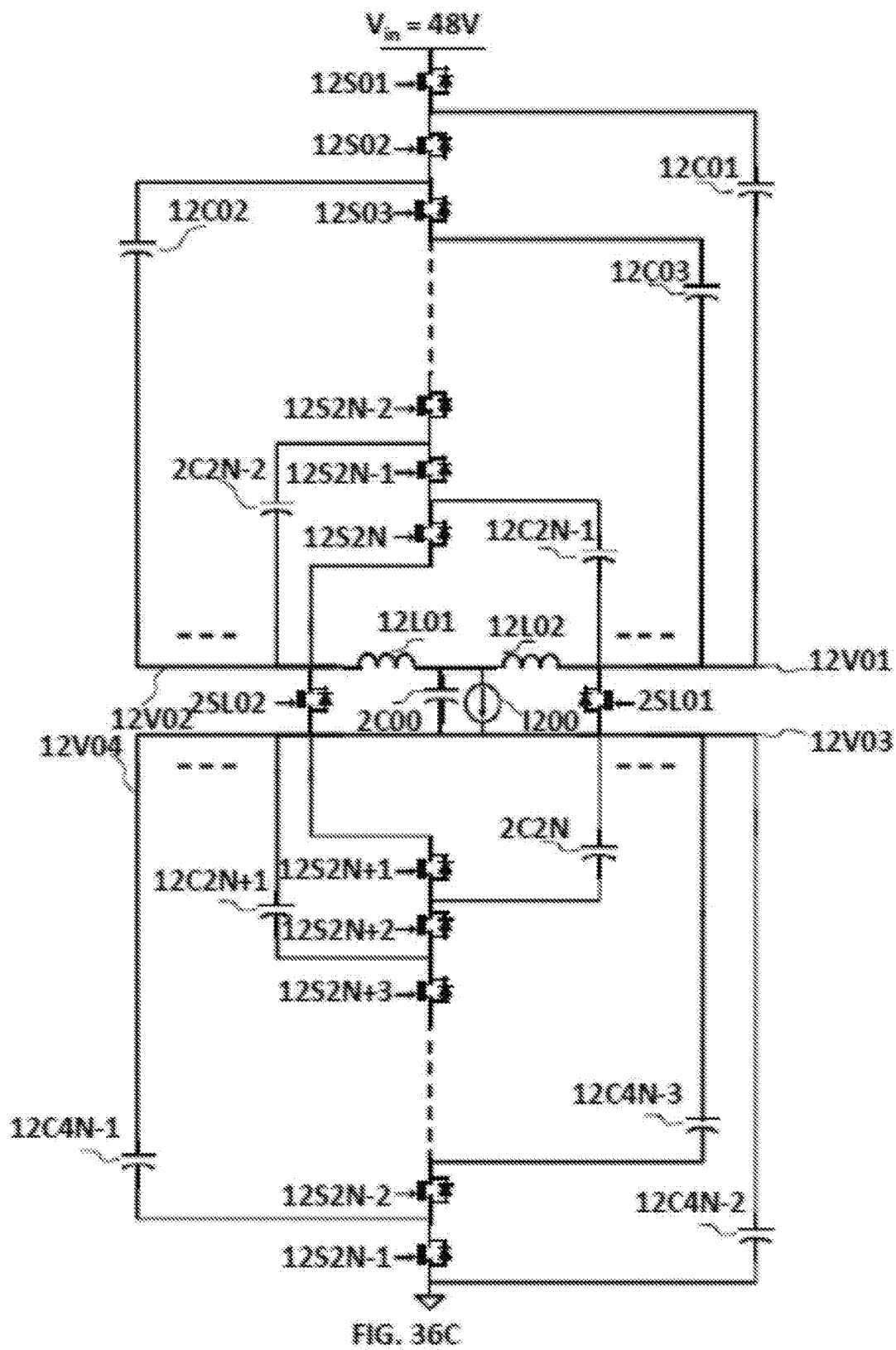
FIG. 36C presents an example embodiment comprising a 2N level extension of the example converter shown in FIG. 36B.

FIG. 36C depicts the converter architecture where both the normal SC and the flipped SC has been increased to the number of 2N levels.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A hybrid converter circuit comprising:
   an input terminal adapted to be connected to a circuit input;
   a pair of output terminals adapted to be connected to a circuit output;
   a switched multiple capacitor network connected to the input terminal and a plurality of switched-multiple-capacitor-network output terminals of the switched multiple capacitor network; and
   a plurality of switched inductors connected in series with the switched multiple capacitor network between the output terminals of the switched multiple capacitor network and a first output terminal of the pair of output terminals,
   wherein:
   an inductor in the plurality of switched inductors is connected directly to at least one capacitor in the switched multiple capacitor network, and
   each output terminal in the pair of output terminals is directly connected to an inductor selected from the plurality of switched inductors, each inductor selected from the plurality of switched inductors being directly connected to a grounded switch.

2. The hybrid converter circuit of claim 1, wherein the hybrid converter circuit comprises a step-down converter and the inductor is disposed between the switched multiple capacitor network and the pair of output terminals.

3. The hybrid converter circuit of claim 1, wherein the hybrid converter circuit comprises a step-up converter and the inductor is disposed between the pair of output terminals and the switched multiple capacitor network.

4. The hybrid converter circuit of claim 1, wherein the hybrid converter circuit comprises a bidirectional converter circuit.

5. The hybrid converter circuit of claim 1, wherein the plurality of switched inductors and the switched multiple capacitor network are operated using a switch matrix that is configured to cycle through a first configuration, a second configuration, a third configuration, and a fourth configuration, wherein:

in the first configuration, the switch matrix together with the switched multiple capacitor network are configured to generate a voltage difference between two terminals of inductors within a first set of inductors selected from the plurality of switched inductors, which charge a first set of capacitors selected from the switched multiple capacitor network and also discharge a second set of capacitors selected from the switched multiple capacitor network, in the second configuration, the switch matrix is configured to generate another voltage difference of an opposite sign between the two terminals of the inductors within the first set of inductors while keeping capacitors within the second set of capacitors open-circuited, in the third configuration, the switch matrix together with the switched multiple capacitor network are configured to generate a voltage difference between two terminals of inductors within a second set of inductors selected from the plurality of switched inductors, which charge one or more capacitors within the second set of capacitors and also discharge the first set of capacitors, and in the fourth configuration, the switch matrix is configured to generate another voltage difference of the opposite sign between the two terminals of the inductors within the second set of inductors while keeping the capacitors within the first set of capacitors open-circuited.

6. The hybrid converter circuit of claim 5, wherein a sequence of configuration and sub-configurations is changed to a different order.

7. A hybrid converter circuit comprising:
a hybrid-converter-circuit input terminal adapted to be connected to a circuit input;
a pair of output terminals adapted to be connected to a circuit output;
a switched multiple capacitor network connected to a first input terminal of the hybrid-converter-circuit input terminal and a plurality of switched-multiple-capacitor-network output terminals of the switched multiple capacitor network;
a plurality of switched inductors connected in series with the switched multiple capacitor network between the output terminals of the switched multiple capacitor network and a first output terminal of the pair of output terminals, wherein an inductor in the plurality of switched inductors is connected directly to at least one capacitor in the switched multiple capacitor network; and wherein the plurality of switched inductors and the switched multiple capacitor network are operated using a switch matrix that is configured to cycle through a first configuration, a second configuration, a third configuration, and a fourth configuration, wherein:

in the first configuration, the switch matrix together with the switched multiple capacitor network are configured to generate a voltage difference between two terminals of inductors within a first set of inductors selected from the plurality of switched inductors, which charge a first set of capacitors selected from the switched multiple capacitor network and also discharge a second set of capacitors selected from the switched multiple capacitor network, in the second configuration, the switch matrix is configured to generate another voltage difference of an opposite sign between the two terminals of the inductors within the first set of inductors while keeping capacitors within the second set of capacitors open-circuited, in the third configuration, the switch matrix together with the switched multiple capacitor network are configured to generate a voltage difference between two terminals of inductors within a second set of inductors selected from the plurality of switched inductors, which charge one or more capacitors within the second set of capacitors and also discharge the first set of capacitors, and in the fourth configuration, the switch matrix is configured to generate another voltage difference of the opposite sign between the two terminals of the inductors within the second set of inductors while keeping the capacitors within the first set of capacitors open-circuited.

8. The hybrid converter circuit of claim 7, wherein the hybrid converter circuit comprises a step-down converter and the inductor is disposed between the switched multiple capacitor network and the pair of output terminals.

9. The hybrid converter circuit of claim 7, wherein the hybrid converter circuit comprises a step-up converter and the inductor is disposed between the pair of output terminals and the switched multiple capacitor network.

10. The hybrid converter circuit of claim 7, wherein the hybrid converter circuit comprises a bidirectional converter circuit.

* * * * *